(12) United States Patent
Salmasi et al.

(10) Patent No.: US 12,156,293 B2
(45) Date of Patent: Nov. 26, 2024

(54) SYSTEMS AND METHODS FOR COLLABORATIVE EDGE COMPUTING

(71) Applicant: VEEA Inc., New York, NY (US)

(72) Inventors: Allen Salmasi, New York, NY (US); Clint Smith, New York, NY (US)

(73) Assignee: VEEA Inc., New York, NY (US)

( * ) Notice: Subject to any disclaimer, the term of this patent is extended or adjusted under 35 U.S.C. 154(b) by 315 days.

(21) Appl. No.: 17/592,798

(22) Filed: Feb. 4, 2022

(65) Prior Publication Data

US 2022/0256647 A1 Aug. 11, 2022

Related U.S. Application Data

(60) Provisional application No. 63/237,338, filed on Aug. 26, 2021, provisional application No. 63/146,117, filed on Feb. 5, 2021.

(51) Int. Cl.
*H04W 84/18* (2009.01)
*G06F 9/455* (2018.01)
(Continued)

(52) U.S. Cl.
CPC ........ *H04W 84/18* (2013.01); *G06F 9/45558* (2013.01); *G06T 19/006* (2013.01);
(Continued)

(58) Field of Classification Search
CPC ..... H04W 84/18; H04W 4/029; H04W 48/18; H04W 4/023; H04W 4/70; H04W 4/38;
(Continued)

(56) References Cited

U.S. PATENT DOCUMENTS

| 10,489,229 B2* | 11/2019 | Mustafi | G06F 11/076 |
| 10,659,526 B2* | 5/2020 | Khalid | G06F 9/5072 |

(Continued)

FOREIGN PATENT DOCUMENTS

WO 2020247101 A1 12/2020

OTHER PUBLICATIONS

European Patent Office, International Search Report and Written Opinion issued in International Patent Application No. PCT/US2022/015402, mailed Apr. 19, 2022 (17pages).

(Continued)

*Primary Examiner* — Abdullahi E Salad
(74) *Attorney, Agent, or Firm* — The Marbury Law Group, PLLC

(57) ABSTRACT

An edge computing system configured to dynamically offload tasks from a user device to an edge device. The edge computing system may receive a processed sensory feed from the user device, analyze the received processed sensory feed, and generate mapper output results. The edge computing system may compare the generated mapper output results to information received from a datastore, identify a correlation between a feature included in the received processed sensory feed and a feature included in the received information, and determine whether a confidence value associated with the identified correlation exceeds a threshold value. The edge computing system may further process the received processed sensory feed locally in the edge computing system or send the received processed sensory feed to a cloud component for further processing based on whether the confidence value exceeds the threshold value.

24 Claims, 27 Drawing Sheets

(51) Int. Cl.
  *G06T 19/00* (2011.01)
  *G06V 10/46* (2022.01)
  *H04L 67/00* (2022.01)
  *H04L 67/1008* (2022.01)
  *H04L 67/63* (2022.01)
  *H04W 4/029* (2018.01)
  *H04W 48/18* (2009.01)

(52) U.S. Cl.
  CPC ........ *G06V 10/464* (2022.01); *H04L 67/1008* (2013.01); *H04L 67/34* (2013.01); *H04L 67/63* (2022.05); *H04W 4/029* (2018.02); *H04W 48/18* (2013.01); *G06F 2009/4557* (2013.01); *G06F 2009/45595* (2013.01)

(58) Field of Classification Search
  CPC .............. H04W 84/042; G06F 9/45558; G06F 2009/4557; G06F 2009/45595; G06F 16/90335; G06T 19/006; G06V 10/464; G06V 20/20; H04L 67/1008; H04L 67/34; H04L 67/63; H04L 67/04; H04L 69/24; H04L 67/12
  See application file for complete search history.

(56) References Cited

U.S. PATENT DOCUMENTS

| | | | |
|---|---|---|---|
| 10,673,871 B2* | 6/2020 | Storms | H04L 63/1425 |
| 10,944,851 B2* | 3/2021 | Cannon | G06F 8/60 |
| 11,445,400 B2 | 9/2022 | Zhang et al. | |
| 11,803,955 B1* | 10/2023 | Pandya | G01S 17/86 |
| 2021/0089634 A1* | 3/2021 | Lakshminarayana | H04L 9/3236 |
| 2021/0144517 A1* | 5/2021 | Guim Bernat | H04L 41/0869 |
| 2022/0408333 A1 | 12/2022 | Ryu et al. | |

OTHER PUBLICATIONS

Jinke Ren, et al., "An Edge-Computing Based Architecture for Mobile Augmented Reality," arxiv.org, Cornell University Library, 201 Olin Library Cornell University Ithaca, NY 14853, dated Oct. 5, 2018 (8 pages).

Gu, et al., "Energy-Optimal Latency-Constrained Application Offloading in Mobile-Edge Computing", MDPI Sensors 2020, 20, 3064, (2020), pp. 1-22.

Sardellitti, et al., "Joint Optimization of Radio and Computational Resources for Multicell Mobile-Edge Computing", IEEE Transactions on Signal and Information Processing Over Networks, vol. 1, No. 2, (Jun. 2015), pp. 89-103.

USPTO, U.S. Appl. No. 17/592,876, filed Feb. 4, 2022, 142 pages.

Scichao, et al. Recent Advances in Collaborative Scheduling of Computing Tasks in an Edge Computing Paradigm; Published: Jan. 24, 2021.

Yuting, et al. TaSRD: Task Scheduling Relying on Resource and Dependency in Mobile Edge Computing; Published Dec. 1, 2018.

USPTO, U.S. Appl. No. 17/592,876, Non-Final Office Action dated Feb. 28, 2023, 29 pages.

International Preliminary Report on Patentability and Written Opinion of the International Searching Authority in International Application No. PCT/US2022/015402 dated Aug. 17, 2023, 11 pages.

Chen, et al., "Recent Advances in Collaborative Scheduling of Computing tasks in an Edge Computing Paradigm", Sensors 2021, 21, 779, (Jan. 2021), 22 pages.

Cao, et al., "TaSRD: Task Scheduling Relying on Resource and Dependency in Mobile Edge Computing", 2018 IEEE, pp. 287-295, (Dec. 1, 2018).

Mach, et al., "Mobile Edge Computing: A Survey on Architecture and Computation Offloading," IEEE Communications Surveys & Tutorials, vol. 19, No. 3, Third Quarter, pp. 1628-1656 (2017).

U.S. Patent and Trademark Office, "Final Office Action," issued in related U.S. Appl. No. 17/592,876 dated Nov. 3, 2023 (36 pages).

U.S. Patent and Trademark Office, "Non-final Office Action," issued in related U.S. Appl. No. 17/592,876 dated Mar. 18, 2024 (27 pages).

U.S. Patent and Trademark Office, "Final Office Action," issued in related U.S. Appl. No. 17/592,876 dated Sep. 19, 2024 (27 pages).

* cited by examiner

900

| Application | XR Capable | Lacking Internal Capability to Run XR | Unable Run XR |
|---|---|---|---|
| Application 1 | Edge Device 1 Edge Device 2 Edge Device 3 | N | N |
| Application 2 | Edge Device 1 | Edge Device 2 | Edge Device 3 |
| Application 3 | Edge Device 1 | Edge Device 2 | N |
| Application 4 | N | Edge Device 1 Edge Device 2 | Edge Device 3 |

FIG. 9A

| Application | Can commence operating without connectivity | Can continue operating without connectivity |
|---|---|---|
| Application 1 | Yes | Yes |
| Application 2 | Yes | Yes |
| Application 3 | Yes | No |
| Application 4 | No | No |

SYSTEMS AND METHODS FOR COLLABORATIVE EDGE COMPUTING

RELATED APPLICATIONS

This application claims the benefit of priority to U.S. Provisional Application No. 63/146,117, entitled "Systems and Methods for Collaborative Edge Computing" filed Feb. 5, 2021, and U.S. Provisional Application No. 63/237,338, entitled "Systems and Methods for Collaborative Edge Computing" filed Aug. 26, 2021, the entire contents of both of which are hereby incorporated by reference for all purposes.

BACKGROUND

Wireless communication technologies have been growing in popularity and use over the past several years. This growth has been fueled by better communications hardware, larger networks, and more reliable protocols. Wireless and Internet service providers are now able to offer their customers with an ever-expanding array of features and services. To keep pace with these enhancements, mobile electronic devices (e.g., smartphones, wearable devices such as smartwatches and HMDs, etc.) have become smaller, more powerful, and/or more complex.

Today's mobile devices include more powerful processors, system-on-chips (SoCs), memories, and other resources that allow users to execute complex and powerful software applications, such as extended reality (XR) software applications. Yet, despite these enhancements, mobile devices remain resource constrained systems that have relatively limited processing, memory, and battery resources.

Extended reality software applications have demanding processing and latency requirements that may rapidly consume or overwhelm the limited resources of the mobile device, thereby degrading the user experience. Accordingly, new and improved solutions for using extended reality software applications on resource constrained electronic devices, such as smartphones, will be beneficial to consumers.

SUMMARY

The various aspects include methods of offloading portions of an application from a user device to an edge device, which may include receiving, in one or more processors in an edge computing system, a processed sensory feed from the user device, analyzing, in the one or more processors in the edge computing system, the received processed sensory feed to generate analysis results, generating, in the one or more processors in the edge computing system, mapper output results based on the generated analysis results, requesting and receiving, in the one or more processors in the edge computing system, information from one or more of a local image database, an image database application mesh, or a cloud image database, comparing, in the one or more processors in the edge computing system, the generated mapper output results to the received information to identify a correlation between a feature included in the received processed sensory feed and a feature included in the received information, determining, in the one or more processors in the edge computing system, whether a confidence value associated with the identified correlation exceeds a threshold value, further processing, in the one or more processors in the edge computing system, the received processed sensory feed locally in the edge computing system, and send the further processed sensory feed to the user device for rendering on an electronic display of the user device, in response to determining that the confidence value associated with the identified correlation exceeds the threshold value, and sending, by the one or more processors in the edge computing system, the received processed sensory feed to a cloud component for further processing and sending to the user device for rendering in response to determining that the confidence value associated with the identified correlation does not exceed the threshold value.

In some aspects, the one or more processors in the edge computing system may be included in an edge device. In some aspects, the one or more processors in the edge computing system may include multiple processors in multiple edge devices configured to operate in at least one of a computing mesh, an application mesh, or a connectivity mesh. In some aspects, the method may include running at least one of a computing mesh, an application mesh, or a connectivity mesh in a container.

In some aspects, generating the analysis results, generating the mapper output results, and identifying the correlation include generating the analysis results, generating the mapper output results, and identifying the correlation by a first processor in a first edge device in the edge computing system, and further processing the received processed sensory feed may include further processing the received processed sensory feed by a second processor in a second edge device in the edge computing system.

In some aspects, analyzing the received processed sensory feed to generate the analysis results may include analyzing the received processed sensory feed to generate the analysis results to include a relative position of the user device from surrounding objects identified in the processed sensory feed, generating the mapper output results based on the generated analysis results may include generating the mapper output results to include virtual coordinates, and requesting and receiving the information from one or more of the local image database, the image database application mesh, or the cloud image database may include requesting and receiving information that includes including salient points of interest from one or more of the local image database, the image database application mesh, or the cloud image database.

In some aspects, further processing the received processed sensory feed locally in the edge computing system in response to determining that the confidence value associated with the identified correlation exceeds the threshold value may include determining overlay renderings and additional sensory data, and generating augmented information based on the determined overlay renderings and additional sensory data. In some aspects, generating augmented information based on the determined overlay renderings and additional sensory data may include generating the augmented information to include images of items and features that do not exist, wire frame of existing features, an annotation, and audio and visual confirmation information.

Further aspects may include a computing device (e.g., edge device, edge computing system, etc.) having one or more processors configured with processor-executable instructions to perform various operations corresponding to the methods discussed above.

Further aspects may include a non-transitory processor-readable storage medium having stored thereon processor-executable instructions configured to cause one or more processors in an edge computing system to perform various operations corresponding to the method operations discussed above.

BRIEF DESCRIPTION OF THE DRAWINGS

The accompanying drawings, which are incorporated herein and constitute part of this specification, illustrate exemplary aspects of the claims, and together with the general description given above and the detailed description given below, serve to explain the features of the claims.

FIGS. 9A and 9B are block diagrams illustrating information structures that could be used for collaborative edge computing in accordance with some embodiments.

DETAILED DESCRIPTION

Figure 1:
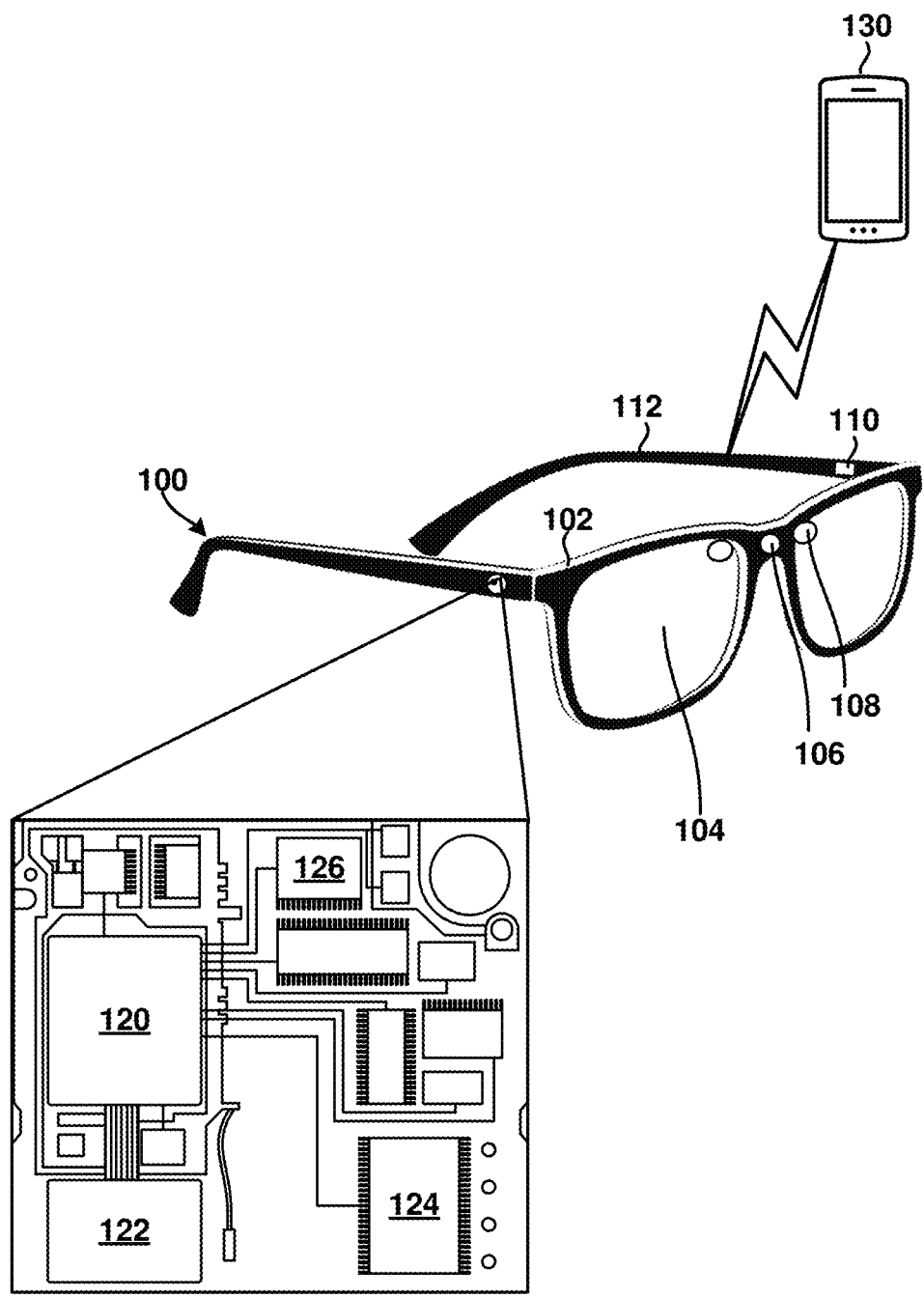
FIG. 1 is an illustration of a user computing device in the form of a head-mounted device (HMD) that may be configured in accordance with various embodiments.

Various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

In overview, the various embodiments include or provide an edge computing system (or edge computing platform) that overcomes many of the limitations of existing and conventional solutions, particularly limitations related to resource shortages on resource-constrained user computing devices (e.g., mobile devices, HMDs, etc.) that run complex software applications (e.g., XR applications, etc.) and/or for which the performance, end-to-end latency and/or energy consumption characteristics of device may have a direct, significant and/or user-perceivable impact on the user experience.

The various embodiments may include, use, incorporate, implement, provide access to a variety of wired and wireless communication networks, technologies and standards that are currently available or contemplated in the future, including any or all of Bluetooth®, Bluetooth Low Energy, ZigBee, LoRa, Wireless HART, Weightless P, DASH7, RPMA, RFID, NFC, LwM2M, Adaptive Network Topology (ANT), Worldwide Interoperability for Microwave Access (WiMAX), WIFI, WiFi6, WIFI Protected Access I & II (WPA, WPA2), personal area networks (PAN), local area networks (LAN), metropolitan area networks (MAN), wide area networks (WAN), networks that implement the data over cable service interface specification (DOCSIS), networks that utilize asymmetric digital subscriber line (ADSL) technologies, third generation partnership project (3GPP), long term evolution (LTE) systems, LTE-Direct, third generation wireless mobile communication technology (3G), fourth generation wireless mobile communication technology (4G), fifth generation wireless mobile communication technology (5G), global system for mobile communications (GSM), universal mobile telecommunications system (UMTS), high-speed downlink packet access (HSDPA), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), etc. Each of these wired and wireless technologies involves, for example, the transmission and reception of data, signaling and/or content messages. Any references to terminology and/or technical details related to an individual wired or wireless communications standard or technology are for illustrative purposes only, and not intended to limit the scope of the claims to a particular communication system or technology unless specifically recited in the claim language.

The term "computing device" may be used herein to refer to any one or all of quantum computing devices, edge devices, Internet access gateways, modems, routers, network switches, residential gateways, access points, integrated access devices (IAD), mobile convergence products, networking adapters, multiplexers, personal computers, laptop computers, tablet computers, user equipment (UE), smartphones, personal or mobile multi-media players, personal data assistants (PDAs), palm-top computers, wireless electronic mail receivers, multimedia Internet enabled cellular telephones, gaming systems (e.g., PlayStation™, Xbox™, Nintendo Switch™, etc.), wearable devices (e.g., smartwatch, head-mounted display, fitness tracker, etc.), IoT devices (e.g., smart televisions, smart speakers, smart locks, lighting systems, smart switches, smart plugs, smart doorbells, smart doorbell cameras, smart air pollution/quality monitors, smart smoke alarms, security systems, smart thermostats, etc.), media players (e.g., DVD players, ROKU™, AppleTV™, etc.), digital video recorders (DVRs), automotive heads up displays, portable projectors, 3D holographic displays, and other similar devices that include a programmable processor and communications circuitry for providing the functionality described herein.

The term "mobile device" may be used herein to refer to any one or all of wireless devices, internet-of-things (TOT) devices, cellular telephones, smartphones, personal or mobile multi-media players, personal data assistants (PDA's), laptop computers, tablet computers, ultrabooks, palm-top computers, wireless electronic mail receivers, multimedia Internet enabled cellular telephones, wireless gaming controllers, smart cars, connected vehicles, wearable device (e.g., HMD, etc.) and similar electronic devices which include a programmable processor, a memory and circuitry for sending and/or receiving wireless communication signals. While various embodiments are particularly useful in wireless mobile devices, such as smartphones and tablets, the embodiments are generally useful in any electronic device that includes a programmable processor suitable for executing extended reality software applications.

The term "edge device" may be used herein to refer to a computing device that includes a programmable processor and communications circuitry for establishing communication links to consumer devices (e.g., smartphones, UEs, IoT devices, etc.) and/or to network components in a service provider, core, cloud, or enterprise network. For example, an edge device may include or implement functionality associated any one or all of an access point, gateway, modem, router, network switch, residential gateway, mobile convergence product, networking adapter, customer premise device, multiplexer and/or other similar devices. An edge device may also include various memories and an edge database. Some embodiments may include an edge computing system that includes one or more edge devices, any or all of which may be configured to perform or implement edge computing techniques or technologies.

The terms "edge computing," "cyber foraging," and "computation offloading" may be used interchangeably herein to refer to system, techniques or technologies that improve the user experience by offloading computation-intensive tasks to edge devices or servers deployed at the edge of the networks, thereby freeing up resources on the computing device and/or allowing the computing device to perform more computations or more resource-intensive tasks. Edge computing may be regarded as a new paradigm for overcoming resource shortages on resource-constrained computing devices.

The term "quantum computing device" may be used herein to refer to a computing device or edge device, whether it is a standalone device or used in conjunction with current computing processes, that generates or manipulates quantum bits (qubits) or which utilizes quantum memory states. Some embodiments may include an edge computing system that includes one or more quantum computing device, any or all of which may be edge devices.

A quantum computing device may enhance edge computing capability by providing solutions that would be challenging to implement via conventional computing systems. This is especially true with value added computing for leveraging a diverse number of sensors and other input data to arrive at a solution in real time. Through unifying diverse data sources, a quantum computing solution at the edge may accelerate machine learning, solve complex problems faster as well as provide the fundamental platform for artificial intelligence nodes at the edge of the network. With the vast array of data delivered by sensors as well state information the quantum computing process may improve the memory allocation though the use of superposition allowing for more information to be simultaneously stored and processed.

The term "system on chip" (SOC) may be used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent system-on-chips (SOCs) coupled together via high speed communication circuitry and packaged in close proximity, such as on a single backplane, single motherboard or in a single wireless device. The proximity of the SOCs facilitates high speed communications and the sharing of memory and resources.

The term "multicore processor" may be used herein to refer to a single integrated circuit (IC) chip or chip package that contains two or more independent processing cores (e.g., CPU core, IP core, GPU core, etc.) configured to read and execute program instructions. A SOC may include multiple multicore processors, and each processor in an SOC may be referred to as a core. The term "multiprocessor" may be used herein to refer to a system or device that includes two or more processing units configured to read and execute program instructions.

The term "approximate computing" may be used herein to refer to a computation technique that returns a possibly inaccurate result rather than a guaranteed accurate result. Approximate computing is suitable for use for applications in which an approximate result is sufficient and/or in which it is important to balance computational accuracy with energy (delay) efficiency.

The term "container" is used herein to refer to a software component that supports virtualization technology, enables the abstraction (or virtualization) of computing resources, and/or separates software applications from their underlying infrastructure (thus making them infrastructure agnostic). For example, a container may be one of a plurality of isolated user space instances operating on the kernel, each of which operates under the illusion of having full or exclusive access to the processors, peripherals, memory and I/O of the computing system. Application programs running inside of a container may only see the container's contents and devices assigned to that container. In addition to these isolation mechanisms, a container or kernel may include resource-management features that limit the impact of one container's activities on other containers. In the various embodiments, the XR functions described herein may be run as a native program to the individual hardware elements, be deployed as a virtual machine or machines or be deployed in containers.

The term "head-mounted device (HMD)" may be used herein to refer to any electronic display system that is wearable and presents the user with at least some computer-generated imagery. HMDs may present just computer-generated imagery or a combination of computer-generated imagery and real-world images from a user's physical environment (i.e., what the user would see without the glasses). HMDs may enable the user to view the generated image in the context of the real-world scene. Non-limiting examples of HMDs include, or may be included in, helmets, eyeglasses, virtual reality glasses, augmented reality glasses, mixed reality glasses, extended reality headsets (e.g., headsets providing virtual reality, augmented reality, mixed reality, and/or other type immersive or semi-immersive visual experiences), electronic goggles, self-contained breathing apparatus (SCBA) masks, industrial Personal Protective Equipment (PPE) masks, and other similar technologies/devices. An HMD may include various hardware elements, such as a processor, a memory, a display, one or more cameras (e.g., world-view camera, gaze-view camera, etc.), and a wireless interface for connecting with the Internet, a network, or another computing device. In some embodiments, the HMD processor may be configured to perform or execute an extended reality (XR) software application.

The term "computing mesh" may be used herein to refer to any or a variety of techniques and technologies for distributing or linking various computing resources that are connected by wireless or wired communication links, but which are not otherwise connected to each other. This may include a software defined network in which computing resources are located in one node/component and the data used for the program or application resides in another node/component as part of the computing mesh. A computing mesh typically utilizes a self-organizing network in which computing resources are shared between different nodes in a computing mesh environment.

The term "application mesh" may be used herein in to refer to any or a variety techniques and technologies used for running and executing applications across different physical devices. The devices may be connected via wireless or wired communication links, or a combination thereof. An application mesh may include different components or processes of the application running on different nodes/components based on computing resources, sensors, or auxiliary devices attached to each node/component, enabling the application to utilize all the resources it needs to perform the functions of the application using different nodes/components concurrently.

The term "connectivity mesh" may be used herein in to refer to any or a variety of techniques and technologies used for connecting different computing platforms for the ability to share computing resources, run and execute applications, or provide connectivity with other devices or systems. The connectivity mesh may also be a self-organizing network (SON) network, with an ability to adapt and provide the optimum connectivity based on node/component availability, latency and other parameters necessary to sharing computing resources, performing application mesh techniques or providing a self healing backbone for delivering and receiving information.

The term "extended reality (XR)" may be used herein to refer to any of a variety of sense enhancing technologies, and encompasses virtual reality (VR), augmented reality (AR), mixed reality (MR), and other technologies for processing, manipulating or presenting digital output (e.g., images, text, sounds, haptic feedback, tactile output, etc.) that may be combined with the real world environment that the user is experiencing or a complete simulation. For example, an XR software application may be a virtual reality application that simulates a user's physical presence in a virtual environment. An XR software application may also be an augmented reality application that combines real world images from a user's physical environment with computer-generated imagery, and presents images and information about people and/or objects to the user superimposed on the visual world as an augmented scene. As yet another example, an XR software application may be a mixed reality application that merges real and virtual worlds to produce new environments and visualizations in which physical and digital objects co-exist and interact in real time.

The term "photonics" may be used herein to refer to any of a variety of techniques or technologies for light (photon) generation, detection or manipulation, such as through emission, transmission, modulation, signal processing, switching, amplification or sensing. While many photonic applications fall within in the range of visible or near-infrared light, photonics may include all technical applications over the entire spectrum.

Some embodiments may include, expand, support, or work in conjunction with a quantum photonic device, which may be a solid state light-based or photonic device such as the Quantum Photonic Imager (QPI) developed by OSTENDO™. QPI combines state of the art light/display technologies with microprocessor technologies on a single device, allowing for communication with light elements or photons to be performed on a device less than half size of a human fingernail. The use of the various embodiments in combination with various implementations of such a quantum photonic device may provide for highly customized XR solutions for a wide range of industrial and consumer market use cases.

Many XR applications are computational-intensive and/or delay-sensitive. As such, their execution on a resource-constrained computing device (e.g., mobile device, HMD, etc.) may be prohibitive due to, for example, latency associated with delivery of content, cost of bandwidth for gigabytes of data, user computing device energy consumption characteristics, etc. Conventional solutions employ a variety of techniques or technologies in an attempt to improve the end-to-end latency and/or energy consumption characteristics of software applications running on a user computing device. For example, a user computing device may be equipped with an advanced hardware architecture (e.g., multi-core processors with low frequency and voltage, etc.) that implements dynamic voltage and frequency scaling (DVFS), dynamic clock and voltage scaling (DCVS), and/or other similar power reduction techniques. Alternatively or in addition, the device may implement an approximate computing technique that allows low-precision tasks (e.g., location sensing, etc.) to be approximately processed in an attempt to balance computational accuracy with energy (delay) efficiency. As another example, the device may implement a partial video frame updating technique that allows the device to process only the newly-generated data, thereby avoiding redundant computing operations and reducing latency and/or energy consumption on the device.

While the above-mentioned solutions (e.g., advanced hardware architecture, approximate computing, partial video frame updating, etc.) may improve the end-to-end latency and energy consumption characteristics of some user computing devices, these solutions alone are not adequate for use on resource-constrained user computing devices (e.g., mobile devices, etc.) that run complex software applications (e.g., XR applications, etc.) that include computation-intensive tasks and/or for which the performance, end-to-end latency and/or energy consumption characteristics of device may have a direct, significant, and/or user-perceivable impact on the user experience.

The embodiments include an edge computing system (edge computing platform) that is configured to overcome these and other limitations of conventional solutions, particularly the limitations related to resource shortages on resource-constrained user computing devices (e.g., mobile devices, etc.) that run complex software applications (e.g., XR applications, etc.) and/or for which the performance, end-to-end latency and/or energy consumption characteristics of device may have a direct, significant and/or user-perceivable impact on the user experience.

In some embodiments, the edge computing system may include or work in conjunction with a user computing device, a cloud server and one or more edge devices. The edge computing system may be configured to intelligently and dynamically offload certain tasks (e.g., computationally intensive tasks, etc.) from the user computing device to one or more edge device(s) and/or to a cloud server.

The edge computing system may operate to combine the advantages of remote cloud servers and close-by edge devices to provide a powerful collaborative cloud and edge computing system that improves the performance, end-to-end latency and/or energy consumption characteristics of user computing devices that run RX applications. For instance, traditional cloud servers have robust computational and/or storage capacities but are deployed in remote geographical locations, and thus may suffer from long propagation delays when transmitting large volumes of information (e.g., XR tasks, etc.) through the cloud resources. Edge devices, on the other hand, may not be subject to the same lengthy propagation delays as their cloud server counterparts, but often include much more limited computational and/or storage capacities than their cloud server counterparts.

Thus, the storage and processing capabilities of an edge device may be much more limited than the storage and processing capabilities of a cloud server, but the access times and/or latency characteristics may be much better on an edge device than its cloud server counterpart. An edge computing system configured in accordance with the various embodiments may intelligently and efficiency balance these and other tradeoffs (e.g., between performance and latency). For example, in some embodiments, the edge computing system may be configured to balance tradeoffs between resource capacity and latency by intelligently partitioning, organizing and distributing tasks and information between one or more edge device(s) and the cloud server. In some embodiments, the edge computing system may be configured to balance these and other tradeoffs (e.g., between performance, latency, power consumption, etc.) by implementing and/or using a computing mesh, an application mesh, and/or a connectivity mesh.

In some embodiments, the edge computing system may be configured to store information that is frequently accessed by common objects on an edge database on the edge device. The edge computing system may be configured to store most of the remaining information (e.g., 3D models, annotations of those uncommon objects, etc.) in the cloud server. For example, the edge computing system may store historical access records for each object on the edge device and/or thresholds suitable for evaluating an object's popularity. The edge computing system may use the historical access records and/or thresholds to determine whether to store an object's information on the edge device or on the cloud network. Similarly, the edge computing system may be configured to determine whether to offload certain tasks (e.g., object recognition operations, etc.) from the user computing device to the edge device and/or to the cloud server based on the historical access records and/or thresholds.

As mentioned above, in some embodiments, the edge computing system may include or use a computing mesh, an application mesh and/or a connectivity mesh. For example, the edge computing system may include several edge devices that are connected by wireless or wired communication links and configured to operate as a computing mesh in which the computing resources of each edge devices are shared with one another. When several edge devices in a computing mesh are simultaneously served by the same cloud server, the edge computing system may intelligently and dynamically allocate the available cloud computational resource to each edge device based on their workload, local computation capacities and performance requirements. In some embodiments, this may be accomplished by using convex and/or non-convex optimization tools to solve specific optimization problems and derive a detailed resource allocation policy.

In some embodiments, the edge computing system may be configured to determine whether additional or more cloud computational resources should be allocated to assist edge devices that have less computation capacities and/or heavier workloads in order to balance the resource and workload distributions across the multiple edge devices and/or to improve the platform's overall performance.

In some embodiments, the edge computing system may be configured to divide software applications (e.g., latency-sensitive applications, etc.) into several major classes depending on the computational and application requirements. The most basic example of software application division involves two major classes. The first major class may include applications that require uninterrupted execution that cannot be fragmented, and therefore require full offloading (FO). The second major class may include applications that could benefit from fractional or partial offloading (PO). The edge computing system may formulate and solve a joint optimization problem for each class of applications so as to minimize the overall energy consumption across the sub-network subject to latency, transmission quality, computational budget and/or transmit power constraints.

By performing a joint optimization of the allocation of communication and computational resources and offloading the most time-consuming and/or energy-consuming computations of XR applications to an edge device, the edge computing system may significantly reduce the energy consumption characteristics of the user computing device while meeting the stringent delay requirements for this category of applications.

In some embodiments, the edge computing system may be configured to provide unique content-based image retrieval and multicast delivery from the edge layer to user devices within the coverage area of a computing mesh, application mesh, or connectivity mesh. This unique content-based image retrieval and multicast delivery may substantially improve the end-to-end latency, computational performance, and/or energy consumption characteristics of user devices for a practical and cost-effective delivery of highly immersive XR applications. This unique content-based image retrieval and multicast delivery may also support fully integrating IoT devices and other applications on the edge device to further improve the performance, latency, and energy consumption characteristics of user devices that run XR applications.

In some embodiments, the edge computing system may be configured to run a computing mesh, an application mesh, and/or a connectivity mesh in a container (e.g., for processing XR applications, etc.).

In some embodiments, the edge computing system may be configured to offload the main components of an XR application (e.g., tracker, mapper, object recognizer, etc.) from a user computing device (e.g., mobile device, HMD, etc.) to one or more edge devices of the edge computing system.

In some embodiments, the edge computing system may be configured to offload the main components of an XR application (e.g., tracker, mapper, object recognizer, etc.) to one or more edge computing devices of the edge computing system.

In some embodiments, the edge computing system may be configured to offload the main components of an XR application (e.g., tracker, mapper, object recognizer, etc.) to one or more cloud computing systems.

In some embodiments, the edge computing system may be configured to offload the main components of an XR application (e.g., tracker, mapper, object recognizer, etc.) to one or more edge computing devices and or cloud computing systems.

In some embodiments, the edge computing system may be configured to enforce rules or policies via an edge device and/or at the edge of the network. In some embodiments, the edge computing system may be configured to enforce the rules or policies via a mesh network. In some embodiments, the edge computing system may be configured to manage inputs to applications from different channels with different resolutions (e.g., due to channel conditions, etc.).

In some embodiments, the edge computing system may include, use or work in conjunction with artificial intelligence/machine learning (AI/ML) entities or components. In some embodiments, the AI/ML components may be included in and/or used by an edge device, the edge computing system, in the cloud (remote) or another component or appliance located at the edge of network.

In some embodiments, the edge computing system and/or its component edge devices may be configured to communicate with an AI/ML entity so as to improve rendering decisions locally.

In some embodiments the edge computing system may be configured to perform machine learning operations (e.g., generate feature vectors, apply the feature vectors to machine learning models to generate analysis results, etc.). In some embodiments, the edge computing system may be configured to perform machine learning operations that are enhanced by artificial intelligence.

In various embodiments, the edge computing system may be configured so that a single edge device interacts with a single cloud service, multiple edge devices interact with a single cloud service, a single edge device interacts with a multiple cloud service, that multiple edge devices interact with multiple cloud services, or any combination thereof.

In some embodiments, the edge computing system may be configured to determine the functionalities, capabilities, and resource requirements associated with a particular application. In some embodiments, the edge computing system may be configured to determine whether to run an application locally, within the edge computing ecosystem, in a cloud environment, or some combination thereof based on the determined functionalities, capabilities and/or resource requirements of that application. In some embodiments, the edge computing system may be configured to restrict, limit, or reduce the functions, features, operations, characteristics, or requirements of an application based on the determined functionalities, capabilities and/or resource requirements of that application.

In some embodiments, the edge computing system may be configured to determine the functionalities, capabilities, and resource availability of the components included in or associated with the edge computing system (e.g., edge devices, user computing devices, cloud networks, etc.). In some embodiments, the edge computing system may be configured to restrict, limit, or reduce the functions, features, operations, characteristics, or requirements of an application based on the functionalities, capabilities and/or resource availability of the edge computing system, edge devices, user computing devices, or cloud networks. For example, the edge computing system may determine to reduce the display resolution of the application and/or to display text only in response to determining that all of the edge devices in the edge computing system are operating at or near their processing capacities.

In some embodiments, the edge computing system may be configured to determine the existence or availability of connectivity between any or all of the edge computing system, edge device, user computing device (e.g., mobile device, HMD, etc.), cloud, or any other platform that may be needed, utilized or available to the application. In some embodiments the edge computing system may be configured to restrict, limit, reduce the functions, features, operations, characteristics, or requirements of the application based on the existence or availability of connectivity between any or all of the edge computing system, edge device, user computing device (e.g., mobile device, HMD, etc.), cloud, or any other platform that may be needed, utilized or available to the application.

In some embodiments, the edge computing system may be configured to determine whether there are multiple resource requests. In some embodiments, the edge computing system may be configured to determine the order in which each application is able to obtain the required resources in response to determining that there are multiple resource requests. In some embodiments the edge computing system may be configured to restrict one application in favor of another application that has a higher priority either in resource requirements, latency requirements or policy-based decisions.

FIG. 1 illustrates an example HMD 100 that may be included in or used in conjunction with an edge computing system that is configured in accordance with the various embodiments. In the example illustrated in FIG. 1, the HMD 100 includes a frame 102, optical lenses 104, and has additional capabilities which can include outward facing sensors/cameras 106, inward facing sensors/cameras 108, an image rendering device 110 (e.g., an image projector), frame arms 112, a processor 120, a sensor array 122, a memory 124, and communication circuitry 126. The processor 120 may be communicatively coupled to the sensors/cameras 106, 108, sensor array 122, memory 124, and/or communication circuitry 126 on the HMD 100. In some embodiments, the processor 120 may also be communicatively coupled to processors, cameras, sensors, memory, and/or communication circuitry on a mobile device 130.

The outward facing sensors/cameras 106 may be configured to capture real-world images from a user's physical environment, and send the corresponding image data to the processor 120. The processor 120 may combine the real-world images with computer-generated imagery or virtual objects (VOs) to generate a mixed or augmented scene, and render the scene on the electronic displays or optical lenses 104 of the HMD 100.

The inward facing or gaze-view sensors/cameras 108 may be configured to acquire image data from the user's eyes or the facial structure surrounding the user's eyes. For example, the gaze-view sensors/cameras 108 may be configured to produce small flashes of light (infrared light, etc.), capture their reflections off the user's eyes (e.g., eye socket, corner of the eye, cornea, pupil, etc.), and send the corresponding image data to the processor 120. The processor 120 may use the image data received from the gaze-view sensors/cameras 108 to determine an optical axis for each of the user's eyes, the gaze direction of each eye, the user's head orientation, various eye gaze velocity or acceleration values, changes in angles of eye gaze direction, or other similar gaze-related information.

In some embodiments, the processor 120 may be configured to use localization and mapping techniques, such as simultaneous localization and mapping (SLAM), visual simultaneous localization and mapping (VSLAM), parallel tracking and mapping (PTAM) and/or other techniques known in the art to construct and/or update a map of the viewable environment. For example, the outward facing sensors/cameras 106 may include a monocular image sensor that captures images or frames from the environment. The processor 120 may identify prominent objects or features within the captured image, estimate the dimensions and scale of the features in the image, compare the identified features to each other and/or to features in test images having known dimensions and scale, and identify correspondences based on the comparisons. Each correspondence may be a value set or an information structure that identifies a feature (or feature point) in one image as having a high probability of being the same feature in another image (e.g., a subsequently captured image). Said another way, a correspondence may be a set of image points (e.g., a first point in a first image and a second point in a second image, etc.) that are in correspondence. The processor 120 may produce a homography matrix information structure based on the identified correspondences, and use the homography matrix to determine its pose (e.g., position, orientation, etc.) within the environment. The processor 120 may adjust the rendering of objects within the scene based on its determined pose.

In some embodiments, the HMD 100 may include various additional sensors, such as accelerometer, an altimeter, a gyroscope, a magnetometer, a magnetic compass, an odometer, a pressure sensor, sensors for monitoring physical conditions (e.g., location, motion, acceleration, orientation, altitude, etc.), capacitance touch sensing circuits, and/or sensors for gathering information that is useful for employing SLAM or VSLAM techniques. In some embodiments, the sensors may be external to the HMD 100 and paired or grouped to the HMD 100 via a wired or wireless connection (e.g., Bluetooth®, etc.).

In some embodiments, the sensors in the HMD 100 may be configured to gather information that is useful for employing SLAM techniques in the HMD 100. For example, the HMD 100 may include a quantum photonic device (e.g., QPI, etc.) combines light/display microprocessor technologies and allows for communication with light elements or photons to be performed on the HMD 100. Alternatively or in addition, the HMD 100 may include an optical flow sensor (e.g., a vision chip that includes the image sensor and processor on the same chip or die, etc.) that measures optical flow or visual motion and outputs measurements based on the optical flow/visual motion. An optical flow may identify or define the pattern of apparent motion of objects, surfaces, and edges in a visual scene caused by the relative motion between an observer (e.g., HMD 100, user, etc.) and a scene. Such optical information may be used by the processor 120 to determine visual motion or relative motion between the HMD 100 and real-world objects in the vicinity of the HMD 100. Based on the visual or relative motion of real-world objects, the processor 120 may use SLAM techniques to determine the distance and angle to real world objects. By determining the distance and angle to real world objects, an XR software application (e.g., augmented reality solution, etc.) may determine the virtual distance at which to render items of virtual content so that they appear at an appropriate distance (i.e., focus) relative to real world objects.

In some embodiments, the HMD 100 may include scanners and/or trackers. The scanner/tracker may be configured to acquire a series of images, and register the images relative to one another so that the position and orientation of each image relative to the other images is known, use features (e.g., cardinal points) located in the images to match overlapping areas of adjacent image frames, and determine distances and angles based on the overlapping areas.

In some embodiments, an image rendering device 110 (e.g., image projector) may be embedded in arm portions 120 of the frame 102 and configured to project images onto the optical lenses 104 of the HMD 100. In some embodiments, the image rendering device 110 may include a light-emitting diode (LED) module, a light tunnel, a homogenizing lens, an optical display, a fold mirror, or other components well known projectors or head-mounted displays.

In some embodiments (e.g., those in which the image rendering device 110 is not included or used), the optical lenses 104 may be, or may include, see-through or partially see-through electronic displays. In some embodiments, the optical lenses 104 include image-producing elements, such as see-through Organic Light-Emitting Diode (OLED) display elements or liquid crystal on silicon (LCOS) display elements. In some embodiments, the optical lenses 104 may include independent left-eye and right-eye display elements. In some embodiments, the optical lenses 104 may include or operate as a light guide for delivering light from the display elements to the eyes of a wearer.

It should be understood that any or all of the features, operations, functions, capabilities and/or components described above with respect to the HMD 100 and/or mobile device 130 may be included in, implemented by and/or included in one or more other devices (e.g., the mobile device 130). For example, in some embodiments, the image rendering components and sensors may be located on the mobile device 130, which may send the image or rendering information to the HMD 100 for display.

It should also be understood that, in some embodiments, any or all of the features, operations, functions, capabilities and/or components described above with respect to the HMD 100 and the mobile device 130 may be may be included in, implemented by and/or included in a single device.

In some embodiments the HMD 100 may be an accessory for and/or receive information from a computing device (e.g., the mobile device 130 illustrated in FIG. 1, edge device 202 illustrated in FIG. 2A, etc.), with all or portions of the processing being performed on the processor of that computing device. As such, in various embodiments, the HMD 100 may be configured to perform all processing locally on the processor 120 in the HMD 100, offload all of the main processing to a processor in another computing device, or split the main processing operations between the processor 120 in the HMD 100 and the processor in the other computing device. In some embodiments, the "other" computing device may be a user computing device, an edge device, or a cloud server.

Figure 2A:
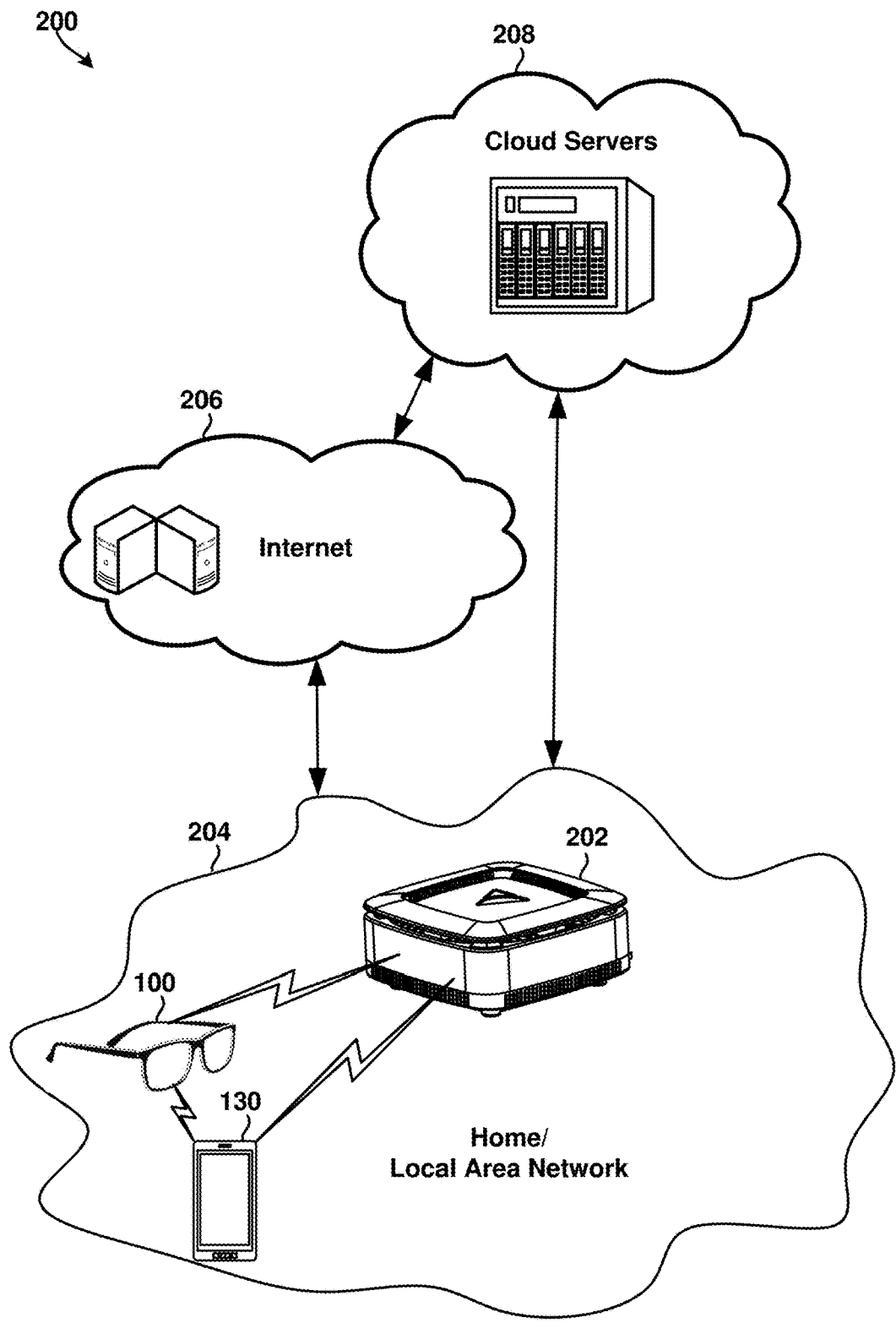
FIGS. 2A through 2C are system block diagrams illustrating distributed edge computing systems that may be configured in accordance with some embodiments to improve the performance, end-to-end latency and energy consumption characteristics of resource-constrained user computing devices (e.g., mobile devices, etc.) that run complex software applications (e.g., extended reality (XR) applications, etc.).
Figure 2B:
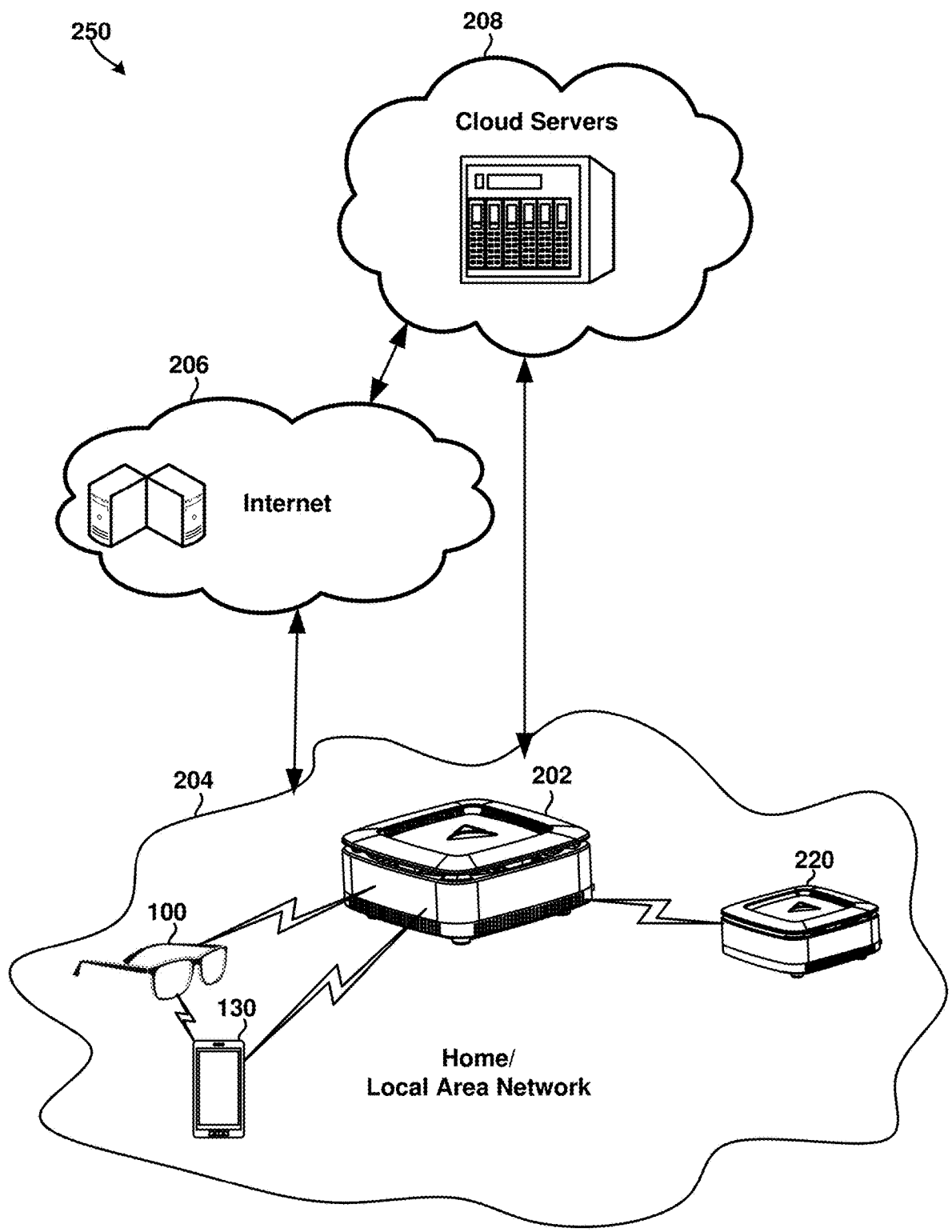
Figure 2C:
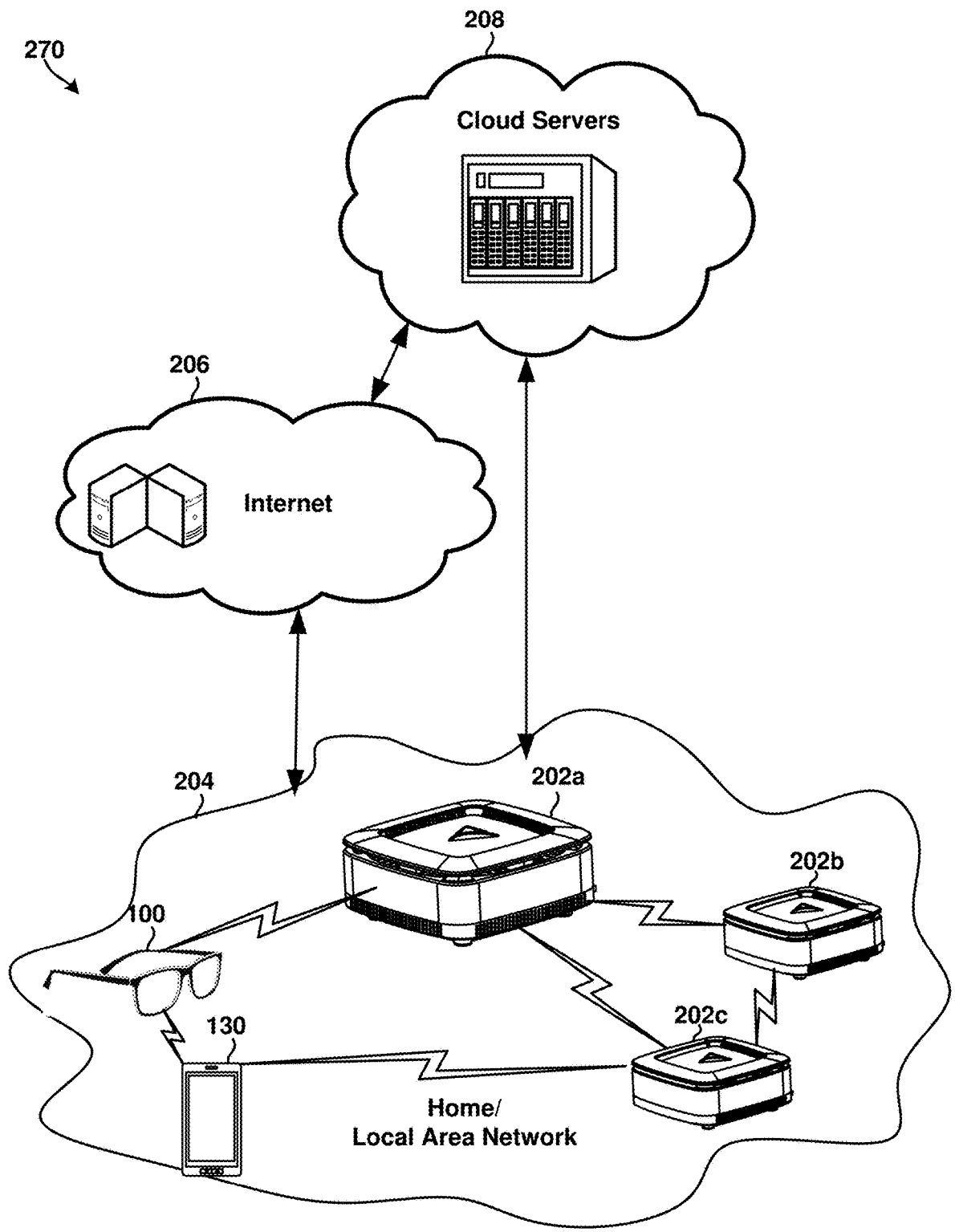

FIGS. 2A-2C illustrate example edge computing systems 200, 250, 270 that could be configured to allow a resource constrained user computing device (e.g., HMD 100, mobile device 130, etc.) to run complex software applications (e.g., XR applications, etc.) in accordance with the various embodiments. In the examples illustrated in FIGS. 2A-2C, the edge computing systems 200, 250, 270 include an HMD 100, a mobile device 130, and an edge device 202a, any or all of which may be included in a home or local area network 204 and linked to the internet 206 and cloud servers 208 via wired or wireless communication links. An edge device 202 may include various antennas, memories, processors, cores, SOCs, SIPs, and other resources and components suitable for processing complex software applications.

In the example illustrated in FIG. 2B, the edge computing system 200 includes a second edge device 202b that is communicatively coupled to the first edge device 202a. The first and second edge devices 202a, 202b may be configured to work in conjunction with one another to offload processing task and/or to implement or perform a computing mesh, application mesh or connectivity mesh.

In the example illustrated in FIG. 2C, the edge computing system 200 includes a third edge device 202c that is communicatively coupled to the first and second edge devices 202a, 202b. The edge devices 202a-202c may be connected to each other in a mesh environment, allowing for optimal route selection and sharing of one or more internet or off-network connections between all the devices.

Figure 3A:
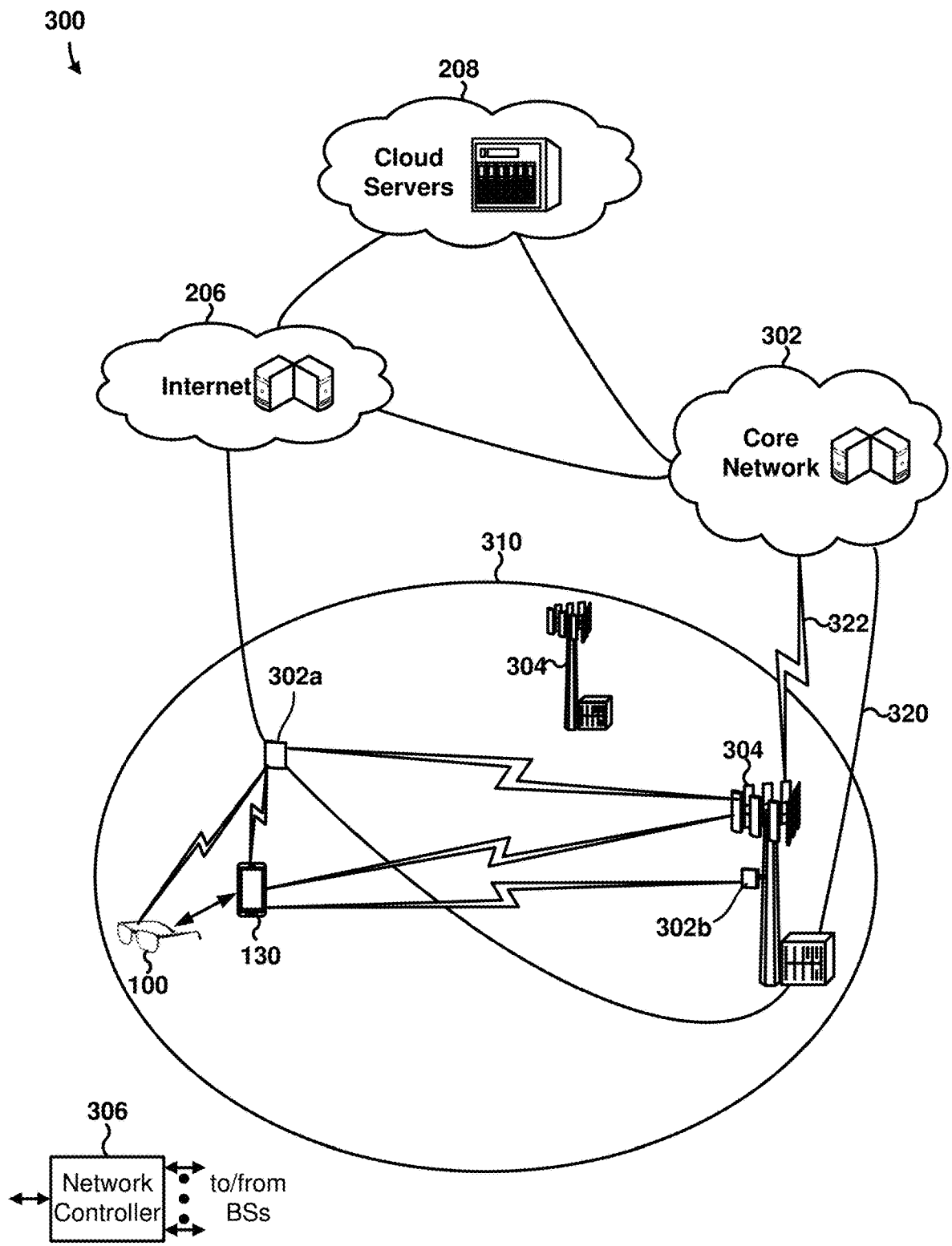
FIGS. 3A and 3B are system block diagrams illustrating other distributed edge computing systems that may be configured in accordance with some embodiments to improve the performance, end-to-end latency and energy consumption characteristics of resource-constrained user computing devices that run complex software applications.
Figure 3B:
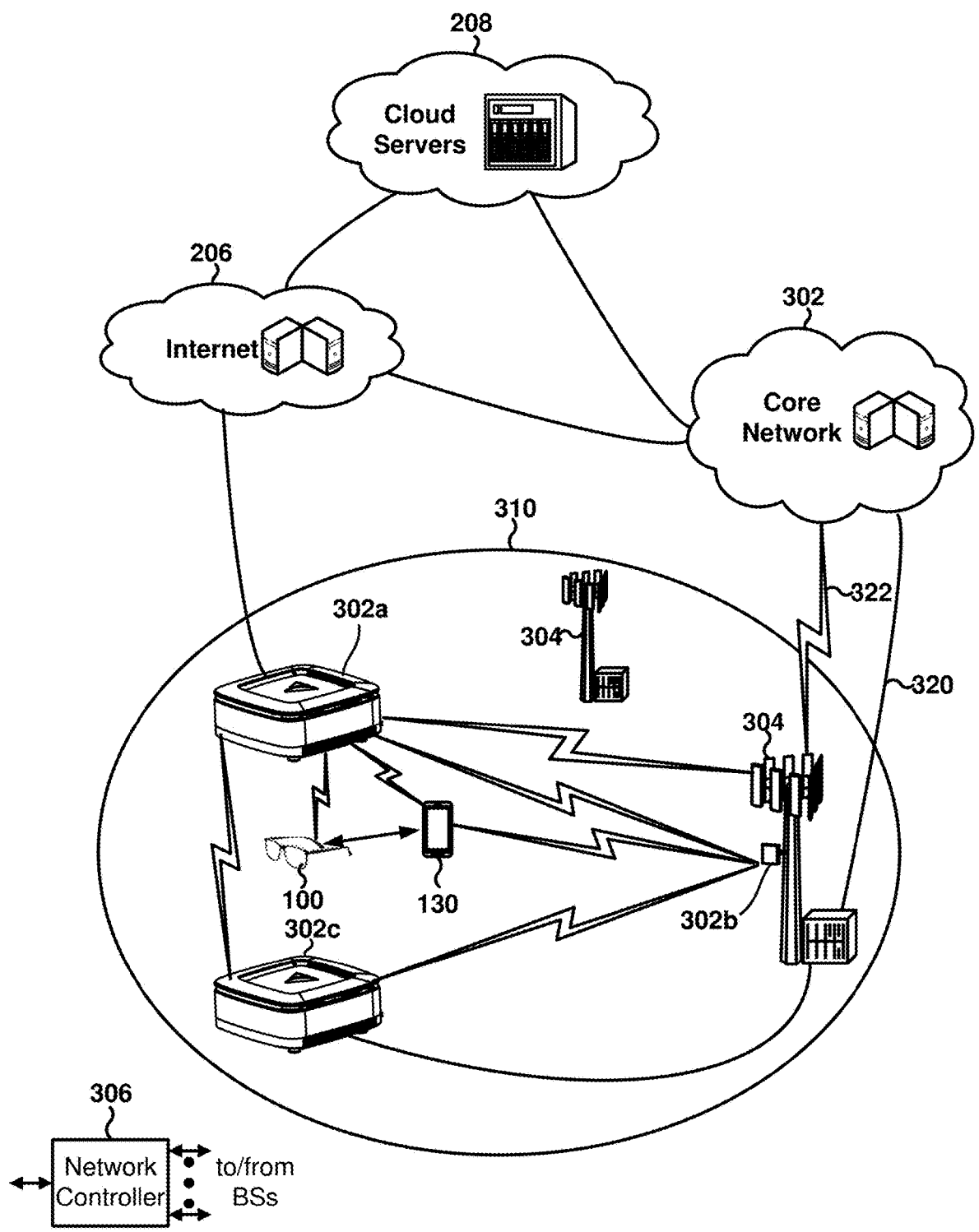

FIG. 3A and FIG. 3B are system diagrams illustrating example communication systems 300, 350 suitable for implementing an edge computing system in accordance with some embodiments. The communications systems 300, 350 may be 5G New Radio (NR) networks, or any other suitable network such as an earlier generation network (e.g., LTE network) or a later generation network that includes the same, similar, or equivalent components. As such, any reference to a 5G network or 5G network elements in the following descriptions is for illustrative purposes and is not intended to be limiting.

With reference to FIG. 3A, the communications system 300 may include a heterogeneous network architecture that includes a core network 302 and a cellular or wireless network 310 that includes a variety of devices, such as the illustrated HMD 100, mobile device 130, edge devices 302a, 302b, and one or more base stations 304. A network controller 306 may couple to a set of base stations 304 and may provide coordination and control for these base stations. The network controller 306 may communicate with the base stations 304 via a backhaul. The base stations 304 also may communicate with one another, for example, directly or indirectly via a wireless or wireline backhaul.

The base station 304 may also be referred to as a Node B, an LTE Evolved nodeB (eNodeB or eNB), an access point (AP), a radio head, a transmit receive point (TRP), a New Radio base station (NR BS), a 5G NodeB (NB), a Next Generation NodeB (gNodeB or gNB), or the like. Each base station 304 may provide communication coverage for a macro cell, a pico cell, a femto cell, another type of cell, or a combination thereof. Some embodiments may include two or more base stations 304 that interconnected to one another as well as to one or more other base stations or network nodes (not illustrated) in the communications system 300 through various types of backhaul interfaces, such as a direct physical connection, a virtual network, or a combination thereof using any suitable transport network.

The core network 302 may be any type core network, such as an LTE core network (e.g., an Evolved Packet Core (EPC) network), 5G core network, etc. The base station 304 may communicate with the core network 302 over wireless or wired communication links 320, 322. The wired communication links 320 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP). The wireless communication links 322 may include a plurality of carrier signals, frequencies, or frequency bands, each of which may include a plurality of logical channels. The wireless communication links 322 may utilize one or more Radio access technologies (RATs), such as 3GPP LTE, 3G, 4G, 5G, GSM, CDMA, WCDMA, WiMAX, Time Division Multiple Access (TDMA), and other mobile telephony communication technologies cellular RATs. Further examples of RATs that may be used in one or more of the various wireless communication links within the communication system 300 include medium range protocols such as Wi-Fi, LTE-U, LTE-Direct, LAA, MuLTEfire, and relatively short range RATs such as ZigBee, Bluetooth, and Bluetooth Low Energy (LE). Additionally, wired communication links 125 may be established between devices in the communications system 300 via physical wired connections between devices, such as such as universal serial bus (USB) connections, peripheral component interconnect express (PCIe) connections, universal serial bus (USB) connections, high speed inter-chip (HSIC) connections, Ethernet connections, etc.

The HMD 100 and mobile device 130 may be resource-constrained user computing devices. Some mobile devices 130 may be considered machine-type communication (MTC) or Evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of- Things (IoT) devices or may be implemented as NB-IoT (narrowband internet of things) devices.

In some embodiments, two or more wireless devices may communicate directly using one or more sidelink channels (for example, without using a base station 304 as an intermediary to communicate with one another). For example, the HMD 100, the mobile device 130 and/or the edge devices 302a, 302b may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a C-V2X protocol, Bluetooth communications, Wi-Fi communications, a mesh network, or similar networks, or combinations thereof. In some embodiments, the mobile device 130 and/or the edge devices 302a, 302b may be configured to perform scheduling operations, resource selection operations, as well as other operations described elsewhere herein as being performed by a base station 304. The communications between the two or more wireless devices (e.g., HMD 100, mobile device 130, and/or the edge devices 302a, 302b, etc.) may establish a wireless local area network (WLAN) between the two or more wireless devices. In some embodiments, two or more wireless devices may be connected together by one or more wired connections (e.g., via USB connections, PCIe connections, etc.) and may communicate directly using wired communication links when physically connected.

In some embodiments, one or more cloud servers 208 may provide data to, and/or receive data from, one or more of the wireless devices 100, 130 via the core network 302. The cloud servers 208 may send IP packets to the wireless devices (e.g., HMD 100, mobile device 130, and/or the edge devices 302a, 302b, etc.) in downlink (DL) streams and/or receive IP packets from the wireless devices in uplink (UL) streams. As a specific example, in a DL stream, IP packets from the cloud servers 208 may be sent to the core network 302 by an edge router, the core network 302 may send the IP packets to the base station 304 for transmission to the wireless device 130, and the wireless device 130 may receive the IP packets and send the IP packets to the HMD 100 (e.g., via a Wi-Fi transmission). Similarly, in a UL stream, IP packets from the HMD 100 may be sent to the wireless device 130 (e.g., via a Wi-Fi transmission), the wireless device 130 may send the IP packets to the base station 304 (e.g., via 5G UL data transmissions), and the base station 304 may send the IP packets to the core network 302 for forwarding to the cloud servers 208.

FIG. 3B illustrates that, in some embodiments, the system may include multiple edge devices 302a-302c configured to implement, provide, generate, create, use, or operate in a mesh environment in which the edge devices, 302a, 302b and 302c are connected to one other and/or to any of the other illustrated components (e.g., internet 206, cloud servers 208, base stations 304, etc.) via wired and/or wireless communication links. As such, in some embodiments, the edge devices 302a-302c may implement, create or use a computing mesh, application mesh, or connectivity mesh that includes a combination of wired and wireless communication links.

Figure 4:
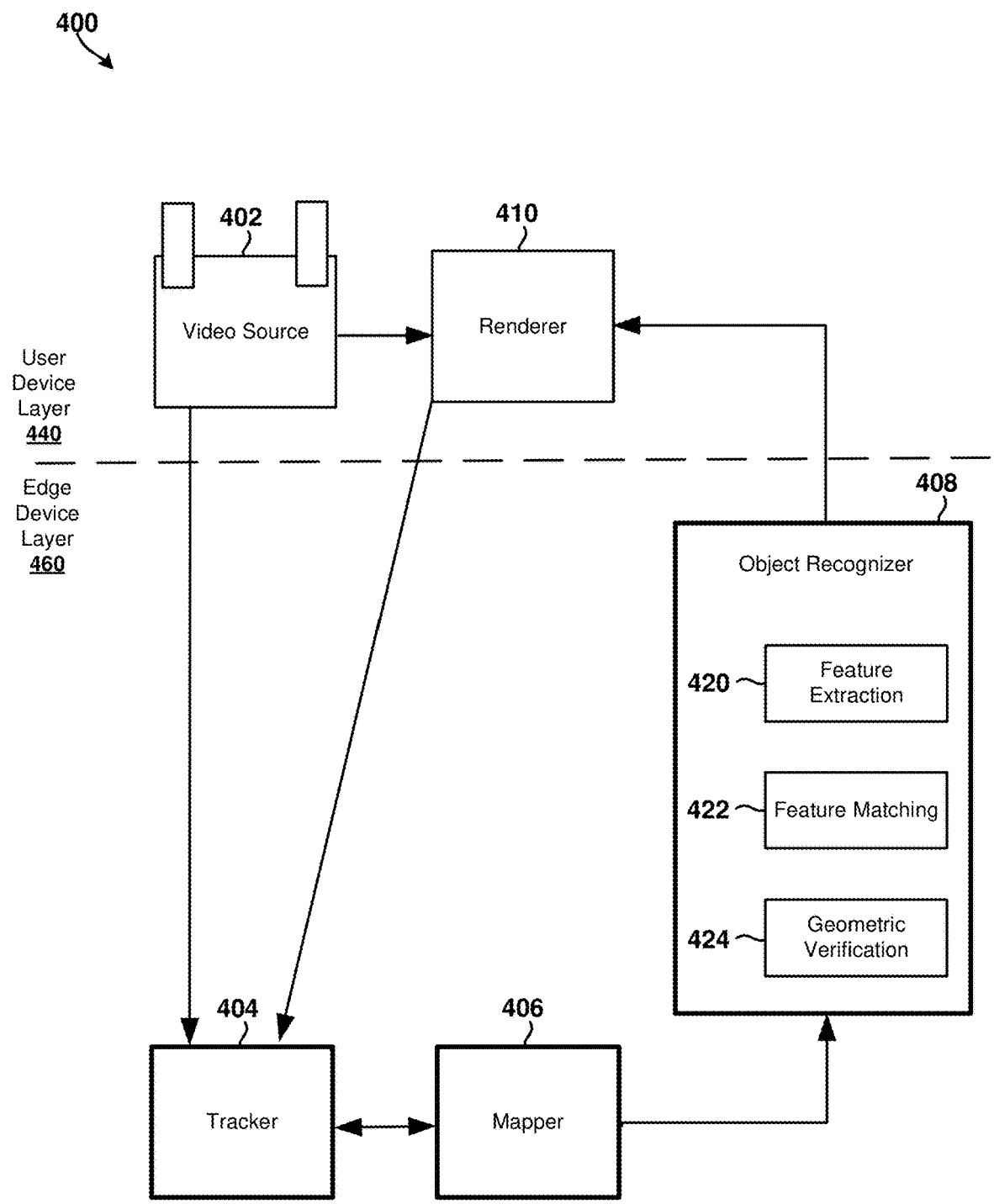
FIG. 4 is a component block diagram of a distributed edge computing system in which the functions of an XR application are distributed between a user device and at least one edge device in accordance with some embodiments.

FIG. 4 illustrates an edge computing system 400 suitable for running XR applications (which may combine immersive computer-generated and sensor-extracted data to superimpose virtual images onto the physical reality for delivery on screen of a user device) in accordance with some embodiments.

In the example illustrated in FIG. 4, the system 400 includes a video source component 402 and a renderer component 410 within a user device layer 440. The system 400 also includes a tracker component 404, a mapper component 406, and an object recognizer component 408 within an edge device layer 460. The object recognizer component 408 may include a feature extraction component 420, a feature matching component 422, and a geometric verification component 424. These components 402-424 may coordinate or collaborate closely to perform an integrated XR process/task. In some embodiments, the tracker component 404 and the mapper component 406 may be combined into a single tracker-mapper component (not illustrated separately).

Generally, the operations performed by the tracker component 404, mapper component 406 and the object recognizer component 408 are much more computationally intensive than the operations that are performed by the video source component 402 and the renderer component 410. On the other hand, the operations performed by the video source component 402 and/or the renderer component 410 may be much more latency sensitive than those performed by the tracker component 404, mapper component 406 or object recognizer component 408. As such, the example illustrated in FIG. 4, the computationally intensive tracker component 404, mapper component 406 and/or object recognizer component 408 are offloaded to the edge device layer 460 (e.g., to an XR application server on an edge device, etc.). On the other hand, for improved latency characteristics, the video source component 402 and the renderer component 410 continue to operate in the user device layer 440 (e.g., on a resource-constrained user computing device such as the HMD 100 or mobile device 130 discussed above, etc.).

The video source component 402 may be configured to obtain raw video frames from a sensor/camera (e.g., the outward facing sensors/cameras 106 of the HMD 100 illustrated in FIG. 1). The video source component 402 may clip these videos into frames with specific image format (e.g., JPEG, PNG, etc.) and send the frames to the tracker component 404.

The tracker component 404 may be configured to determine and track the position of the user (or the user's face, eyes, etc.) with respect to the environment. For example, the tracker component 404 may determine or compute the user's position with respect to his or her physical surroundings, generate tracking information based on the user's determined position, and send the tracking information to the mapper component 406.

The mapper component 406 may be configured to build a model of the environment. For example, the mapper component 406 may determine or generate virtual coordinates of the environment based on the tracking information received from the tracker component 404, and send the model and/or virtual coordinates to the object recognizer component 408.

The object recognizer component 408 may be configured to perform object recognition operations and identify known objects in the environment (e.g., based on the model). For example, the object recognizer component 408 may perform robust feature analysis operations to identify internal objects in video frames, estimate the dimensions and scale of the features in the image, compare the identified features to each other and/or to features in test images having known dimensions and scale, and identify correspondences based on the comparisons, produce a homography matrix information structure based on the identified correspondences, use the homography matrix to determine position and pose (e.g., position, orientation, etc.) within the environment, and generate augmented object information based on the identified objects (or correspondences, determined pose, etc.). In some embodiments, the object recognizer component 408 may be configured to store the generated augmented object information in an edge device (e.g., edge devices 202, 302a-b, etc.) or in a cloud database (e.g., cloud server 208, etc.).

As another example, the feature extraction component 420 of the object recognizer component may search its inherent salient interest points in response to determining that a new image has been input into the graphics module of the edge device. Salient interest points are information units that may be used to estimate the similarity between the new image and the standard images pre-stored on the edge device and/or on cloud databases. The feature extraction component 420 may obtain typical features by applying robust feature descriptors, such as scale invariant feature transform (SIFT) or oriented rotated binary robust independent elementary features (ORB). SIFT requires a graphics module, whereas ORB and its variants do not require a graphics module.

The feature matching component 422 may include, implement or perform a pairwise feature matching algorithm based on the obtained features. Conventional pairwise feature matching may require directly comparing or matching an input image to all standard images, and thus may consume a lot of time and computational resources. To address this issue, some embodiments may pre-store a standard image feature data structure that stores the features of all standard images with particular indices on the edge device or cloud database. The feature matching component 422 may compare the extracted features with those in the pre-stored standard image feature data structure, generate a filtered shortlist of candidate images based on the comparison results, perform pairwise feature matching between only the input image and the candidate images that are included in the filtered shortlist, and select the best matched standard image from the filtered shortlist. These operations may substantially and significantly reduce image retrieval delays associated with conventional feature matching solutions, and improve the performance and functioning of the edge device and/or user computing device.

After obtaining the best-matched standard image, further examination may be required to confirm whether the matching result is correct. The geometric verification component 424 may test whether the input image and the best-matched standard image are similar with only geometric and photometric distortions. In response to determining that the verification result is correct, the geometric verification component 424 may establish the matching relation. In response to determining that the verification result is not correct, the geometric verification component 424 may offload the input image and its features to the cloud server to perform the search function.

The renderer component 410 may be configured to prepare the processed image/video frames for rendering on an electronic display of a wireless device (e.g., HMD 100, mobile device 130, etc.). The renderer component 410 may adjust the rendering of objects within the scene based on images received from the video source component 402 and/or augmented object information received from the object recognizer component 408, edge device, or cloud database. The renderer component 410 may send updated object rendering information to the tracker component 404.

As an example, the renderer component 410 may be configured to retrieve augmented object information from an edge device and/or cloud database, mix the retrieved augmented object information with original videos to generate display results, and render the display results on an electronic screen of a resource-constrained user computing device (e.g., HMD 100, mobile device 130, etc.) to deliver an interactive and immersive user experience overlayed on the physical world either seen through the camera, pre-stored content on the user device or both.

The system 400 described above may allow the user device (e.g., HMD 100, mobile device 130, etc.) to utilize the computation and storage resources of the cloud server 208 and/or edge device(s) 202, 302 to improve the accuracy of object recognition and/or otherwise improve the performance, end-to-end latency, and energy consumption characteristics of the user device.

In some embodiments, after the mapper component 406 and object recognizer component 408 are offloaded onto the edge device, these components 406, 408 commence collecting inputs from all user devices and/or cameras located in the same area, thereby limiting the transmission of redundant information in the uplink across users. In some embodiments, the edge device may be configured to multicast the output or outcome of these components 406, 408 to other user devices in close physical proximity of where XR content is being delivered in the downlink. Through a fully integrated computing and communications, optionally with a full security stack through a Tunneled/Tiered Private Network (e.g., vTPN) that allows for isolating traffic to and from specific end devices, XR applications may be developed and deployed in one compact package at a fraction of the cost of the typical solutions employed with a multitude of point solutions integrated at the edge to serve a specific XR application.

In some embodiments, the user device and the edge device illustrated in FIG. 4 may be one device. In some embodiments, the object recognizer 408, mapper 406 and tracker 404 may reside in multiple devices utilizing a distributed architecture for computational efficiency and resiliency. In some embodiments, the object recognizer 408, mapper 406 and tracker 404 may reside in the user device. In some embodiments, the object recognizer 408, mapper 406 and tracker 404 may reside in separate edge devices connected together in a mesh environment connected through wireless or a wired connection or a combination of wireless and wired.

Figure 5A:
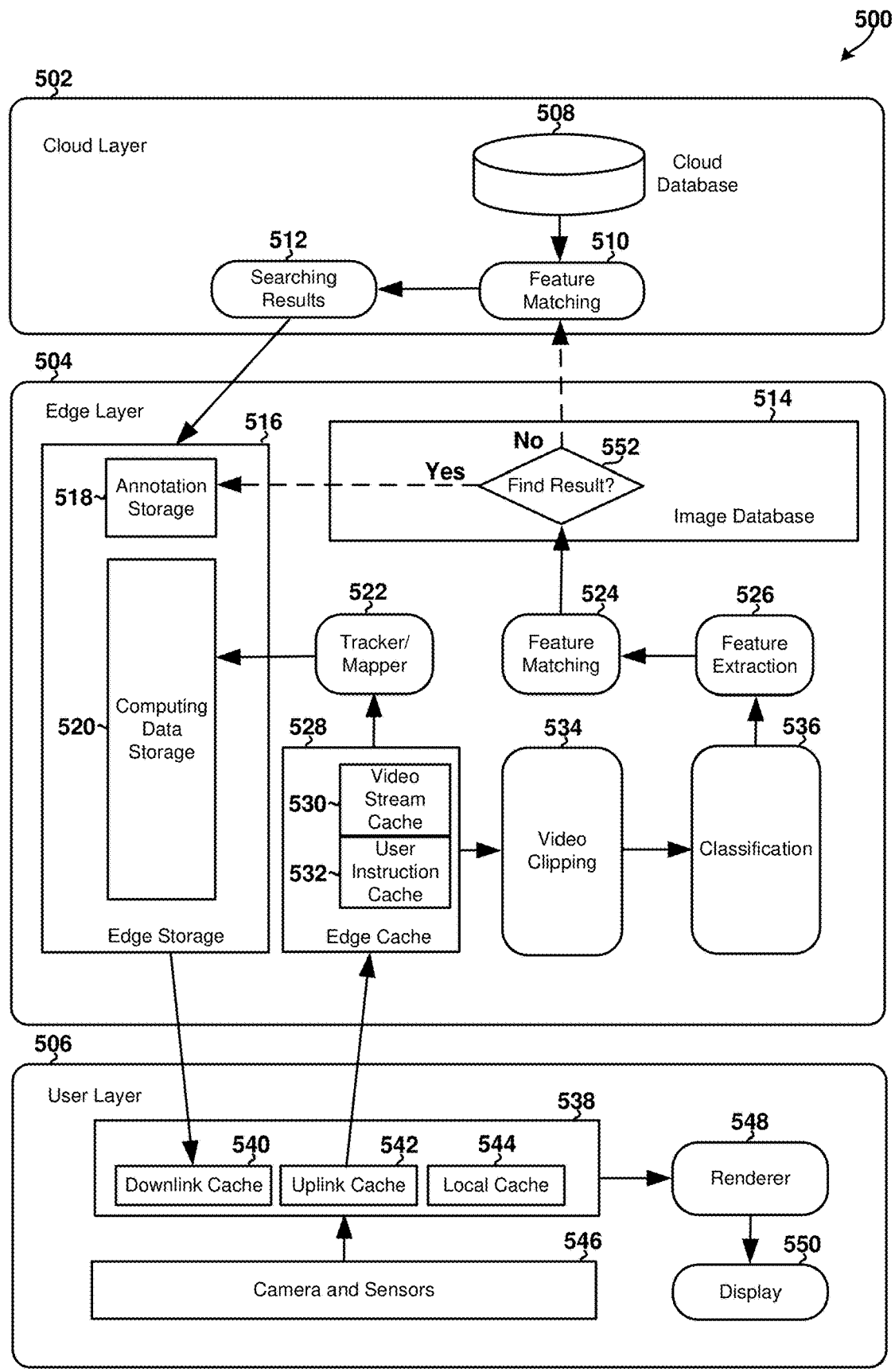
FIGS. 5A through 5C are component block diagrams of distributed edge computing systems in which the functions of an XR application are distributed between a cloud layer, an edge layer and a user layer in accordance with some embodiments.
Figure 5B:
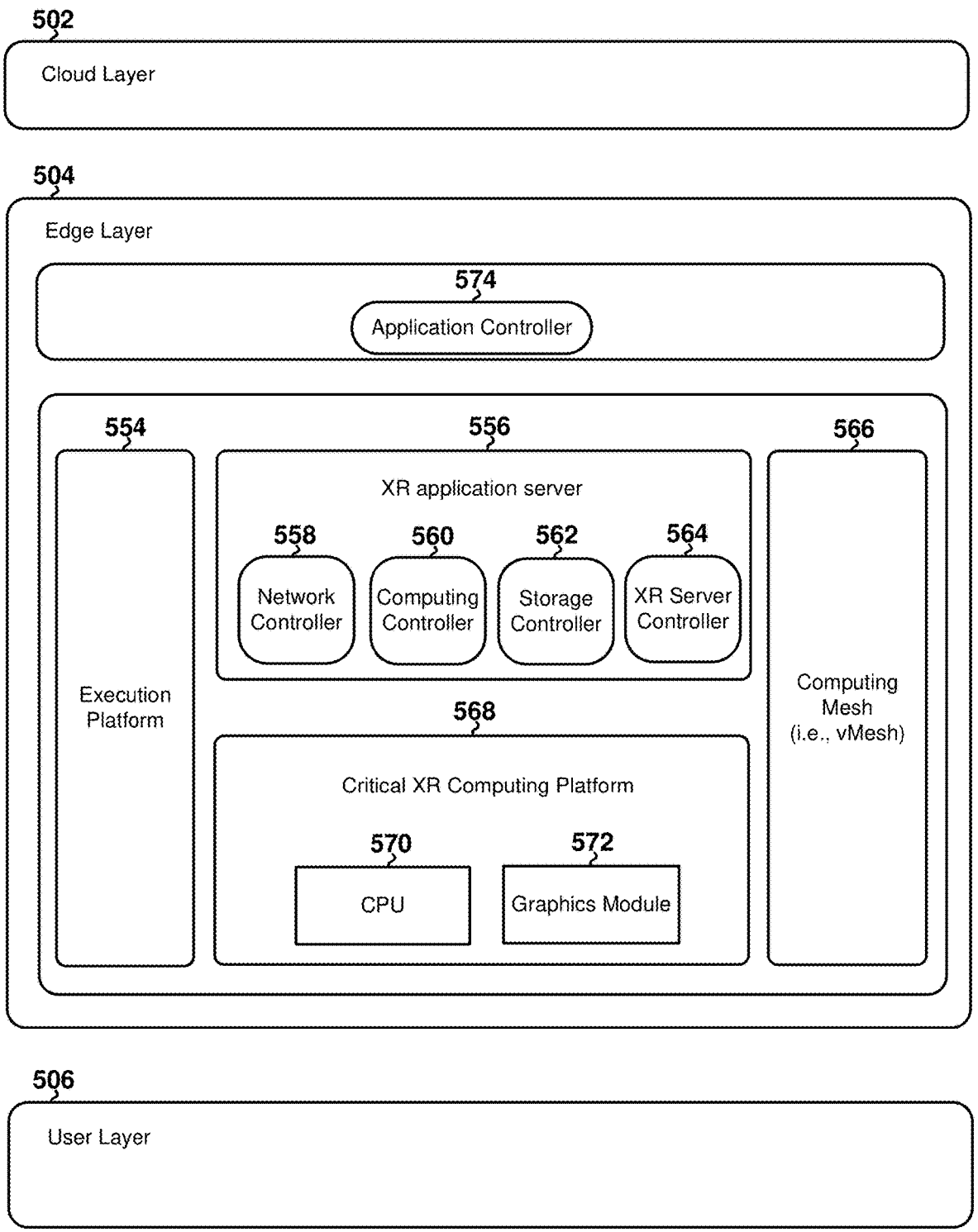
Figure 5C:
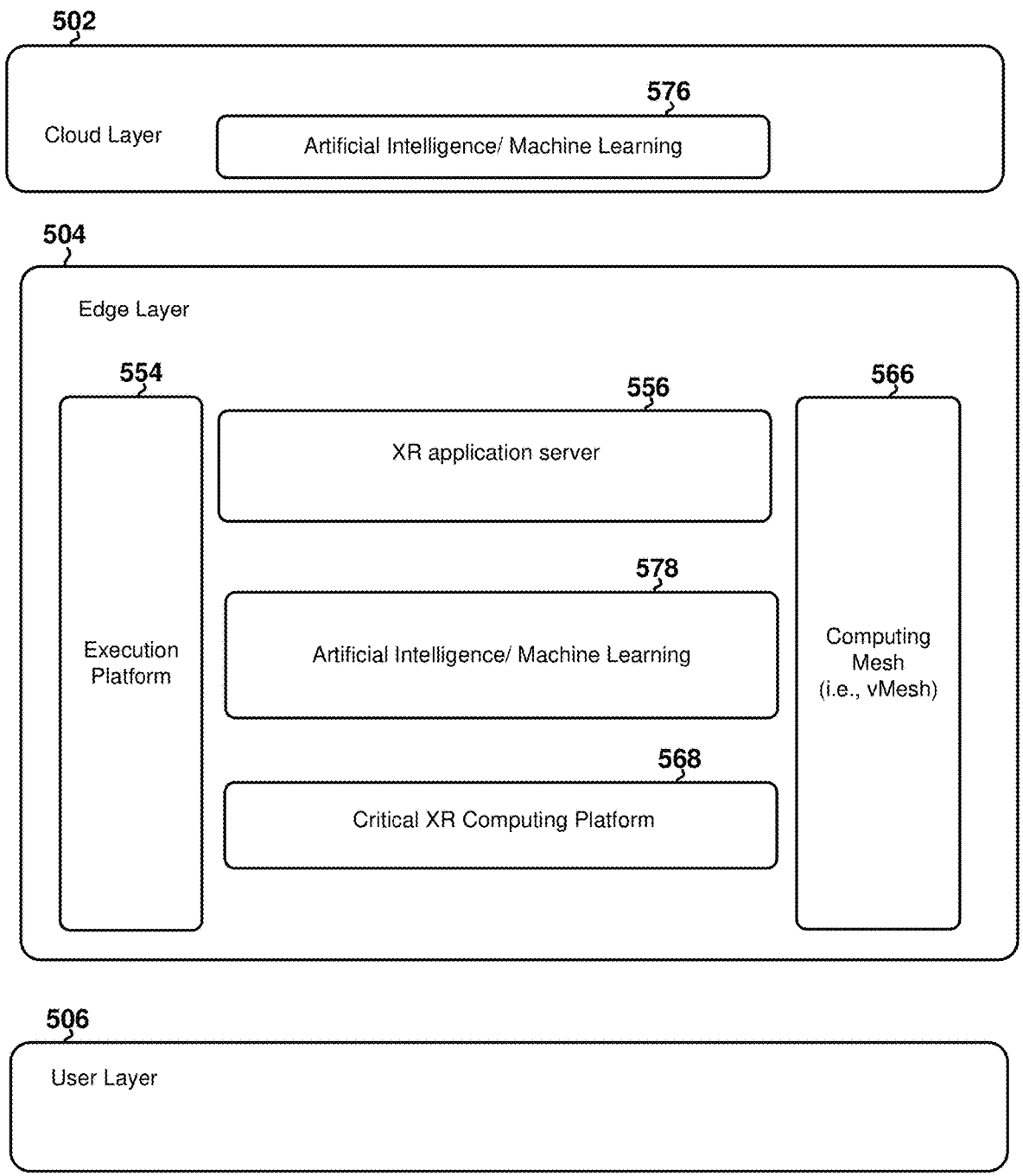

FIGS. 5A-5C illustrate an example edge computing system 500 (e.g., systems 200, 300, etc.) that is divided into layers 502, 504, 506 in accordance with some embodiments. For example, in a multi-user XR scenario in which several XR applications are executed simultaneously, the end-to-end implementation may be based on a hierarchical architecture that includes a cloud layer 502, an edge layer 504, and a user layer 506. The cloud layer 502 may include cloud servers (e.g., cloud server 208, etc.), the edge layer 504 may include one or more edge devices (e.g., edge device 202, 302, etc.), and the user layer 506 may include resource constrained user computing devices (e.g., HMD 100, mobile device 130, etc.).

In the example illustrated in FIG. 5A, the cloud layer 502 includes a cloud database 508, a feature matching component 510, and a searching results component 512. The edge layer 504 includes an image database 514 (which includes a find result component 552), edge storage 516 (which includes an annotation storage 518 and a computing data storage 520), a tracker/mapper component 522, a feature matching component 524, a feature extraction component 526, an edge cache 528 (which includes video stream cache 530 and a user instruction cache 532), a video clipping component 534, and a classification component 536. The user layer 506 includes a cache component 538 (which includes a downlink cache 540, an uplink cache 542, and a local cache 544), a cameras and sensors component 546, a renderer component 548, and a display component 550.

FIG. 5B illustrates that, in some embodiments, the edge layer 504 may include an execution platform 554, an XR application server 556 (which may include a network controller 558, a computing controller 560, a storage controller 562, and an XR server controller 564), all or portions of a computing mesh (i.e., vMesh) 566, and a critical XR computing platform 568 (which may include an onboard or off-board processor/CPU 570, graphics module 572, GPU, etc.).

In some embodiments, the edge layer 504 may further include an application controller 574. The application controller 574 may be included in any or all of computing devices or edge devices 202*a-c*, 302*a-c* in the system, regardless of whether those devices include any of the components illustrated in FIGS. 5A-C or perform any of the tasks or operations discussed with respect to FIG. 5A-5C.

FIG. 5C illustrates that, in some embodiments, the cloud layer 502 and/or the edge layer 504 may include one or more artificial intelligence/machine learning components 576, 578. In various embodiments, the operations of the artificial intelligence/machine learning component 578 may be performed by a single edge device, performed by many edge devices as part of a computing mesh, or by another computing device or system in communication with one or more of the edge devices.

It should be understood that the location of the various elements in FIGS. 5A-5C are illustrative purposes only, and that in the various embodiments, any or all of the illustrated components may be included in a single computing device or across many computing devices (e.g., many edge devices, etc.) in a distributed mesh environment.

The cloud layer 502 may include large databases (e.g., cloud database 508, etc.) for data storage and abundant or robust computational resources for processing XR tasks. The cloud layer 502 could be used in conjunction with the user layer 506 (but without the edge layer 504) to implement some XR applications, but such a computing system could suffer from long processing delays and high energy consumption in user device (e.g., for delivery of fully immersive experiences for mobile users, etc.). The inclusion and use of the edge layer 504 in accordance with the various embodiments may allow all or portions of the computational tasks of the XR applications to be jointly processed in any or all of a local user device (e.g., HMD 100, mobile device 130, etc.), one or more edge devices (e.g., edge device 202, 302, etc.) and/or a cloud server (e.g., cloud server 208, etc.). This allows the edge computing system 500 to overcome many of the limitations of conventional solutions, particularly the limitations that relate to resource shortages on resource-constrained user computing devices and/or propagation delays associated with cloud computing.

The edge layer 504 may operate between the cloud layer 502 and the user layer 506. The edge layer 504 may include a distributed computing environment with an application mesh supported by a multi-protocol communications mesh that not only delivers the desired content to user devices efficiently, but also offers direct or indirect (through the edge device) interactions with sensors (e.g., IoT sensors, etc.) in the surrounding environment of user devices. This opens up a large number of possibilities, especially when combined with machine learning, artificial intelligence (AI) and voice user interface (VUI). Edge devices may initially connect to user devices (e.g., HMD 100, etc.) through Wi-Fi connections and/or through 4G or 5G small cell stack module(s) or some other wireless protocol. The edge devices may also connect to the user devices through a physical connection like ethernet or some other protocol utilizing a physical connection.

The user layer 506 may include multiple user devices (e.g., HMD, etc.), any or all of which may connected to the edge layer 504 through wireless links (e.g., Wi-Fi or 4G/5G). The edge layer 504 may also be physically attached to the user layer 506 through a connector method that allows the edge layer 504 to be directly associated with a particular user layer 506.

In some embodiments, the edge computing system 500 may be configured to perform joint communication and computation resource allocation operations.

In centralized XR systems, the edge layer 504 may be configured to acquire and maintain both user priority and channel state information. The edge layer 504 may also be configured to prioritize traffic based on the application requirements in real time so as to maximize the resources available through a dynamic resource allocation scheme. Such a dynamic resource allocation scheme which may add or remove resources in a dynamic real time process, enabling better edge performance as well as ensuring that the local computing resources are used to the fullest extent (e.g., rather that off-loading application processing to the cloud layer 502, etc.).

In some embodiments, the network controller 558 and the computing controller 560 may be configured to collaboratively execute a resource allocation policy by optimizing a specific objective function, such as minimizing the end-to-end latency under a prescribed resource utilization constraint, maximizing the mobile energy efficiency under an offloading latency constraint or a maximally optimized combination of both constraints. Moreover, the network controller 558 and the computing controller 560 may monitor the specific requirements of different XR tasks in real-time and adaptively adjust the resource allocation to meet the diverse user demands according to certain policies that establish priorities according to certain criteria (e.g., those associated with different tasks or use cases, different classes of users, event triggers, etc.).

In some embodiments, the computing mesh 566 may be distributed and managed across all mesh nodes, further extending the collaborative cloud and edge computing capability across an entire edge network. The computing mesh 556 may include both wireless and wired connectivity. In this hierarchical architecture, the edge layer 504 may include two functionalized components, namely, the execution platform 554 and the XR application server 556. The execution platform 554 may encompass the entire functionality of the edge device and/or support the XR application server 556. The execution platform 554 may include or support connectivity and networking functions, server, storage and any graphics module running on the edge device and/or off to the side (e.g., one integrated with a camera serving the XR application) but excluding the XR application server 556. The execution platform 554 in the edge layer 504 may be designed to seamlessly collaborate with the other two layers 502, 506. This unique application of an edge device and/or edge layer 504 may benefit from the convergence of communication, computing, control and storage on one edge device.

The execution platform 554 may provide core capability, such as processing offloaded XR tasks from mobile users. The execution platform 554 may provide a real-time communications "bridge" with the user layer 506 and the cloud layer 502. Multiple user devices may offload computational tasks of the XR application(s), starting with delivery of video streams to the edge layer's 504 execution platform 554 for further processing. Ultimately, the results of the computation performed by execution platform 554 and the cloud layer 502 may be multicasted to the corresponding users through the communication network. The data collected by the edge layer 504 (e.g., data stored in the edge cache 528 illustrated in FIG. 5A), may be delivered to a critical XR computing platform 568 for further processing.

As mentioned above, the critical XR computing platform 568 may include a computing module supported by the CPU 570 and graphics module 572. The CPU 570 may be utilized to process the computing-related tasks, such as tracking and mapping, while the graphics module 572 may be utilized to process the graphics-related tasks like object recognition.

In some embodiments, the XR application server 556 may be a virtualized application that provides a controller function and/or operates as the "centralized coordinator" of the entire edge layer 504. The virtualization of the application may be accomplished by running/executing the application on the edge layer 504 in another edge device or projected to the cloud layer 502. Through distributing the various applications or sub components of the application a more efficient collective computing environment may be achieved, leveraging all the available resources required to process and deliver the service the application is meant to perform.

In the example illustrated in FIG. 5B, the XR application server 556 is divided into four specific components: the network controller 558, the computing controller 560, the storage controller 562, and the XR server controller 564. In some embodiments, the storage controller 562 and the XR server controller 564 may be included in and/or operate on one edge device, and the network controller 558 and the computing controller 560 may be included in or operate on a different edge device. Based on the application being run and the required performance needed different functions of the application may be distributed to the appropriate node for optimum performance.

The network controller 558 may be configured to manage all network activities among the three layers 502-506, such as network establishment and data transmission.

The computing controller 560 may be configured to supervise the entire process in the execution platform 554 while it optimally allocates the available computational resource to each XR task with specific requirements. The computing controller 560 may evaluate the inherent executive priorities and collaborative properties of XR tasks from different users.

The storage controller 562 may be configured to support the memory management function of the edge database for fast data searching and updating.

The XR application controller 556 may monitor the behaviors of the network controller 558, computing controller 560, and storage controller 562. The XR application controller 556 may coordinate among the controllers to maximize efficient operations at the edge layer 504.

Generally, the user layer 506 is responsible for executing the local operations for delivering the immersive experience. One or multiple XR device(s) simultaneously start with sensing real environment, producing raw videos, and capturing users' gestures via their cameras and sensors. Through identification analysis, this original information may be transformed into two categories: the video streams that contain the raw video data and the operation instructions which carry the specific requirements of mobile users, such as object identification or sentiment analysis. Thereafter, this information may be further duplicated after wireless transmission to the edge device with one copy stored in the edge layer 504 cache and, to the extent of available memory, the other stored in the local user device cache for subsequent processing.

The edge layer 504 plays a critical role in computing XR applications. Upon receiving the offloaded data from user devices, the execution platform 554 may first classify them into two kinds: the raw video streams and the user's operation instructions. The execution platform 554 may deliver the raw video streams and the user's operation instructions to the edge layer 504 cache for separate storage. Thereafter, the raw video streams and the user's operation instructions may be delivered to the tracker component 404, mapper component 406, tracker/mapper component 522, and/or video clipping component 532.

The tracker component 404, mapper component 406, or tracker/mapper component 522 may then track users' locations and build virtual coordinates to coincide with the real world via SLAM or Parallel Tracking and Mapping (PTAM).

A video source component (e.g., video source component 402) may clip and slice one representative frame (or image) from each raw video for subsequent processing. It may be noted that some users may observe the same object within the wireless coverage area and require the same information of this object for the XR application. Since XR tasks require 3D-models and annotations of the recognized objects, a distributed database on one or more edge devices at the edge layer 504 may be used for storing the object information that is frequently accessed.

For the video content cached at the edge layer 504, classifiers may be leveraged to sort all frames from different video streams into several categories based on the inherent information, such that each category contains those frames of the same object. This function may be implemented via couple of well-known machine learning algorithms, i.e., Convolutional Neural Networks (CNN) and Support Vector Machines (SVM).

Afterwards, one typical image of each category may be picked out and utilized to match with the standard images pre-stored in the edge database through an image retrieval method as discussed previously. This means that the inherent collaborative properties of XR applications may be fully utilized, and redundant computations may be effectively avoided. Then, if the matched standard image is found in the edge database, the corresponding annotation information will be fetched from the adjacent edge storage. Otherwise, the related frame may be offloaded to the cloud server for further processing.

The cloud layer 502 may contain a large cloud database for storing the additional data that are not cached in the edge layer 504 due to its limited memory size. If the retrieval operation at the edge layer 504 fails the corresponding image may be offloaded to the cloud layer 502 for further search functions to be performed.

Owing to the adequate computational resources and substantial storage at the cloud layer 502, in some embodiments, image retrieval may be achieved without resource constraints. Information requested from the cloud layer 502 may be transmitted back to the edge layer 504, and combined with a virtual map (reconstructed by the tracker component 404, mapper component 406, or tracker/mapper component 522) to generate total computation results. The total computation results may be multicasted to the corresponding devices, and presented to the users after mixing with the original videos via the local renders (e.g., renderer component 410, 548, etc.).

With this design, access to the remote cloud database is minimized, which may significantly reduce the end-to-end latency through utilizing cloud layer 502 as a data base retrieval system while performing the analytics and other computational requirements within the edge layer 504. Meanwhile, the communication resources of the wireless network and the computational resources of the edge/cloud servers may be shared by all user devices within the coverage area of a computing and communication mesh network.

The collaborative hybrid cloud and edge computing supported by the edge computing systems discussed in this application, along with the unique content-based image retrieval and multicast delivery from the edge layer 504 to user devices within the computing mesh 566 coverage area, may substantially improve the end-to-end latency, improve computational performance, and improve energy consumption performance of user devices to the extent required for a practical and cost-effective delivery of highly immersive XR applications that may be further enhanced by fully integrated IoT and other applications supported on the edge device.

In some embodiments, the collaboration among edge device mesh nodes and the cloud resources may be facilitated by KubeEdge using containers, which extends native application orchestration and device management from the cloud layer 502 to edge device units operating at the edge layer 504 for orchestration of containerized XR Application Servers. KubeEdge may include CloudCore and EdgeCore, is built upon Kubernetes, and provides core infrastructure support for networking, application deployment and metadata synchronization between the cloud layer 502 and edge layer 504.

In some embodiments the various XR functions may be performed through the use of containers, like "containerd" or similar function.

KubeEdge also supports MQTT and allows developers to author custom logic and enable resource constrained device communication at the edge. The use of MQTT enables a distributed architecture where one edge device can publish the data to another edge device in the communication cluster enabling functions to be distributed and allowing for different edge devices to have specific functions to improve overall performance instead of having each edge node replicate the functions and therefore operate in a less efficient manner than distributing the various functions for improved processing and resource performance.

In the case of wide area with multiple mesh networks supporting a distributed XR systems, when the information that the network controller 558 and the computing controller 560 that typically offer is no longer available on any given mesh, game-theoretical techniques may be exploited to develop distributed algorithms across multiple mesh deployments and the cloud based on past network and channel information to achieve the Nash equilibrium and minimize latency and energy consumption for mobile XR users.

As discussed above with reference to FIG. 5C, the cloud layer 502 and/or the edge layer 504 may include artificial intelligence/machine learning (AI/ML) component 576, 578. Including an AI/ML component 578 in the edge layer 504 (either within an edge device, within a computing mesh, or in another device in communication with an edge device or computing mesh) may enable improved XR object recognition and/or improve the rendering adjustments that need to take place because of different edge computing systems and user device capabilities. The AI/ML component 578 may facilitate providing the most optimal rendering based on the object recognition, the XR application and the UE capabilities.

Similarly, including an AI/ML component 576 in the cloud layer 502 may also augment the edge computing system capabilities. The AI/ML component 576 may be external to the edge computing system, which provide the advantages of a more powerful and focused AI/ML processing capabilities and not having to share valuable resources with other functions that may reside in the edge computing system.

Including both AI/ML components 576 and 578 in the system may enhance the overall processing and reduce the rendering generation load on the edge computing system while having the AI/ML interconnected in an edge computing mesh so other edge device may utilize the AI/ML functionalities.

In some embodiments, the AI/ML components 576 and 578 may be dedicated to a particular edge computing system and connected through a wired or wireless connection in a point-to-point configuration. The AI/ML components 576 and 578 may also be connected to the edge computing system through an interface located on the edge computing system. The interface used to connect the edge computing system and AI/ML component may be a connectorized method similar to a stacking module. The stacking module will allow the AI/ML component to be connected to the edge computing system with the minimal amount of delay from the bus or communication link. A stacker module option also allows for several AI/ML components to be stacked onto an edge computing system depending on the XR applications that are run with the edge computing system or in the edge computing system mesh network.

In some embodiments, the AI/ML components 576 and 578 may be shared with other edge device in the edge computing system mesh environment. The AI/ML components 576 and 578 may communicate with other edge devices through a wireless or wired mesh configuration.

In some embodiments, the AI/ML components 576 and 578 may be used to infer what the appropriate rendering needs to be utilizing knowledge learned to determine prior to the next rendering update what the appropriate rendering needs to be. Positive feedback for reinforcement of the AI/ML may be achieved through anticipated sensor and image data using a Kalman filter like approach where the anticipated next image will be compared against the received next image to improve the confidence interval and therefore provide the necessary positive feedback required. Increased positive feedback for the inferencing may improve the rendering capabilities.

The positive reinforcement feedback may also be used to reduce the edge computing system computational requirements either with the edge computing system, edge computing system mesh environment, cloud computing or a combination of them. The AI/ML function may therefore provide a rendering or improved rendering though learning from other responses in the environment.

For example, the AI/ML function may anticipate that based on the current rendering and sensor data what the next rendering should be. Though this method of inferred rendering the latency for the delivery of the rendered content is further reduced improving the real time ability to provide XR functionality.

Through the use of AI/ML the edge device may more efficiently deliver renderings for the end user device to utilize.

The improved efficiency using AI/ML may also reduce the edge computing resource requirements.

The improved efficiency may also reduce the reliance on other edge computing and or cloud computing resources (e.g., for the object recognition and rendering generation, etc.).

FIGS. 6A-6D illustrate an edge computing system 600 configured in accordance with some embodiments. In the example illustrated in FIGS. 6A-6D, the edge computing system 600 includes a content layer 602, a user layer 604, an edge layer 606, a cloud layer 608, an application mesh 610, an edge device 612, other edge device(s) 614, an object recognizer 616, optical device(s) 620, XR display(s) 622, a video source 624, a renderer 626, a tracker 628, a mapper 630, a feature extractor 632, a feature matcher 634, a geometric verifier 636, an XR application (local) 638, an image database (local) 640, and XR application server (local) application mesh 642, an image database (local) application mesh 644, an XR application server (cloud) 646, an image database (cloud) 648, and an object recognizer (cloud) 650.

The content layer 602 includes the optical device 602. The optical device 602 may include one or more sensors, devices or combinations thereof that capture or utilize information (e.g., visual or sensor input, etc.) from a real-world scene. As examples, the optical device 602 may include one or more HMDs 100, mobile devices 130, and/or IoT sensors (e.g., cameras, hand motion sensors, proximity sensors, etc.). As a further example, the optical device 602 may be a surveillance system that includes a collective or multitude of distributed sensors configured to collect and use sensory information to augment or annotated visual information, which is then output to one or more displays.

The user layer 604 may include XR display(s) 622, the video source 624, and the renderer 626. The video source 624 may include software running as part of an augmented reality component.

The application mesh 610 may include all or portions of the components in the edge and cloud layers 606, 608.

The edge layer 606 may include an edge device 612 that includes the tracker 628, mapper 630, feature extractor 632, feature matcher 634, geometric verifier 636, local XR application 638, and local image database 640. The edge layer 606 may also include one or more additional edge devices 614, which may include a local XR application server application mesh 642 and a local image database application mesh 644. In some embodiments, the feature extractor 632, feature matcher 634, and geometric verifier 636 may be included as part of an object recognizer 616. In some embodiments, the edge device 612 may also include all or portions of an object recognizer 616 component. In some embodiments, all or portions of the functions of the object recognizer 616 component may be included on and/or distributed across different edge devices 612, 614 (e.g., based on the capabilities or resources available on the individual edge devices, etc.).

The cloud layer 608 may include the cloud XR application server 646, cloud image database 648, and cloud object recognizer 650.

Figure 6A:
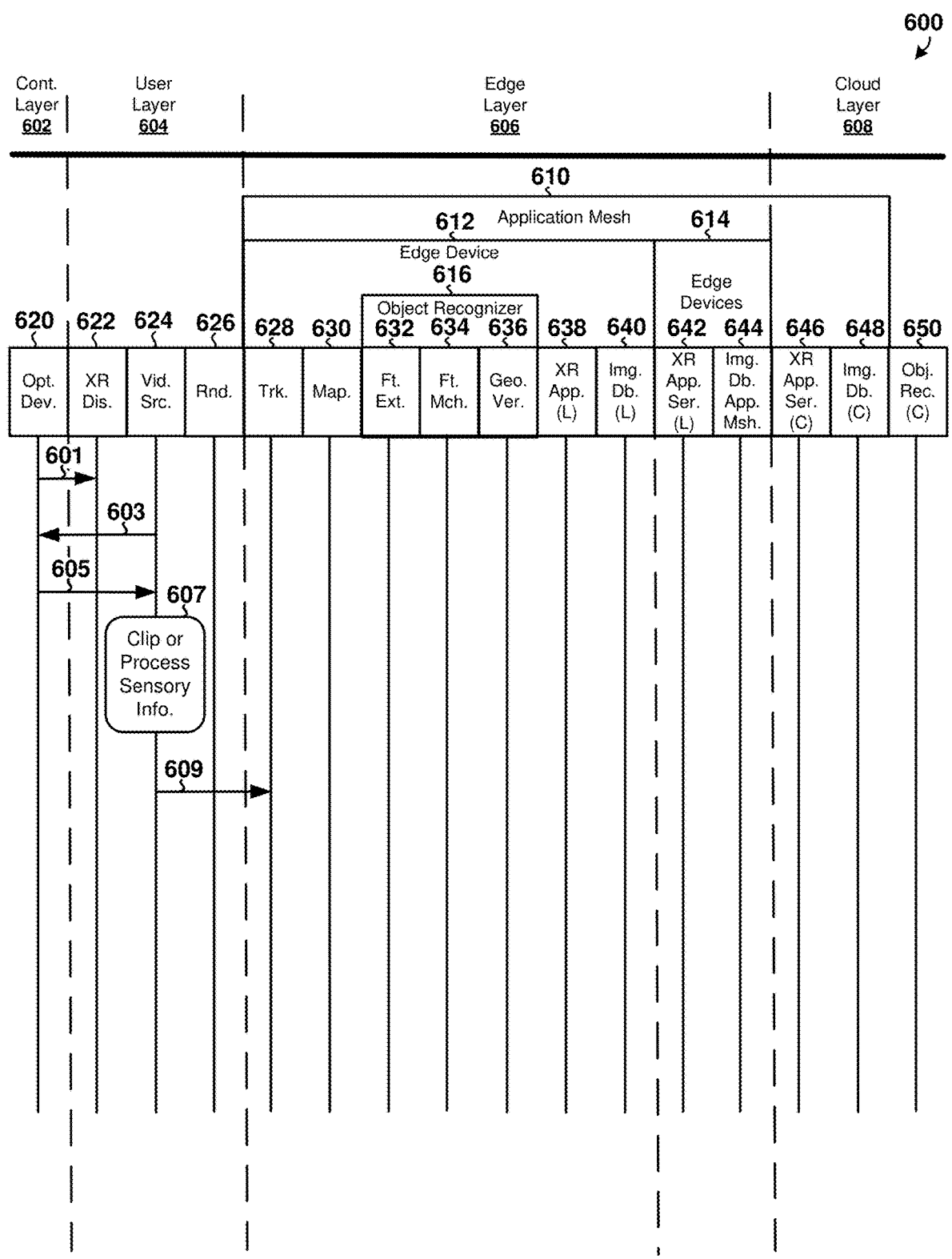
FIGS. 6A through 6D are activity diagrams illustrating components, interactions and operations in a system configured in accordance with some embodiments to improve the performance, end-to-end latency and energy consumption characteristics of resource-constrained user computing devices that run complex software applications.

With reference to FIG. 6A, in operation 601, the optical device 602 may commence capturing and sending a sensory feed (e.g., video feed, etc.) to the XR display(s) 622. For example, in operation 601, the optical device 602 may provide a sensory feed that includes properly formatted images at the correct frame or refresh rate to the XR display. In some embodiments, the sensory feed could be a continuous video feed.

In operation 603, the video source 624 may request to receive a copy or mirror of the sensory feed from the optical device 602. That is, the video source 624 makes a request to the optical device 602 or IOT device to have its current data be sent. The optical device 602 may be active or dormant. In either case, in operation 605, the optical device 602 may commence sending a copy or mirror of the sensory feed to the video source 624. That is, in operation 605, the optical/sensor device responds with requested information to the video source 624. The video source 624 may the then process the data, video and other information it receives from the optical device 602 and prepares it to be sent to the edge devices XR components, starting with the tracker 628. In the case of video feed the video source 624 may convert the frame into a jpg/png or other static image along with any other data including sensor data which can include temperature, motion and accelerometer information (x,y,z) barometric pressure, QR codes, mpg3, audio/sound files and other telemetry information.

In operation block 607, the video source 624 may process the received sensory feed (e.g., clip a video into frames, generate JPEGs, etc.). In operation 609, the video source 624 may send the output data or processed sensory feed (e.g., frames of video, etc.) to the tracker 628 component on the edge device 612 from the user device.

Figure 6B:
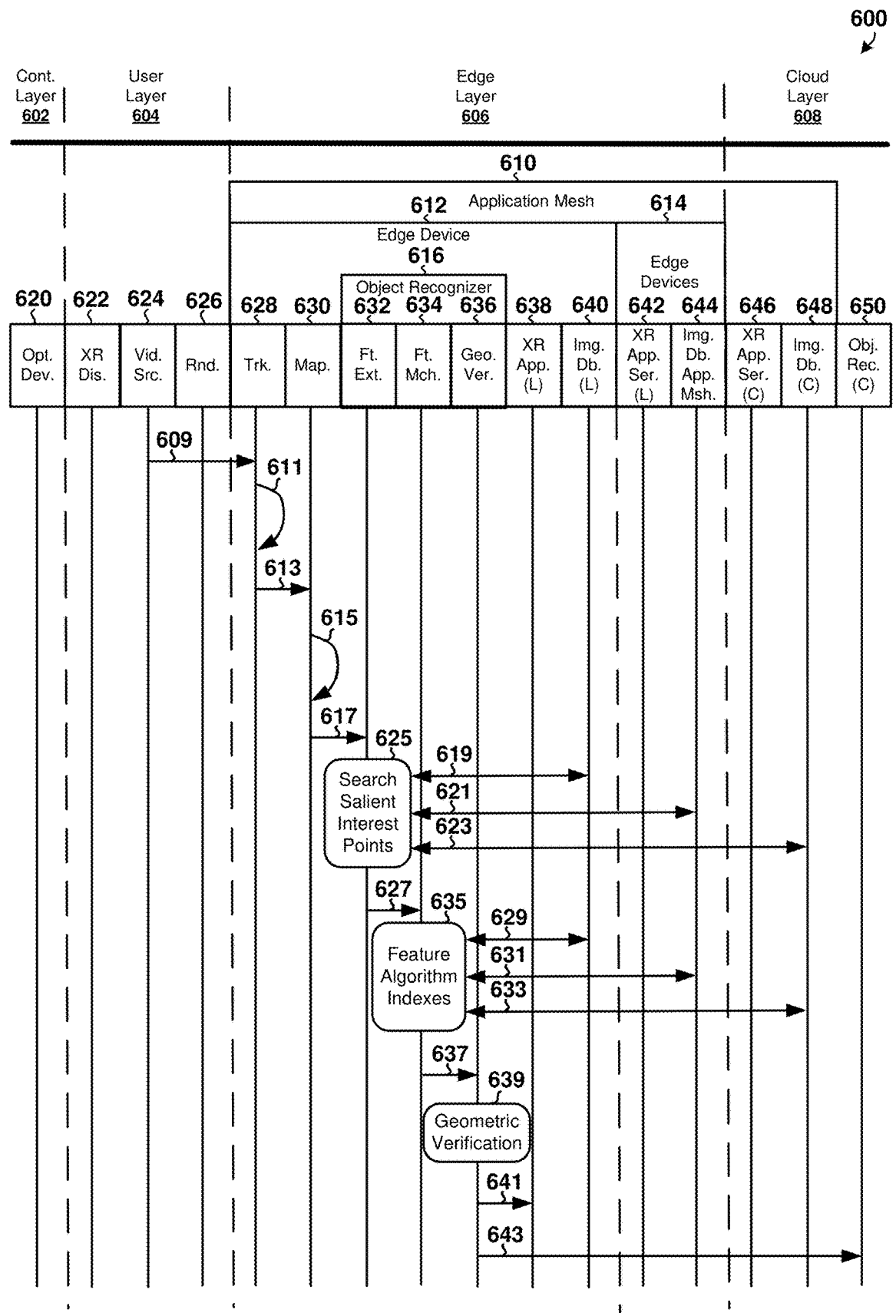

With reference to FIG. 6B, in operation 611, the tracker 628 component may evaluate and analyze the processed sensory feed (e.g., register the images relative to one another so that the position and orientation of each image relative to the other images is known, use features located in the images to match overlapping areas of adjacent image frames, determine distances and angles based on the overlapping areas, etc.), and generate analysis results. The tracker 628 may send the analysis results to the mapper 630 in operation 613.

As an example, in operation 611, the tracker 628 component may determine how far the device is from the surrounding objectives and/or determine a relative position the device has from those surround objects. In operation 613, the tracker 628 may send to the mapper 630 the relative position of the device with the surrounding objects as well as the sensory data.

In operation 615, the mapper 630 component may use the received information to establish or determine virtual coordinates (e.g., coordinates in the real world relative to a captured video frame, etc.) and/or perform other mapper functions, generate mapper output results, and send the mapper output results to the feature extractor 632 component in operation 617.

As an example, in operation 615, the mapper 630 may receive data (e.g., the relative position of the device with the surrounding objects as well as the sensory data, etc.) from the tracker 628, and use the user device coordinates as well as any positional input corrections from the device dead reckoning, use a Kalman filter for improved location positioning, and/or establish a virtual coordinate for the sensory data received from the video sources 624. Other sources of information can also be added from the tracker 628 obtained from other sensory data. In operation 617, the mapper 630 may send the sensory data received from the video source 624 along with the virtual coordinates to the object recognizer 616.

In operations 619, 621 and 623, the feature extractor 632 component may request and receive information from the local image database 640, the image database application mesh 644, and the cloud image database 648.

For example, as part of the object recognizer 616, the feature extractor 632 may receive the information from the mapper 630 in operation 617. Using the virtual coordinates and other sensory information, the feature extractor 632 may begin a search of all salient interest points for the data received 625. The feature extractor 632 may query the image database 640, 644 and/or 648 for interest points using SIFT, QRB or other methods in operations 619, 621, and 623. The image database queried may dependent upon the where the object recognizer 616 is located, local, on another edge device 614, in the cloud 608, or any combination thereof.

In operation block 625, the feature extractor 632 component may use the mapper output results and the information received from the image databases 640, 644, 648 to perform various feature extraction operations, which may include searching salient interest points and collecting and put together all the relevant information for the feature matcher 634 component to act upon.

In operation 627, the feature extractor 632 component may generate a package (e.g., data file, etc.) that includes the sensory feed information and/or extracted features, and send the package to the feature matcher 634 component.

For example, in operation 627, the feature extractor 632 component may send points of interest that match the virtual coordinates to the feature matcher 634 component of the object recognizer 616. Along with the points of interest, the sensory data received from the video source 624 and the virtual coordinates sent in operation 617 may also be sent to the feature matcher 634 component of the object recognizer 616.

In operations 629, 631 and 633, the feature matcher 634 component may request and receive information from the local image database 640, the image database application mesh 644, and the cloud image database 648.

For example, the feature mapper 634 may use the points of interest identified from the feature extractor 632 (e.g., in operation 627) to perform a best fit from the image database 640, 644, and/or 648 in operations 629, 631 and 633. The feature mapper 634 may use a process 635 leveraging the points of interest determined in operation 625 that were supplied with an index. These indexes may be used to extract stored feature images in the image database (features) best match those received from the video source 624 using the indexes.

In operation block 635, the feature matcher 634 component may use the received package and information received from the image databases 640, 644, 648 to perform various feature matching operations, which may include generating or using feature algorithm indexes to generate information suitable for use by the geometric verifier 636 or XR application 638.

In operation 637, the feature matcher 634 component may send the results of the feature matching operations (e.g., confidence values, etc.) to the geometric verifier 636 component.

For example, the feature mapper 634 may send the indexed features to the geometric verification 636 along with all the previous information provided in operation 627.

In operation block 639, the geometric verifier 636 component may use the received feature matching operation results to perform various geometric verification operations, which may include determining whether confidence levels associated with matched features exceed the relevant thresholds. For example, if the confidence levels associated with a matched feature is 0.95 and the relevant threshold is 90%, the geometric verifier 636 component may determine that the feature is a match. As another example, the confidence levels associated with a matched feature is 0.95 and the relevant threshold is 99%, the geometric verifier 636 component may determine that the feature is not a match.

Said another way, in operation block 639, a geometric verification may be performed against the sensory data received from the video source 624 and that extracted from the image database 640, 644, and/or 648. A comparison of the two sensory data files may be performed in operation 639 with the objective of determining the correlation between the two sensor data files. If the correlation is sufficient based on the algorithm then a corresponding match is deemed sufficient to proceed.

In response to determining that the confidence levels exceed the relevant thresholds (i.e., that there is a match), in operation 641 the geometric verifier 636 component may forward all the received or generated information to the local XR application 638. That is, if the match is deemed sufficient, then the information received by the geometric verifier 636 along with the confidence interval or similar function and other data needed may sent to the XR application 638 in operation 641.

In response to determining that the confidence levels do not exceed the relevant thresholds (i.e., that there is not a match), in operation 643 the geometric verifier 636 component may forward all the received or generated information to the cloud object recognizer 650.

Figure 6C:
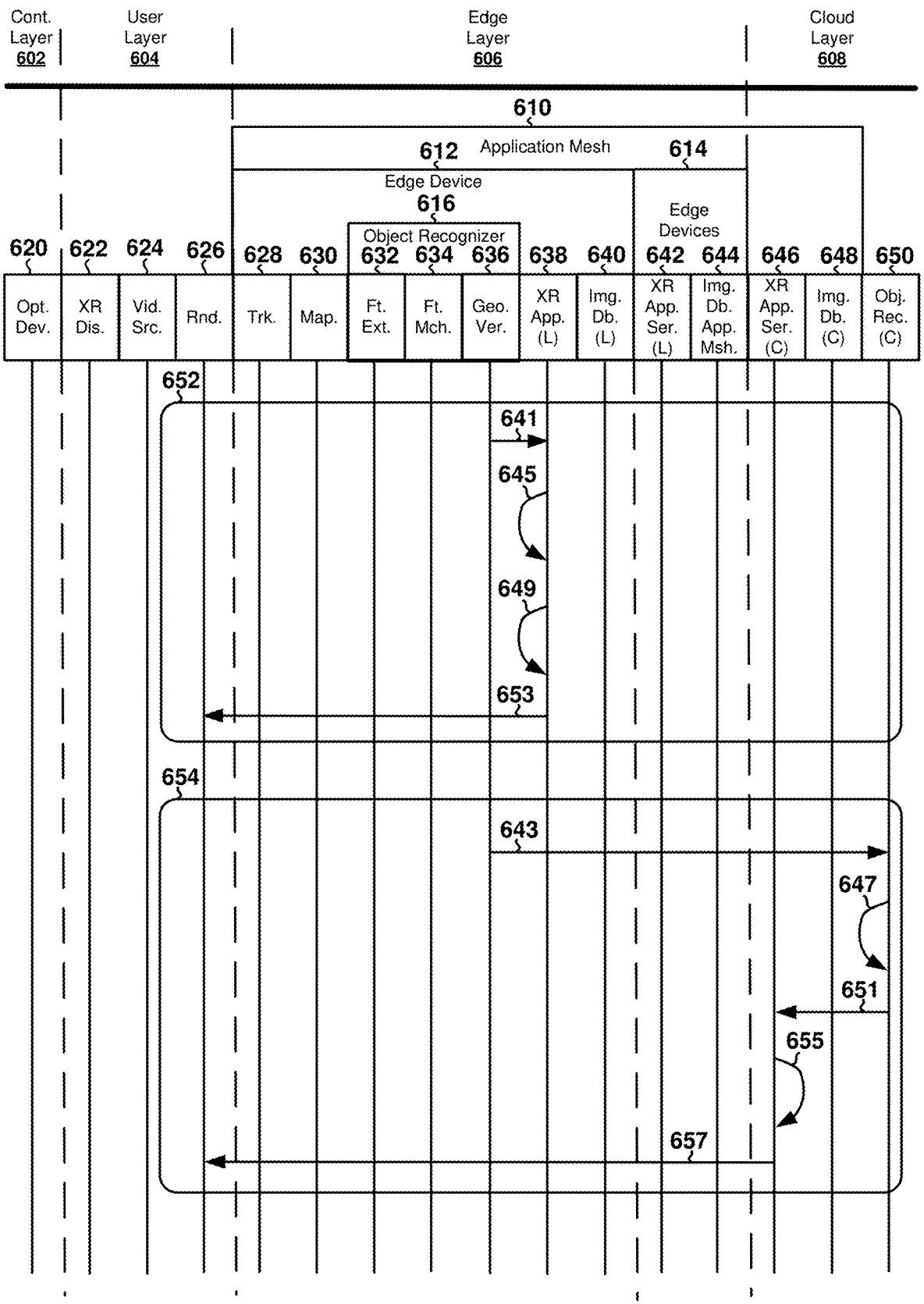

FIG. 6C illustrates the operations 652 that are performed in response to determining that the confidence levels exceed the relevant thresholds (i.e., that there is a match) and the operations 654 that are performed in response to determining that the confidence levels do not exceed the relevant thresholds (i.e., that there is not a match).

Operation 652 may include operations 641, 645, 649 and 653. In particular, the local XR application 638 may receive output data from the geometric verifier 636 component (which is a sub part of the object recognizer 616) in operation 641. The XR application 638, depending on the application parameters, may determine which overlay renderings and other sensory data needs to be provided in operation 645. In operation 649, the XR application 638 may provide the augmented information that will be sent to the render which can include images of items and features which do not exist, wire frame of existing features, annotations, audio and visual confirmation indicating good or bad depending on the application parameters along with sensory data received. In operation 653, the XR application 638 may send images, annotations and other important data to the render 626.

Operation 654 may include operations 643, 647, 651, 655, and 657. If the geometric verification 636 determines that the correlation between the sensory data provided by the video source 624 and the feature match 634 is not sufficient based on the algorithm, then a corresponding incorrect match occurs. In operation 642, the cloud object recognizer 650 may send information received in operation 617 to the object recognizer 650 located not on the edge device 612 but in a cloud service 608 where more resources both computation and data are available to help improve the match. In operation 647, the cloud object recognizer 650 may generate output, which may include features matched along with the confidence interval or similar function and other data needed. In operation 651, the cloud object recognizer 650 may send the generated output to the XR application 646. In operation 655, the XR application 646 may receive output data from the object recognizer 650. Depending on the application parameters, the XR application 646 may also determine which overlay renderings and other sensory data need to be provided. The XR application 646 may then send images, annotations and other important data to the render 626 in operation 657.

Figure 6D:
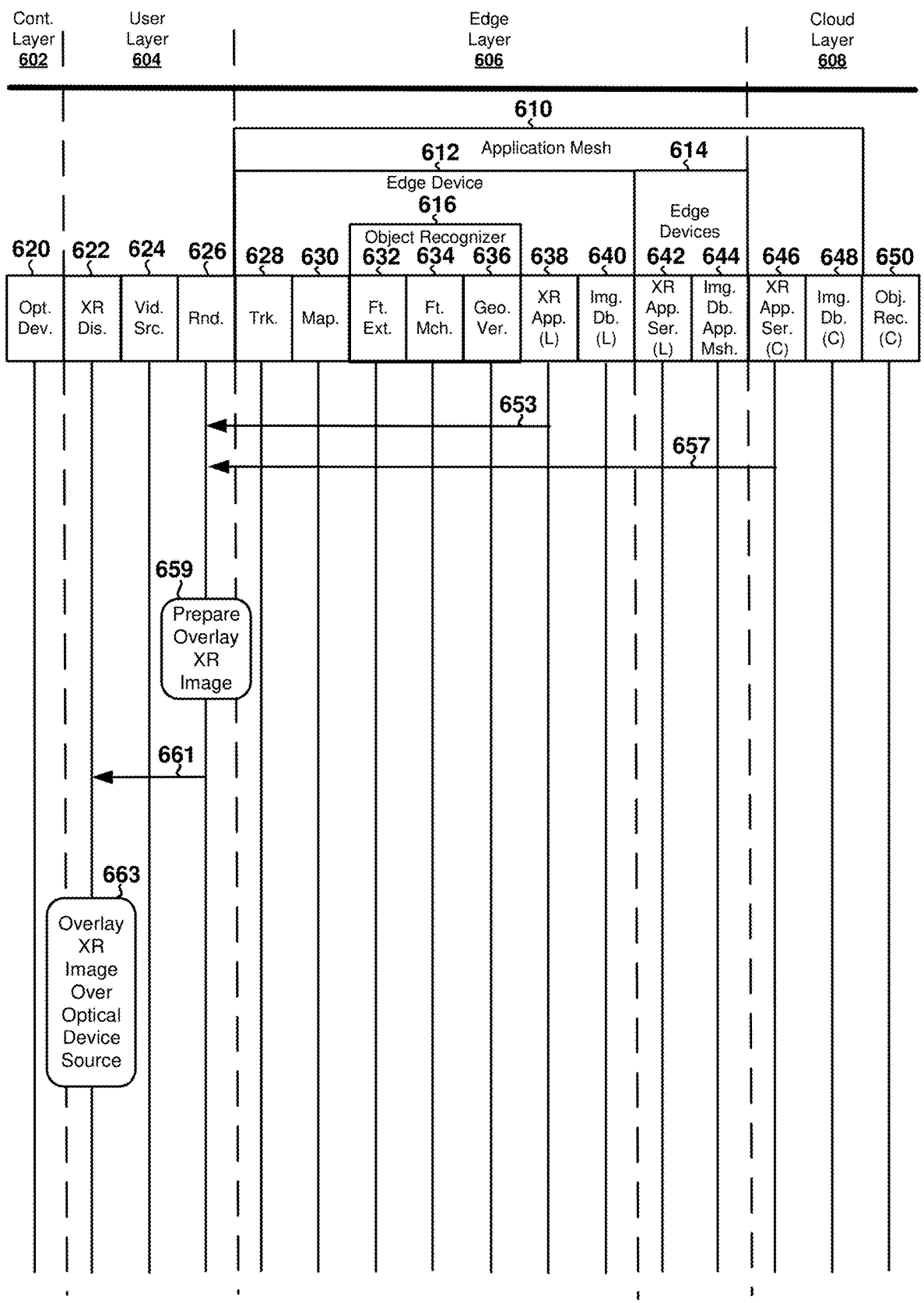

With reference to FIG. 6D, in operation block 659, the renderer 626 component may receive and use the image and overlay information to prepare the overlay XR image for rendering on a user device.

In operation 661, the renderer 626 may send the prepared overlay XR image to the XR display(s) 622.

In operation block 663, the XR display(s) 622 may overlay the XR image over optical device source information and present it as digital output (e.g., images, text, sounds, haptic feedback, tactile output, etc.) that may be combined with the real-world environment that the user is experiencing or as a complete simulation.

XR applications require a minimum Quality of Experience (QoE) since users are highly sensitive to latency and in most cases require ultra-low latency and high rates of communications. The edge computing system may facilitate the delivery of XR at the edge either on a stand-alone basis and with any combination of IoT devices and navigable videos from cameras in one compact package. The edge computing system may facilitate processing of data and potential rendering of 3D models off the device, which allows digital twin models to be augmented on the view of the worker, as well as enable a remote expert to annotate the image/video being streamed from the headset or mobile devices of workers in real-time, as well.

For example, 3D models for certain XR applications that require local capture and rendering, such models are too processing intensive to render on the end-user devices so typically are rendered either on a local server or in the Cloud but always cached at the edge since real-time delivery of such a content from the Cloud suffers from high latency and is bandwidth intensive.

At a location within a cloud computing system, a service or application may run agnostically on any node (e.g., on any of a plurality of edge devices). In contrast, an edge node such as an edge device has characteristics that must match the service or application to be deployed. A user may also want to download and or utilize an application on one or multiple edge devices simultaneously. Situations may therefore arise where a decision is taken to utilize or run an application on edge device or devices where the resources available on the edge device may or may not have the necessary resources to run the application or function required.

In addition, some networks have a wireless or constrained wired backhaul connection between an edge device and the cloud computing system. Such a connection, for example to the internet, is inherently unreliable.

The edge device may have limited resources since the resources on the edge device cannot be physically augmented dynamically. Specifically, the edge device may have resource limitations that impede its ability to perform the desires application functions. As such, an edge device, while being able to perform multiple functions and applications, may not be able to run all the applications based on resources available at the time that the application starts or while the application is running. The edge computing system may provide sufficient processing capacity, RAM and storage, either from a single edge device or from a local network of edge devices that form computing mesh. The edge computing system may be particularly beneficial for delivery of huge XR and 3D design files required for real-time rendering of models for multi-user collaboration through a distributed network in one or multiple locations by multiple teams.

In some embodiments, the edge computing system may be configured to divide software applications (e.g., latency-sensitive applications, etc.) into several major classes depending on the computational and application requirements. The most basic example of software application division involves two major classes. The first major class may include applications that require uninterrupted execution that cannot be fragmented, and therefore require full offloading (FO). The second major class may include applications that could benefit from fractional or partial offloading (PO). The edge device may formulate and solve a joint optimization problem for each class of applications so as to minimize the overall energy consumption across the sub-network subject to latency, transmission quality, computational budget and/or transmit power constraints edge computing system is either as a standalone, meshed network, "mesh compute", where multiple edge computing system units is typically required for wireless coverage, to provide for processing of data and potential rendering of 3D models for applications such as digital twin models to, for example, enable a remote expert to annotate the image/video being streamed from the headset or mobile devices in real-time.

Figure 7A:
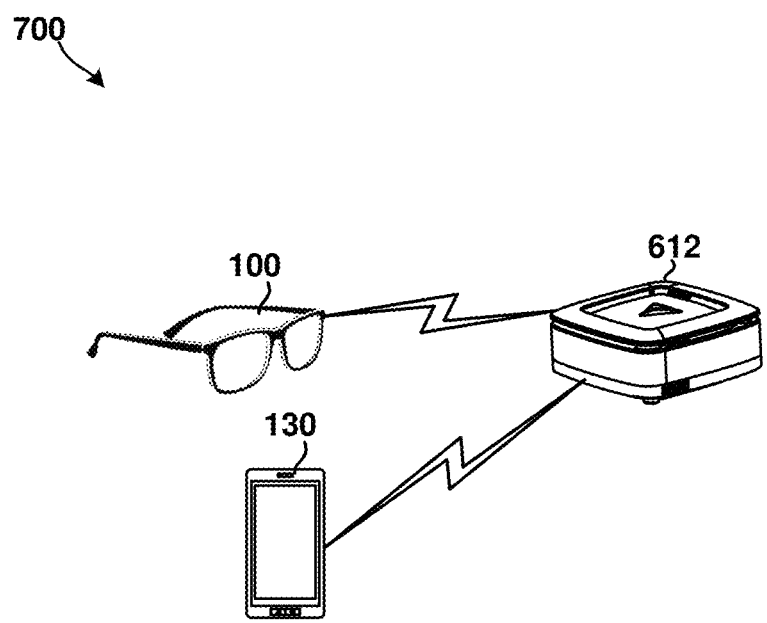
FIG. 7A is a system block diagram illustrating a distributed edge computing system that includes a standalone edge device in accordance with some embodiments.
Figure 7B:
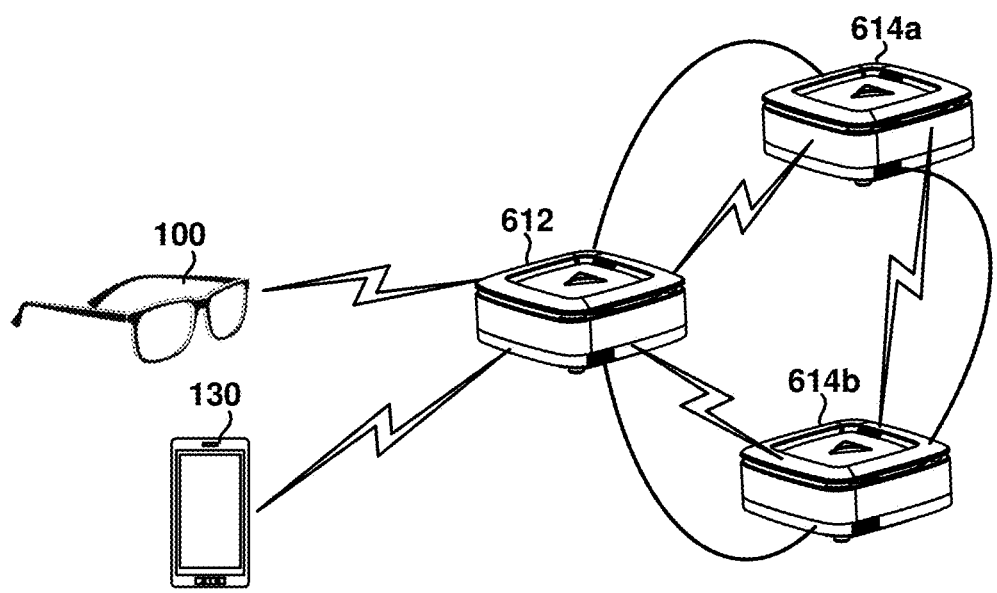
FIG. 7B is a system block diagram illustrating a distributed edge computing system that includes edge devices that are meshed together in accordance with some embodiments.
Figure 7C:
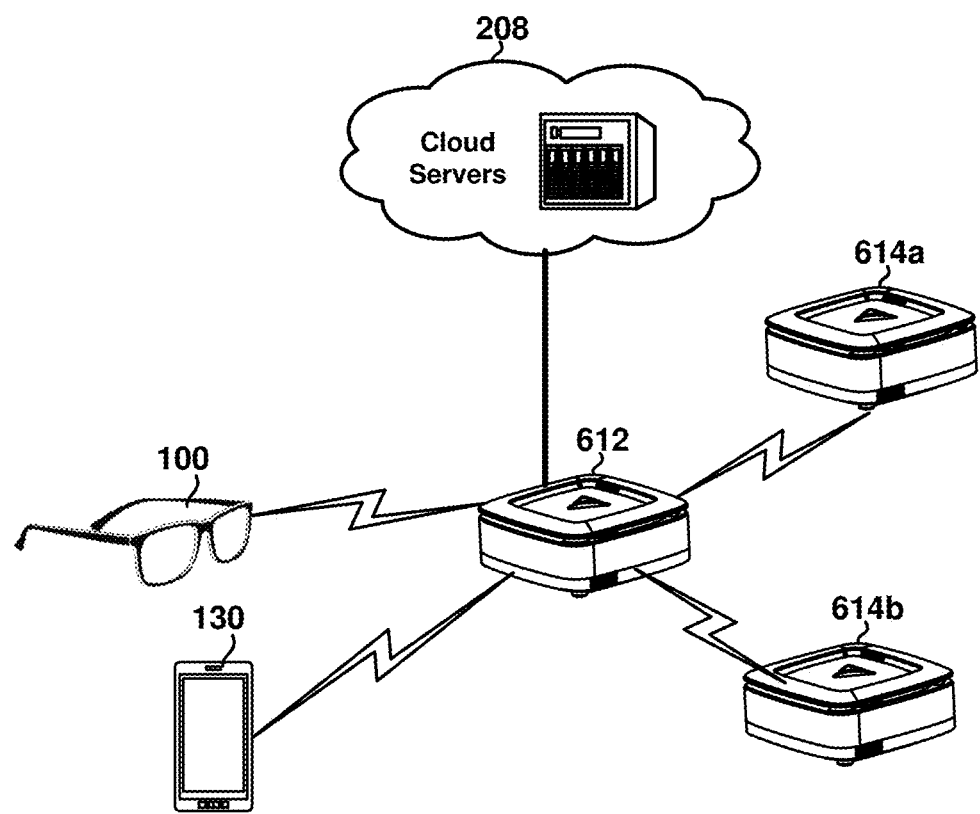
FIG. 7C is a system block diagram illustrating a distributed edge computing system that includes an edge device and devices connected to a cloud server in accordance with some embodiments.

FIGS. 7A-7C are component block diagrams illustrating components in the edge computing system 600 that could be configured to perform all or a subset of the operations illustrated and described above with reference to FIGS. 6A-6D.

In the example illustrated in FIG. 7A, the edge computing system 700 includes an HMD 100, a mobile device 103, and an edge device 612. The HMD 100 and/or mobile device 103 may perform the operations associated with the content layer 602 and the user layer 604 (e.g., operations 601-609, 659-663, etc.), and the edge device 612 may perform operations associated with the edge layer 606.

As an example, the HMD 100 and the mobile device 103 may be linked together such that the HMD 100 performs the content layer 902 operations (e.g., captures and sends a video feed to the mobile device 103, etc.) and the mobile device 103 performs the user layer 904 operations (e.g., requests and receives a video feed from the HMD 100, clips or processors the received video feed, sends the clipped or processed frames of video to the edge device 612, etc.).

As another example, the edge device 612 illustrated in FIG. 7A may receive a processed sensory feed from the HMD 100, evaluate and analyze the received sensory feed to generate analysis results, determine how far the device is from the surrounding objectives, determine a relative position the device has from those surround objects, establish or determine virtual coordinates, use the virtual coordinates and other sensory information to search for salient interest points, generate mapper output results, use the mapper output results and the salient interest points to extract features, generate a package (e.g., data file, etc.) that includes the sensory feed information and/or extracted features, perform feature matching operations to generate confidence values, perform geometric verification operations, determine whether the confidence values/levels exceed relevant thresholds, determine overlay renderings and other sensory data, generate augmented information (e.g., images, annotations, etc.), and send the augmented information to the HMD 100. The HMD 100 may then prepare an overlay XR image over for the user to view or for rendering on one or more of its electronic displays.

In the example illustrated in FIG. 7B, the edge computing system 700 includes the HMD 100, the mobile device 103, edge device 612, and other edge devices 614a, 614b. The edge devices 612, 614a, 614b connected through a wireless mesh network, through a wired connection, or through a combination of wired and wireless links.

In this example, the edge device 612 may receive the processed sensory feed from the HMD 100, and determine (dynamically, based on priority, etc.) whether any or all of the operations associated with the edge layer 606 should be offloaded or processed with the aid of the other edge devices 614a, 614b. For instance, the edge device 612 may determine to offload the operations associated with the local XR application 638 (e.g., determining which overlay renderings and other sensory data need to be provided, generating augmented information, etc.) to one or more of the other edge devices 614a, 614b. One or both of the other edge devices 614a, 614b by perform the offloaded XR application operations to generate augmented information (e.g., images, annotations, etc.), and send the augmented information to the HMD 100. The HMD 100 may receive the augmented information from one or both of the other edge devices 614a, 614b, prepare an overlay XR image for the user to view, and render it on one or more of its electronic displays.

In the example illustrated in FIG. 7B, the edge computing system 700 includes the HMD 100, the mobile device 103, the edge device 612, the other edge devices 614a, 614b, and cloud servers 208. The HMD 100, the mobile device 103, the edge device 612, and the other edge devices 614a, 614b may perform any or all of the operations discussed above. The cloud servers 208 may perform the operations associated with the cloud layer 608.

In this example, the edge device 612 may receive the processed sensory feed from the HMD 100, and determine (dynamically, based on priority, etc.) whether any or all of the operations associated with the edge layer 606 should be offloaded or processed with the aid of other resources either off-net with cloud servers 208 and/or on-net within the local network with the aid of the other edge devices 614a, 614b. For instance, the edge device 612 may perform the tracking and mapping operations, and offload the object recognizer operations to cloud servers 208.

The edge device 612 may also offload the XR application and image database update operations to the cloud servers 208. Alternatively, the edge device 612 may perform the XR application operations locally and offload the image database update operations to the other edge devices 614a, 614b.

The cloud servers 208 may send the output of the object recognizer operations to output to edge device 612, which may forward it to the other edge devices 614a, 614b in a mesh network. The other edge devices 614a, 614b may perform the XR application operations to generate augmented information (e.g., images, annotations, etc.), and send the augmented information to the HMD 100 for rendering.

In the above example, the operations of the edge computing system 600 are performed by several edge devices 612, 614a, 614b and a cloud server 208. These edge devices 612, 614a, 614b are illustrated as being connected to each other using a wireless mesh network. In some embodiments, the edge devices 612, 614a, 614b may be connected via a wired mesh network or a mesh network that includes a combination of wired and wireless connections.

In the above example, some of the functions edge computing system 600 are processed by cloud servers 208. In some embodiments, all of the functions or any subset of the functions may be processed by cloud servers 208 (depending on the capabilities of the edge devices 612, 614a, 614b, complexity of the object recognizer operation, XR application requirements, etc.) to utilize off-net data for the object recognition and rendering for the XR application.

Many software applications (XR applications) cannot operate on an edge device (e.g., edge device 612) when that device is isolated or cut off from cloud network resources. However, there some applications may be able to commence operating on an edge device (e.g., edge device 612) while it is isolated or cut off from cloud network resources. Similarly, some application may continue operating on the edge device after the device becomes isolated from cloud network. These applications may or may not correspond to the applications that are able to commence operating on the isolated edge device.

Accordingly, some embodiments may evaluate each application that is run on the edge device on the basis of whether that application is capable of operating on the edge device given the resources it has available locally on the device itself, whether the edge device can utilize the application with the aid of other edge devices, whether the edge device can utilize applications with the aid of cloud network resources, whether the edge device can utilize the application when it no longer has access to non-local resources either permanently or on an intermittent basis.

In some embodiments, the edge computing system may be configured to determine an application class type for each application that that is to be run on the edge computing system, determine the edge device capabilities of each edge device in the edge computing system, and the available cloud network resources. The edge computing system may determine whether to allow an application to run on an edge device and/or how the application may be run based on the determined application class, edge device capabilities, and/or cloud computing capabilities.

Some applications can run or continue to run on the edge device, even when the edge device is isolated or cut off from network, whether the network includes other edge devices, cloud network resources or a combination thereof.

Different application class types may be used to assist in the collection, computation and rendering operation. There are multiple application class types that apply to XR application. Examples of rendering class types include simple text being added to the display in a scrolling or static display, icons being rendered highlighting tasks or information about an object, displaying manuals or suggested next steps for a task, displaying real time or near real time medical telemetry data during for medical personal to better treat injured parties, displaying real time medical telemetry to a surgeon for the patient during an operation.

There are different types of XR depending on the application and the content that needs to be delivered. However not all edge devices are able to support XR applications being requested by the end device like a head mount displays 100, smart phones 130 or another device. Some of those devices may not have display capability in the case of artificial intelligence/machine learning (AI/ML) applications.

The edge computing system may communicate with other edge devices in the local network and determine whether another edge device has the necessary capabilities. Or the edge device may communicate with other edge computing systems to determine whether particular functions of the application can be better performed by those edge computing systems.

Figure 8:
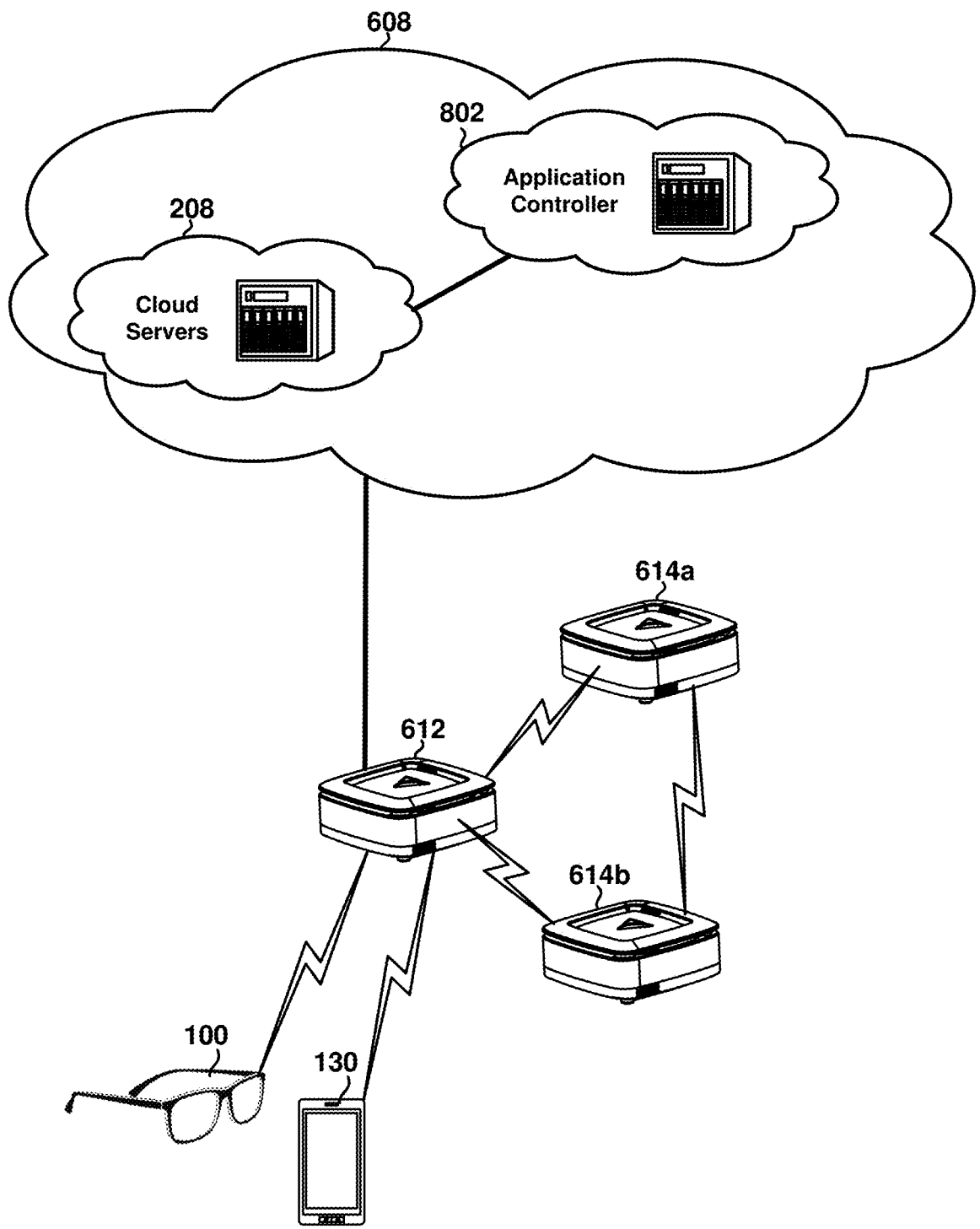
FIG. 8 is a system block diagram illustrating a distributed edge computing system that includes edge device and devices communicating with an application controller in accordance with some embodiments.

FIG. 8 illustrates an edge computing system that includes an application controller 802 that operates at the cloud layer

608. The application controller 802 may be included as part of the cloud servers 208 and/or may include communication links to the cloud servers 208. In some embodiments, the edge computing system may also include a local application controller (e.g., application controller 574), which may part of the computing controller 560 illustrated in FIG. 5B.

The application controller 802 may be configured to track and provide application capabilities for the edge computing system. Each edge computing system's capabilities to perform a particular XR function is logged in the application controller register. The application controller register is used to determine whether a particular XR function may be performed on an edge computing system.

Each XR function and its associated application may have different requirements. As such, the edge computing system may determine prior to the invoking of the XR function whether the edge computing system is able to perform the task, whether its need additional resources (e.g., within the edge computing system mesh network, in the cloud, etc.), etc.

Additionally, a local application controller (e.g., application controller 574) may also be used to determine whether a user device (e.g., HMD 100, etc.) may send the images/sensor data, receive the rendering information, etc.

The application controller 802 may be mirrored or standalone.

The local application controller 574 may have a mirrored image (e.g., same, similar, corresponding, etc.) of the application controller 802.

The local application controller 574 can also have a subset of the functions and features that are associated with the application controller 802.

The local application controller 574 can also perform its functions without connectivity to 802.

This would be an example of an internal capability that is required of an edge device. If the edge computing system does not have the required capability, then it may signal back to application controller 802 indicating that it cannot accept or has not accepted the download of the application or allowed the application to run on the edge computing system.

FIGS. 9A and 9B illustrate example information structures 900, 950 that could be used by the edge computing system to determine whether the edge computing system is capable of running an XR application and/or how to assign tasks or distribute computing across edge devices in the edge computing system.

The example illustrated in FIG. 9A illustrates that each of edge devices 1, 2 and 3 are XR capable for Application 1, which means that they have sufficient resources to perform the operations of Application 1. As such, Application 1 may run on any of edge devices 1, 2 or 3 (e.g., edge devices 612, 614*a*, or 614*b*) regardless of the availability of other components or resources in the edge computing system.

Edge device 1 is also XR capable for Application 2, and thus Application 2 may run on edge device 1 regardless of the availability of other components or resources in the edge computing system. Application 2 could also be performed by edge device 2 depending on the availability of other components or resources in the edge computing system. Application 2 cannot operate on edge device 3 because it does not sufficient resources to perform the operations of Application 2.

Edge device 1 is also XR capable for Application 3, and thus Application 3 may run on edge device 1 regardless of the availability of other components or resources in the edge computing system. Application 3 could also be performed by edge device 2 depending on the availability of other components or resources in the edge computing system. Application 3 cannot operate on edge device 3 because it reserved for a higher priority task or does not currently have sufficient capacity to perform the operations of Application 3.

In some embodiments, the table illustrated in FIG. 9A may further include columns that identify specific CPU, RAM, storage and other parameters that could be used by an application controller (e.g., application controller 574, 802) to determine whether the Application functions can be performed by more than one edge device or other resources available in the edge computing system and/or resources available via the cloud.

Not all the edge computing systems in the local network are capable of performing the XR functions by application under certain connectivity/backhaul constraints. Said another way, many software applications (XR applications) cannot operate on an edge device (e.g., edge device 612) when that device is isolated or cut off from cloud network resources.

The information structure illustrated in FIG. 9B may be used by the edge computing system to determine whether the edge computing system is capable to performing the XR function by application where these is no connectivity or backhaul or the connectivity/backhaul is disrupted. FIG. 9B illustrates that each of applications 1, 2 and 3 are able to commence operating on an edge device (e.g., edge device 612) when that edge device is isolated or cut off from cloud network resources. FIG. 9B also illustrates that only applications 1 and 2 may continue operating on the edge device after the device becomes isolated from cloud network. Thus, while application 3 may be able to commence operating on an edge device when that edge device is isolated or cut off from cloud network resources, application 3 cannot continue operating on the edge device after the device becomes isolated from cloud network.

Some additional examples for helping to determine whether the XR function can be performed by the edge computing system (e.g., on an edge device or computing mesh, etc.,) include determining whether the XR function can be the rendered as desired based on the user device. If the complete rendering is not possible then this is identified to the XR Application and the requisite adjustment to the rendering is made so it can be displayed properly on the user device.

The requirements may include not only the application requirements but security requirements necessary to collect, process and deliver the requisite rendering.

Additionally, if the user devices connected to the edge device do not have the required capability needed for the particular application being requested then the edge device will signal back to an application controller or similar component or database that it cannot accept or has not run the application as requested. For example, in FIG. 8, the edge computing system is part of a local network that is either a single node or with one or more multiple edge computing systems connected in a mesh environment. The edge computing system upon request for an XR application initiated from a bootstrap process, cloud orchestrator, another edge computing system in the mesh or an end device or a user device. The edge computing system obtains the relevant XR application and required credentials. The edge computing system based on the credentials may determine whether it is able to perform the XR functions on the local platform. If the edge computing system can perform the XR functions on the local platform it registers with the application controller or cloud orchestrator that is has the requisite resources to run the XR functions.

If the edge computing system does not have the requisite resources, it registers what functions it needs to have run in other platforms. The edge computing system orchestrator then determines where the required functions for the edge computing system can or should be run in order to perform the required XR functions. When the edge computing system has multiple XR requests the resources on the edge computing system may not be sufficient to complete the required functions. The edge computing system informs the orchestrator that it needs the additional functions to be completed by another platform. The edge computing system orchestrator evaluates the other edge computing systems in the local mesh environment for performing the function. If another edge computing system in the local mesh environment can run the function that function is assigned to that edge computing system for execution. However, depending on the current status of each edge computing system in the local mesh environment the functions may need to be processed in the cloud environment.

If there is no connectivity to the cloud environment the edge computing system responsible for the XR request completes the XR rendering with incomplete information. Depending on the XR function a rendering that has reduced information is provided to the user device for rendering. Depending on the XR function, no rendering may be provided until resources are available for completing the rendering using current sensor and image data.

Figure 10:
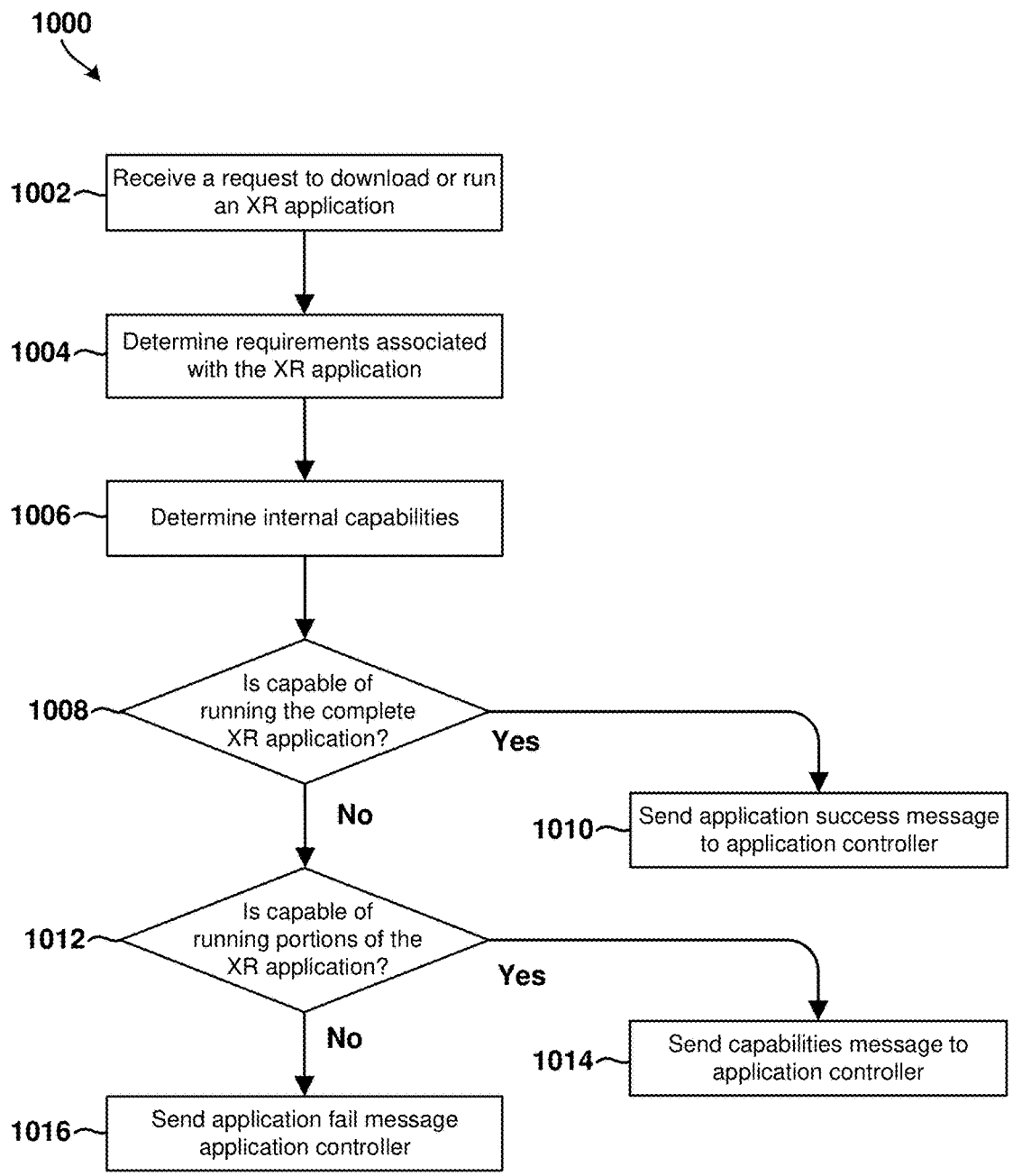
FIGS. 10-12 are process flow diagrams illustrating method of dynamically offloading tasks from a user device to an edge computing system in accordance with some embodiments.

FIG. 10 is a process flow diagram illustrating a method 1000 of determining whether an edge device includes sufficient resources and capabilities to process the XR functions for an XR application. Method 1000 may be performed by a processor in an edge device.

In block 1002, the edge device may receive a request to download or run an XR application, which may include information regarding the XR application and its requirements. The requirements may be device specific (e.g., processing requirements, etc.) and/or network related (e.g., latency requirements, etc.). Thus, in some embodiments, in block 1002, the edge device may receive, from an application controller, a request to download or run a software application suitable processing a sensory feed collected by the user device.

In block 1004, the edge device may use the received information to evaluate and determine the requirements associated with the XR application. That is, in block 1004, the edge device may determine operating requirements of the software application. In some embodiments, the edge device may determine the operating requirements of the software application by determining whether the software application requires full offloading (FO) (e.g., by determining whether the software application requires uninterrupted execution, etc.) and/or determining whether the software application could benefit from partial offloading (PO) in response to determining that the software application does not require FO.

In some embodiments, as part of the operation in block 1004, the edge device may perform a joint optimization problem to minimize the overall energy consumption across edge computing system subject to latency, transmission quality, computational budget and transmit power constraints.

In block 1006, the edge device may evaluate and determine its own internal capabilities (e.g., processing power, memory, firmware version, etc.).

In determination block 1008, the edge device may determine (e.g., by comparing the requirements associated with the XR application with its own internal capabilities, etc.) whether it is capable of running the complete XR application locally on the edge device. That is, in some embodiments, the edge device may compare the determined operating requirements of the software application to the determined capabilities of the edge device to determine whether the edge device is capable of running the entire software application in determination block 1008.

In response to determining that the edge device is capable of running the complete XR application (i.e., determination block 1008="Yes"), in block 1010, the edge device may generate and send an application success message to the application controller to indicate that the complete XR application may be performed locally on that edge device. In response, the application controller could request that the edge device proceed to download or run all or portions of the XR application.

Said another way, in block 1010, the edge device may send a response message indicating that the edge device is capable of performing the entire software application in response to determining that the edge device is capable of running the entire software application. In some embodiments, the edge device may perform the entire software on the edge device in response to sending the response message indicating that the edge device is capable of performing the entire software application to the application controller.

In response to determining that the edge device is not capable of running the complete XR application (i.e., determination block 1008="No"), in block 1012, the edge device may determine whether it is capable of running portions of the XR application locally on the edge device. That is, the edge device may determine whether the edge device is capable of running a portion of the software application in response to determining that the edge device is not capable of running the entire software application.

In response to determining that the edge device is capable of running portions of the XR application (i.e., determination block 1012="Yes"), the edge device may generate and send a capabilities message to the application controller in block 1014. Said another way, in some embodiments, the edge device may send a capabilities message identifying portions of the software application that could be run on the edge device in response to determining that the edge device is capable of running at least one portion of the software application. The capabilities message may include information identifying the specific portions or functions that it can (or cannot) perform. The application controller may use this information to determine whether to assign tasks associated with the XR application to edge device (e.g., based on availability of resources in the edge computing system, etc.) and/or to determine the tasks that are to be assigned to the edge device.

In some embodiments, the edge device may perform at least one portion of the software application on the edge devices in response to sending the capabilities message identifying portions of the software application that could be run on the edge device to the application controller, and offload at least one other portion of the software application to another edge device in the same edge computing system in response to sending the capabilities message identifying portions of the software application that could be run on the edge device to the application controller.

In some embodiments, the edge device may receive from the application controller an updated request message identifying one or more portions of the software application that are to be performed on the edge device, and perform the identified one or more portions of the software application on the edge device in response to receiving the updated request message.

In response to determining that the edge device is not capable of running any portion of the XR application (i.e., determination block 1012="No"), in block 1016, the edge device may generate and send an application fail message to the application controller to indicate that it cannot participate in the execution of the XR application. That is, in block 1016, the edge device may send an application failed response message to the application controller in response to determining that the edge device is not capable of running the entire software application and that the edge device is not capable of running at least one portion of the software application.

In some embodiments, the edge device may determine operating requirements of the software application (e.g., in block 1004) by determining the functionalities, capabilities, and resource requirements associated with the software application. The edge device may then determine whether to reduce the functions, features, operations, characteristics, or requirements of the software application based on the determined functionalities, capabilities or resource requirements of the software application. Alternatively, or in addition, the edge device may determine whether to run the software application locally on the edge device, on another edge device in the edge computing system, or in a cloud environment based on the determined functionalities, capabilities or resource requirements of the software application.

In some embodiments, the edge device may determine the functionalities, capabilities, and resource availability on one or more components of the edge computing system, and determine whether to reduce the functions, features, operations, characteristics, or requirements of the software application based on the determined functionalities, capabilities, or resource availability of the one or more components of the edge computing system.

In some embodiments, the edge device may also determine an availability of connectivity between the edge devices in the edge computing system, between the user device and the edge devices in the edge computing system, and with a cloud server, and determine whether to reduce the functions, features, operations, characteristics, or requirements of the software application based on the determined availability of connectivity between the edge devices in the edge computing system, between the user device and the edge devices in the edge computing system, and with a cloud server.

Figure 11:
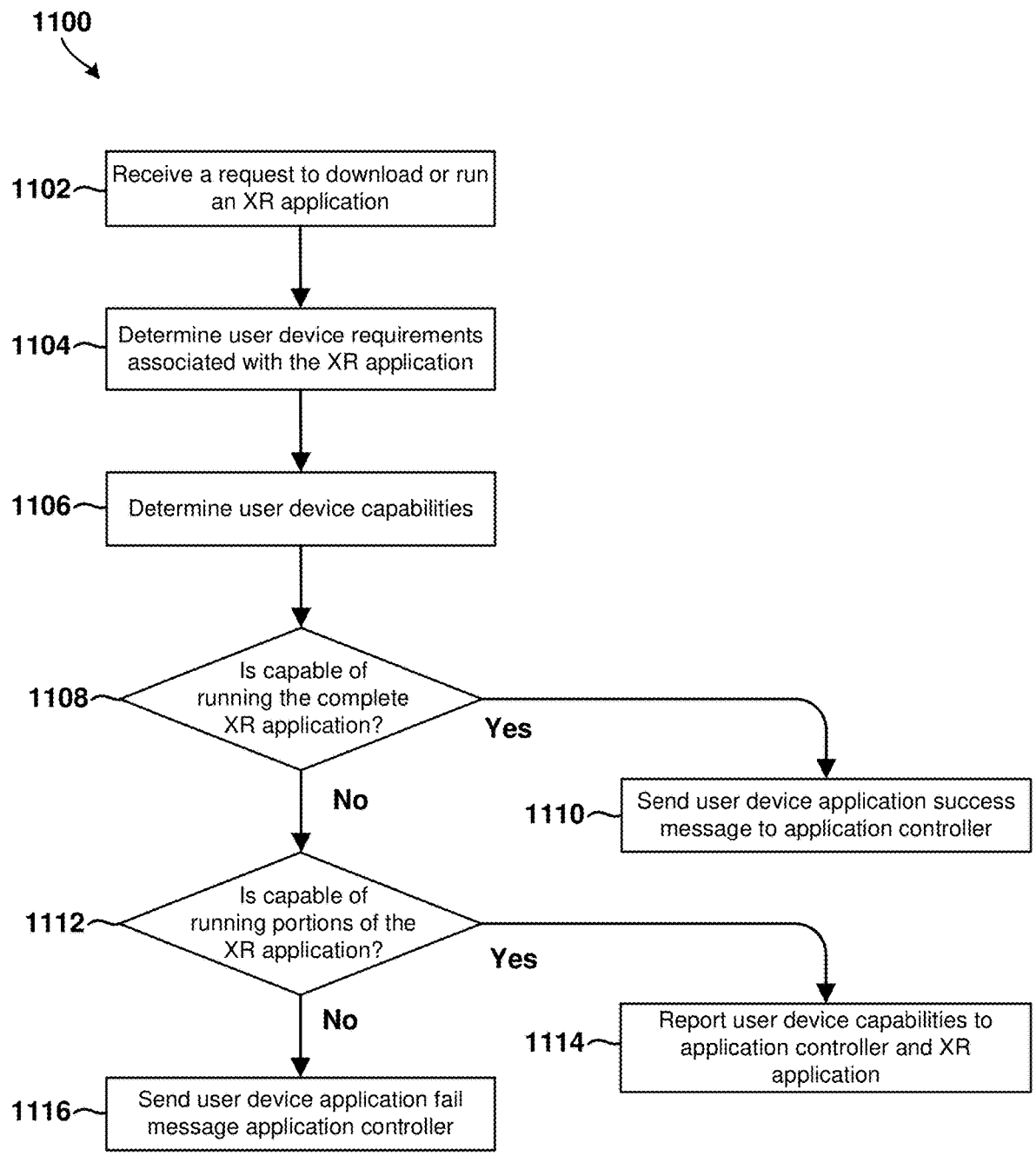

FIG. 11 is a process flow diagram illustrating a method 1100 of determining whether user device includes sufficient resources and capabilities (e.g., sufficient display resolution, etc.) to run an XR application. Method 1100 may be performed by a processor in an edge device.

In block 1102, the edge device may receive a request to download or run an XR application, which may include information regarding the XR application and its requirements. The requirements may be device specific (e.g., processing requirements, etc.) and/or network related (e.g., latency requirements, etc.). In block 1104, the edge device may use the received information to evaluate and determine the user device requirements associated with the XR application (e.g., display resolution requirement, processing requirements, etc.). In block 1106, the edge device may evaluate and determine the capabilities of the user device (e.g., display capabilities, processing power, memory, firmware version, etc.).

In determination block 1108, the edge device may determine (e.g., by comparing the user device requirements of the XR application with the capabilities of the user device, etc.) whether the user device is capable of running the complete XR application. In response to determining that the user device is capable of running the complete XR application (i.e., determination block 1108="Yes"), in block 1110, the edge device may generate and send an application success message to the application controller to indicate that the device may perform the complete XR application.

In response to determining that the user device is not capable of running the complete XR application (i.e., determination block 1108="No"), in block 1112, the edge device may determine whether the user device is capable of running portions of the XR application. In response to determining that the user device is capable of running portions of the XR application (i.e., determination block 1112="Yes"), the edge device may generate and send a user device capabilities message to the application controller and/or to the XR application. The capabilities message may include information identifying the specific portions or functions that the user device can (or cannot) perform. The application controller may use this information to determine whether to assign tasks associated with the XR application to that user device and/or to determine the tasks that are to be assigned to the user device. The XR application may use this information to determine whether it may reduce it operations or functionalities to suit the capabilities of the user device.

In response to determining that the user device is not capable of running any portion of the XR application (i.e., determination block 1112="No"), in block 1016, the edge device may generate and send a user device application fail message to the application controller to indicate that the user device cannot participate in the execution of the XR application.

Figure 12:
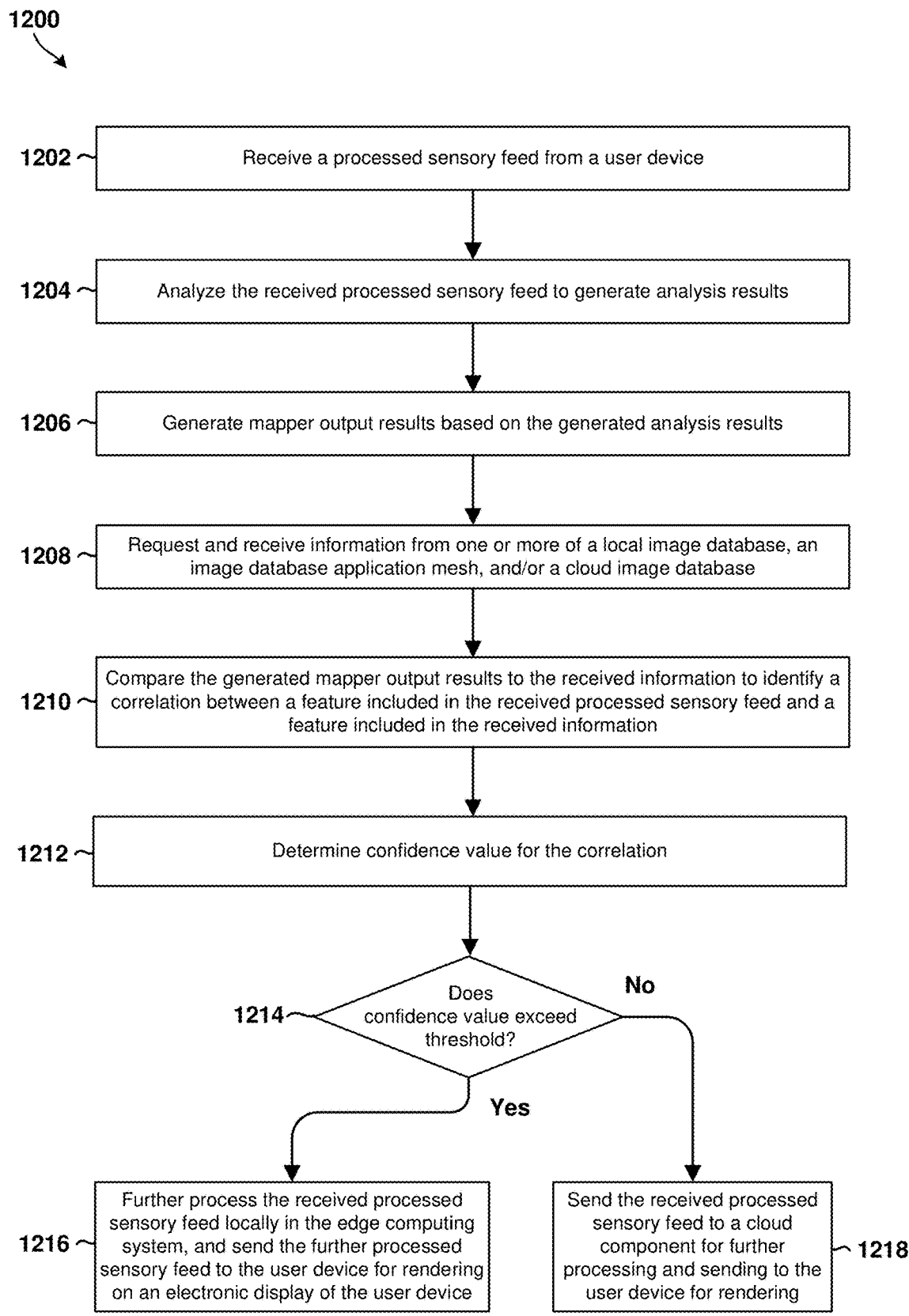

FIG. 12 is a process flow diagram illustrating a method 1200 of offloading portions of an application from a user device to an edge device. Method 1200 may be performed by one or more edge device processors in an edge computing system. The edge device processors may be included in a single edge device or in a plurality of edge devices. For example, in some embodiments, the one or more edge device processors may include multiple processors in multiple edge devices that are configured to operate in at least one of a computing mesh, an application mesh, or a connectivity mesh. In some embodiments, the one or more processors may be configured run a computing mesh, an application mesh, or a connectivity mesh in a container.

In block 1202, an edge device may receive a processed sensory feed from a user device. In block 1204, the edge device may analyze the received processed sensory feed to generate analysis results. For example, the edge device may generate the analysis results to include a relative position of the user device from surrounding objects identified in the processed sensory feed.

In block 1206, the edge device may generate mapper output results based on the generated analysis results. For example, the edge device may generate the mapper output results to include virtual coordinates.

In block 1208, the edge device may request and receive information (e.g., salient points of interest, etc.) from one or more of a local image database, an image database application mesh, or a cloud image database. In block 1210, the edge device may compare the generated mapper output results to the received information to identify a correlation between a feature included in the received processed sensory feed and a feature included in the received information. In block 1212, the edge device may determine a confidence value associated with the identified correlation.

In determination block 1214, the edge device may determine whether a confidence value associated with the identified correlation exceeds a threshold value. In response to determining that the confidence value associated with the identified correlation exceeds the threshold value (i.e., determination block 1214="Yes"), in block 1216, the edge device may further process the received processed sensory feed locally in the edge computing system, and send the further processed sensory feed to the user device for rendering on an electronic display of the user device. For example, in block 1216, the edge device may further process the received processed sensory feed by determining overlay renderings and additional sensory data, and generating augmented information (e.g., images of items and features that do not exist, wire frame of existing features, annotations, audio and visual confirmation information, etc.) based on the determined overlay renderings and additional sensory data.

In response to determining that the confidence value associated with the identified correlation does not exceed the threshold value (i.e., determination block 1214="Yes"), in block 1218, the edge device may send the received processed sensory feed to a cloud component, which may further process the processed sensory feed in the cloud and send the results to the user device for rendering on its electronic display.

It should be understood that in various embodiments, any or all of the operations in method 1200 may be performed by the same or different processors in the edge computing system. For example, in some embodiments, method 1200 may include generating the analysis results, mapper output results, and/or correlation via a first processor in a first edge device in the edge computing system, and further processing the received processed sensory feed in a second processor in a second edge device in the edge computing system.

In the various embodiments, the application controller may be able to orchestrate or inform the orchestrator what additional resources the edge computing system will need to utilize for processing the XR application.

In some embodiments, the edge computing system may be configured to implement XR functions, such as displaying the information only, like a movie or advertisement that is local to the environment.

The rendering/display for the XR may be displayed on a variety of devices. Some examples of devices that can receive the XR rendering images are shown in FIG. 1 (e.g., HMD 100, mobile device 130, etc.).

The XR functions may also involve inputs for localization enhancements where the edge device is able to receive through an optical method and then send that image to an edge computing system for initial processing of the local information 202.

The XR information displayed on the user device can be a text image or scrolling text indicting action or additional information is available that can be enabled by the end user if desired.

The edge computing system either by itself or in conjunction with other edge devices or cloud systems processes the input information received and then sends an image or rendering back that can be displayed with enhanced information on devices like 100 or 130.

The head mounted device 100 or smart phone 130 or other device can just receive the XR information and display on the device itself for local consumption. To enhance the XR capabilities, the display device may also have the ability to send localized information that will be used in the rendering of the response image.

XR is a blend of direct-perception and computer-mediated perception. Current rendering processes typically utilize a form of pattern matching along with the parameters of the software application to collect, process and render the augmented information to the end device for consumption by the end user.

XR however can be further enhanced through the use of artificial intelligence and/or machine learning. Through AI/ML, the edge device may analyze the sensor data (which includes images) and provide the required information for the rendering, optimizing the computational resources of the edge computing system or cloud computing resources through providing inferences and estimating the information collected to provide the optimal computation response for the rendering delivered.

For example, when an image and or senor data cannot be properly matched against current images in the database, the AI/ML function may interpret the image and infer what is being collected. The inference may include doing a best fit of the image to existing images available and using other sensor data make a best guess as to what the response should be as part of the computation and rendering delivery. Utilizing AI/ML, the received image may be inferred based on previous information. The best guess or approximate estimation could be made as to what the image being received is and what the appropriate response should be.

The edge computing system may also receive (or have available through other edge computing systems and or cloud computing) multiple camera feeds. The multiple camera feeds may provide pictures and videos that could be used to generate a holistic view of the environment. This holistic view of the environment may enhance the decision process for the renderings through the elimination of blind spots and or improve the image recognition.

The holistic view utilizing multiple images and video for video fusion may enable better image pattern matching. The video fusion from multiple images and video sources may also allow for the AI/ML functions to improve their learning of the environment and/or improve the inferences of the images received for processing the XR function.

For example, using the video fusion, decisions for the rendering may be provided that include information about the object that is not readily visible to the user device (e.g., because of some type of obstruction, etc.). The ability to utilize other images for a 360 degree view may enable the user to rotate an image to see the other side of it, without having to change current position or move the object being observed.

Using multiple image and video feeds through video fusion may improve the rendering response and or responses because they are treated at one system.

Video fusion may also improve the predictive rendering capability of the XR and AI/ML functions.

For example, with video fusion, the user may have access to view an object or person who is obscured behind a wall or around a corner (e.g., for security and defence uses, etc.). The information may be rendered so the user is able to understand whether there is an object or person behind the wall or around a corner, and whether they should act. As more information is gathered, the AI/ML functions can better predict, advice and act on the information.

Another example is where video fusion allows the user to rotate the field of view of a large object (e.g., a vehicle, etc.) in order to access the status of that object. The rendering of the rotated image may also have additional information provided about it being displayed.

Another example of video fusion is for field medical treatment where multiple images and videos from different angles are provided from other medical personnel for the same patient allowing for an improved renderings to be displayed. The renderings may include an overall view of the triage area. The renderings may include a 3-dimensional view of the wound with medical telemetry and suggested actions that could be taken.

Another of video fusion example involves the use of drones where the drones view is augmented with feeds from and to other drones improving the situational awareness. With the improved image and video inputs, AI/ML installed on the drone could be used to make decisions. Examples of some decisions include turning left or right depending on what images and or videos are already available for that quadrant.

Another example of video fusion involves the drone deploying a munition based on a high value target determined either from prior information or changes to the environment due to AI/ML inferences applied based on the images and video inputs collected from the drone or from other drones and or inputs.

Some embodiments include methods, and computing devices (e.g., edge devices, etc.) configured to implement the methods, of improving the performance of a software application (e.g., an XR application) by offloading a tracker component, mapper component and/or object recognizer component from a user device to an edge device.

Some embodiments may include edge computing system that overcomes many of the limitations of existing and conventional solutions, particularly limitations related to resource shortages on resource-constrained user computing devices (e.g., mobile devices, HMDs, etc.) that run complex software applications (e.g., XR applications, etc.) and/or for which the performance, end-to-end latency and/or energy consumption characteristics of device may have a direct, significant and/or user-perceivable impact on the user experience.

In some embodiments, the edge computing system may be configured to include or work in conjunction with a user computing device, a cloud server and one or more edge devices to intelligently and dynamically offload certain tasks (e.g., computationally intensive tasks, etc.) from the user computing device to the edge device(s) and/or to the cloud server.

In some embodiments, the edge computing system may be configured to operate to combine the advantages of remote cloud servers and close-by edge devices to provide a powerful collaborative cloud and edge computing system that improves the performance, end-to-end latency and/or energy consumption characteristics of user computing devices that run XR applications.

In some embodiments, the edge computing system may be configured to intelligently and efficiency balance tradeoffs between performance and latency and/or tradeoffs between resource capacity and latency by intelligently partitioning, organizing and distributing tasks and information between one or more edge device(s) and the cloud server.

In some embodiments, the edge computing system may be configured to store information that is frequently accessed by common objects on an edge database on the edge device. In some embodiments, the edge computing system may be configured to store most of the remaining information (e.g., 3D models, annotations of those uncommon objects, etc.) in the cloud server.

In some embodiments, the edge computing system may include or implement a computing mesh, an application mesh and/or a connectivity mesh. For example, in some embodiments, the edge computing system may include several edge devices in a computing mesh. When the several edge devices in the computing mesh are simultaneously served by the same cloud server, the edge computing system may intelligently and dynamically allocate the available cloud computational resource to each edge device based on their workload, local computation capacities and/or performance requirements.

In some embodiments, the edge computing system may be configured to use convex and/or non-convex optimization tools to solve specific optimization problems and derive a detailed resource allocation policy.

In some embodiments, the edge computing system may be configured to determine whether more cloud computational resources should be allocated to assist edge devices that have less computation capacities and/or heavier workloads in order to balance the resource and workload distributions across the multiple edge devices and improve the platform's overall performance.

In some embodiments, the edge computing system may be configured to divide software applications (e.g., latency-sensitive applications, etc.) into several major classes depending on the computational and application requirements. In some embodiments, the edge computing system may be configured so that the first major class includes applications that require uninterrupted execution that cannot be fragmented, and therefore requires full offloading (FO), and the second major class includes applications that could benefit from fractional or partial offloading (PO). In some embodiments, the edge computing system may be configured to formulate and solve a joint optimization problem for each class of applications so as to minimize the overall energy consumption across the sub-network subject to latency, transmission quality, computational budget and/or transmit power constraints.

In some embodiments, the edge computing system may be configured to provide unique content-based image retrieval and multicast delivery from the edge layer to user devices within the coverage area of a computing mesh, application mesh, or connectivity mesh.

In some embodiments, the edge computing system may be configured to run a computing mesh, an application mesh, and/or a connectivity mesh in a container (e.g., for processing XR applications, etc.). In some embodiments, the edge computing system may be configured to offload the main components of an XR application (e.g., tracker, mapper, object recognizer, etc.) from a user computing device to one or more edge devices. In some embodiments, the edge computing system may be configured to enforce rules or policies via an edge device and/or at the edge of the network. In some embodiments, the edge computing system may be configured to enforce the rules or policies via a mesh network. In some embodiments, the edge computing system may be configured to manage inputs to applications from different channels with different resolutions due to channel conditions. In some embodiments, the edge computing system may be configured so that a single edge device interacts with a single cloud service, multiple edge devices interact with a single cloud service, a single edge device interacts with a multiple cloud service, or that multiple edge devices interact with multiple cloud services.

Figure 13A:
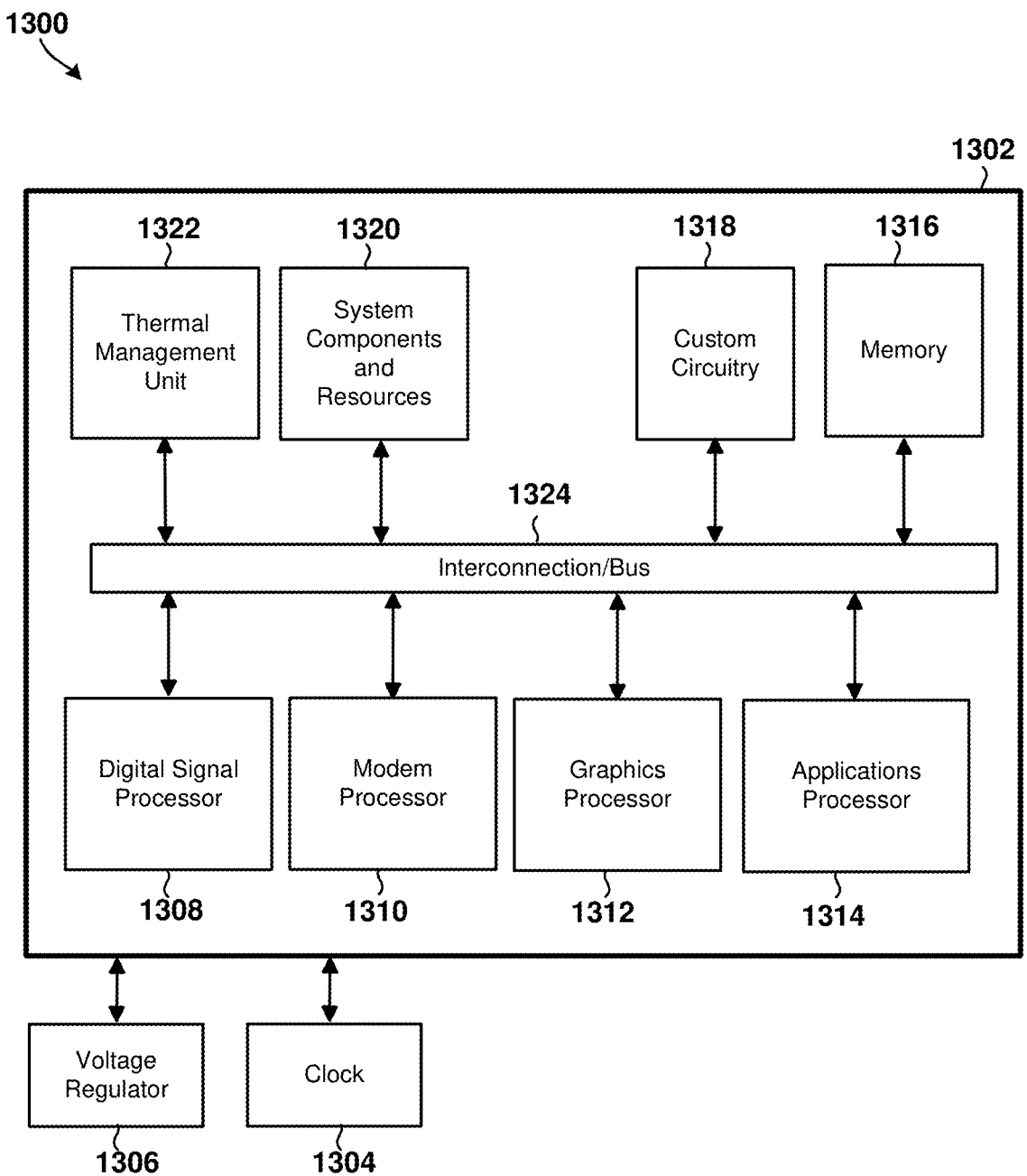
FIGS. 13A and 13B are a component block diagrams illustrating components that could be included in an edge device in edge computing system in accordance with some embodiments.
Figure 13B:
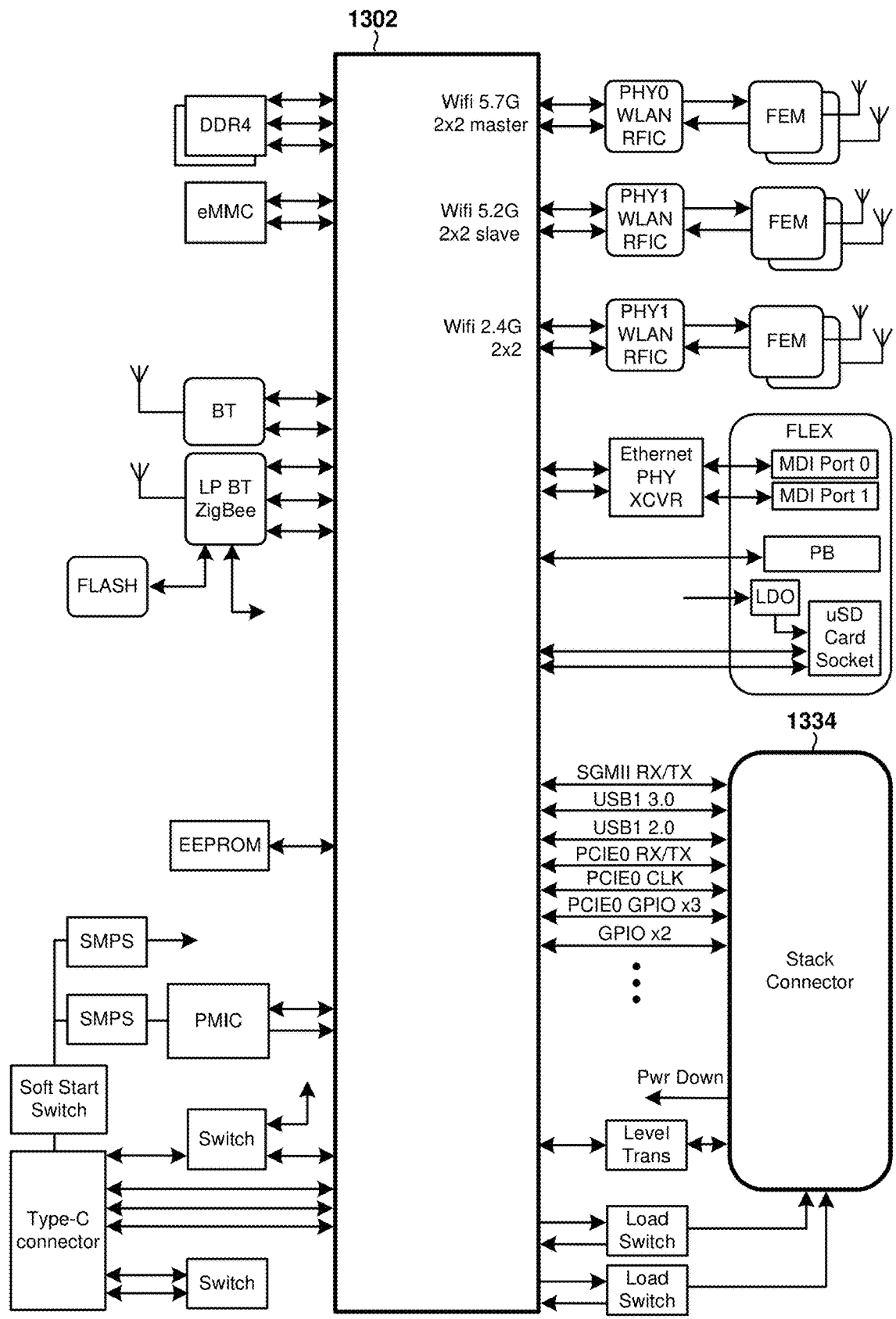

FIGS. 13A and 13B illustrate an example computing system 1300 that may be used in accordance with some embodiments. In the example illustrated in FIG. 13, the computing system 1300 includes an SOC 1302, a clock 1304, and a voltage regulator 1306.

With reference to FIG. 13A, the SOC 1302 may include a digital signal processor (DSP) 1308, a modem processor 1310, a graphics processor 1312, an application processor 1314 connected to one or more of the processors, memory 1316, custom circuitry 1318, system components and resources 1320, a thermal management unit 1322, and an interconnection/bus module 1324. The SOC 1302 may operate as central processing unit (CPU) that carries out the instructions of software application programs by performing the arithmetic, logical, control and input/output (I/O) operations specified by the instructions.

The thermal management unit 1322 may be configured to monitor and manage the device's junction temperature, surface/skin temperatures and/or the ongoing consumption of power by the active components that generate thermal energy in the device. The thermal management unit 1322 may determine whether to throttle the performance of active processing components (e.g., CPU, GPU, LCD brightness), the processors that should be throttled, the level to which the frequency of the processors should be throttled, when the throttling should occur, etc.

The system components and resources 1320 and custom circuitry 1318 may manage sensor data, analog-to-digital conversions, wireless data transmissions, and perform other specialized operations, such as decoding data packets and processing video signals. For example, the system components and resources 1320 may include power amplifiers, voltage regulators, oscillators, phase-locked loops, peripheral bridges, temperature sensors (e.g., thermally sensitive resistors, negative temperature coefficient (NTC) thermistors, resistance temperature detectors (RTDs), thermocouples, etc.), semiconductor-based sensors, data controllers, memory controllers, system controllers, access ports, timers, and other similar components used to support the processors and software clients running on a device. The custom circuitry 1318 may also include circuitry to interface with other computing systems and peripheral devices, such as wireless communication devices, external memory chips, etc.

Each processor 1308, 1310, 1312, 1314 may include one or more cores, and each processor/core may perform operations independent of the other processors/cores. For example, the SOC 1302 may include a processor that executes a first type of operating system (e.g., FreeBSD, LINUX, OS X, etc.) and a processor that executes a second type of operating system (e.g., MICROSOFT WINDOWS 10). In addition, any or all of the processors 1308, 1310, 1312, 1314 may be included as part of a processor cluster architecture (e.g., a synchronous processor cluster architecture, an asynchronous or heterogeneous processor cluster architecture, etc.).

The processors 1308, 1310, 1312, 1314 may be interconnected to one another and to the memory 1318, system components and resources 1320, and custom circuitry 1318, and the thermal management unit 1322 via the interconnection/bus module 1324. The interconnection/bus module 1324 may include an array of reconfigurable logic gates and/or implement a bus architecture (e.g., CoreConnect, AMBA, etc.). Communications may be provided by advanced interconnects, such as high-performance networks-on chip (NoCs).

The SOC 1302 may further include an input/output module (not illustrated) for communicating with resources external to the SOC, such as the clock 1304 and the voltage regulator 1306. Resources external to the SOC (e.g., clock 1304, etc.) may be shared by two or more of the internal SOC processors/cores.

In addition to the SOC 1302 discussed above, the various embodiments may include or may be implemented in a wide variety of computing systems, which may include a single processor, multiple processors, multicore processors, or any combination thereof.

With reference to FIG. 13B, the computing system 1300 may include a stack connector 1334. The stack connector 1334 may include interconnection/bus module with various data and control lines for communicating with the SOC 1302. The stack connector 1334 may also expose systems buses and resources of a SOC 1302 or computing device 1300 in a manner that allows the chip or computing system to attach to an additional unit to include additional features, functions or capabilities, but which preserves the performance and integrity of the original SOC 1302 or computing device 1300.

The edge computing system can be made up of multiple edge computing systems all connected in a mesh environment. The edge computing devices can be a heterogeneous hardware environment where different edge computing devices have different capabilities depending on their internal architectures which includes CPU type, RAM, storage capabilities, wireless and wired capabilities as well as kernel capabilities and version. The heterogeneous environment can also include edge devices that have the same identical platforms but operating with different software versions.

Figure 14:
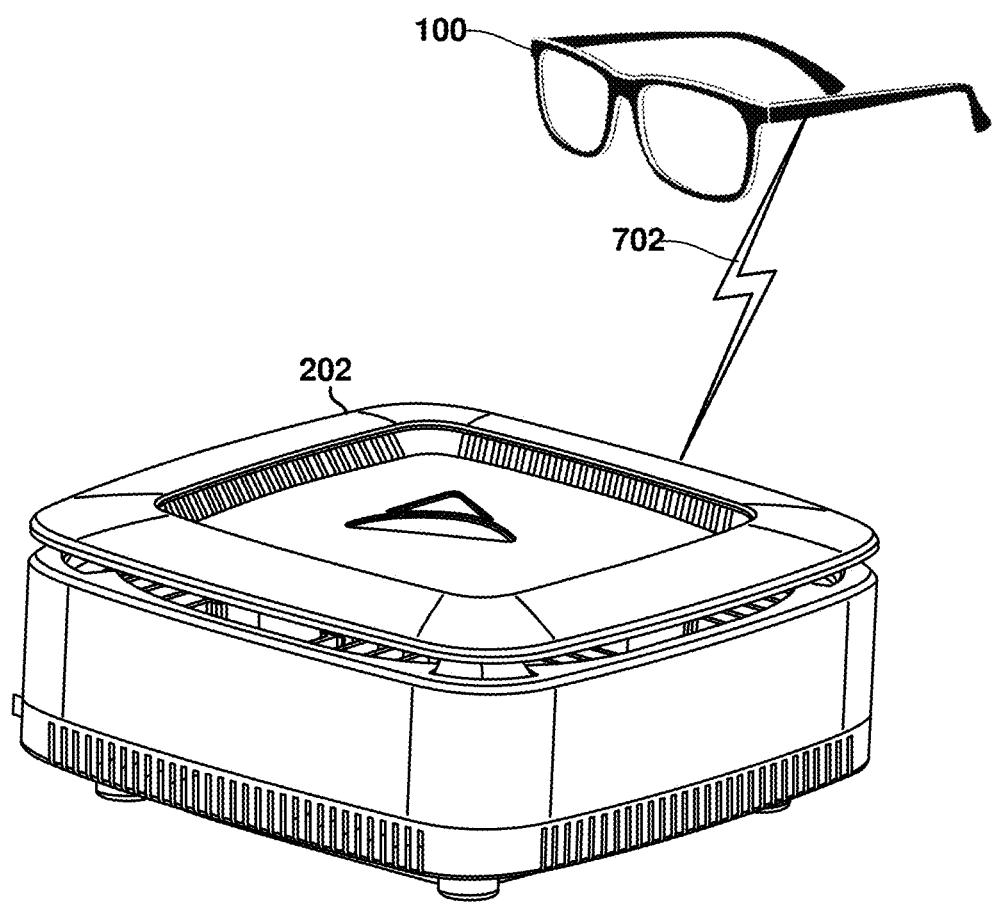
FIG. 14 is an illustration of a distributed edge computing system in which m the functions of an XR application may be distributed between a HMD and an edge device in accordance with some embodiments.

FIG. 14 illustrates that, in some embodiments, the edge computing system may include a HMD 100 coupled to an edge device 202 via a wireless communication link 1402. In some embodiments, the edge device 202 illustrated in FIG. 14 may be an isolated system. In some embodiments, the edge device 202 may have connectivity to other networks. In some embodiments, the edge device 202 can also be connected to other edge devices wirelessly or a wired connection or a combination of wireless and wired.

Figure 15:
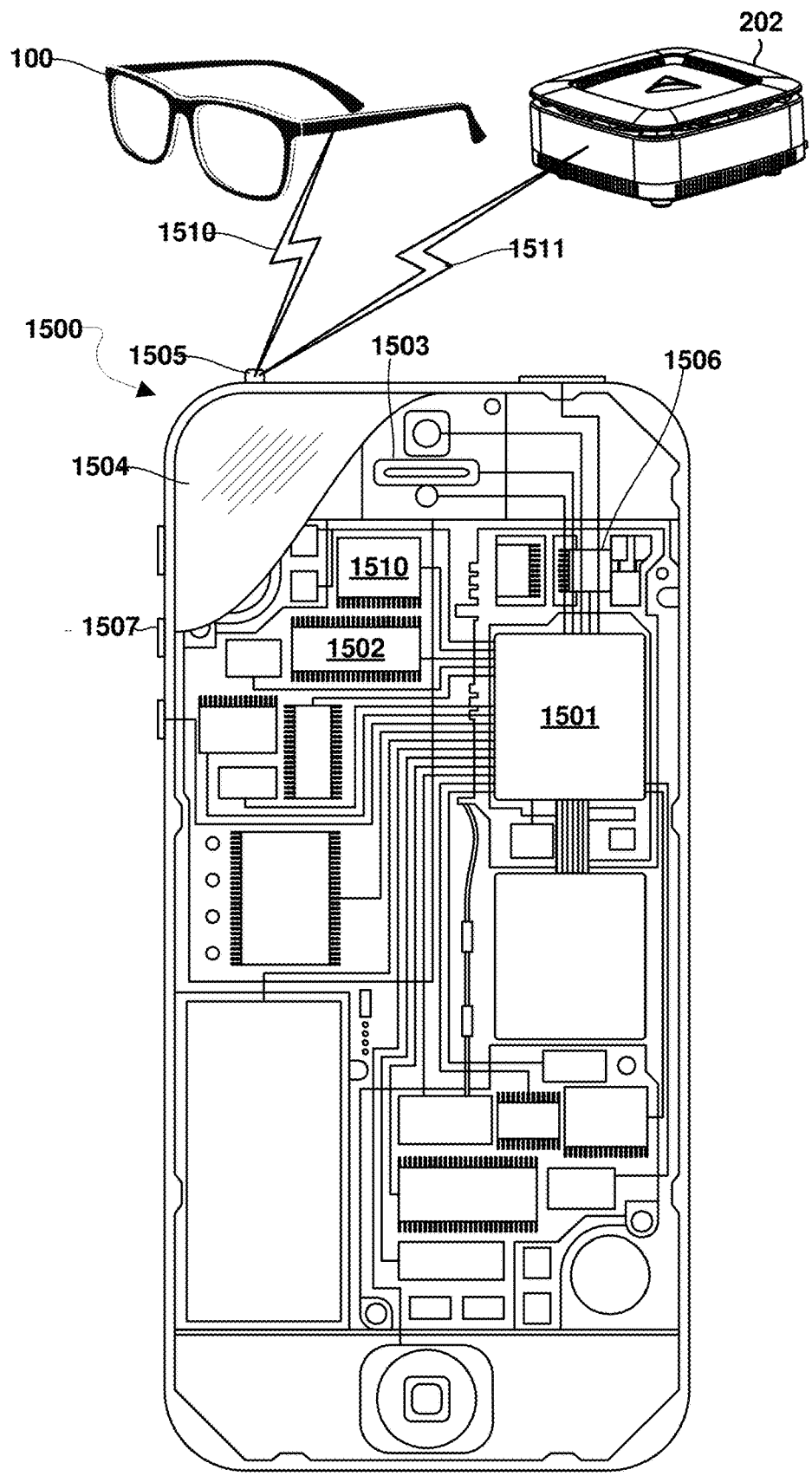
FIG. 15 is an illustration of a distributed edge computing system in which the functions of an XR application may be distributed between a HMD, a mobile device, and an edge device in accordance with some embodiments.

FIG. 15 illustrates that, in some embodiments, the edge computing system may include mobile device 1500 coupled to a HMD 100 and an edge device 202 via a wireless communication links 1510, 1511. In the example illustrated in FIG. 15, the mobile device is a smartphone 1500 that includes a processor 1501 coupled to internal memory 1502, a speaker 1503, and an electronic display 1504. Additionally, the smartphone 1500 may include an antenna 1505 for sending and receiving electromagnetic radiation that may be connected to a wireless data link and/or cellular telephone transceiver 1506 coupled to the processors 1501. Smartphones 1500 typically also include menu selection buttons or rocker switches 1507 for receiving user inputs.

A typical smartphone 1500 also includes a sound encoding/decoding (CODEC) circuit 1510, which digitizes sound received from a microphone into data packets suitable for wireless transmission and decodes received sound data packets to generate analog signals that are provided to the speaker to generate sound. Also, one or more of the processor 1501, wireless transceiver 1506 and CODEC 1510 may include a digital signal processor (DSP) circuit (not shown separately).

The HMD 100 can have the capabilities of a smartphone 1500 integrated into the HMD.

The processors discussed in this application may be any programmable microprocessor, microcomputer or multiple processor chip or chips that can be configured by software instructions (applications) to perform a variety of functions, including the functions of the various aspects described in this application. In some wireless devices, multiple processors may be provided, such as one processor dedicated to wireless communication functions and one processor dedicated to running other applications. Typically, software applications may be stored in the internal memory 906 before they are accessed and loaded into the processor. The processor may include internal memory sufficient to store the application software instructions.

As used in this application, the terms "component," "module," "system," and the like may refer to a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

Various aspects illustrated and described are provided merely as examples to illustrate various features of the claims. However, features shown and described with respect to any given aspect are not necessarily limited to the associated aspect and may be used or combined with other aspects that are shown and described. Further, the claims are not intended to be limited by any one example aspect. For example, one or more of the operations of the methods may be substituted for or combined with one or more operations of the methods.

The foregoing method descriptions and the process flow diagrams are provided merely as illustrative examples and are not intended to require or imply that the operations of various aspects must be performed in the order presented. As will be appreciated by one of skill in the art the order of operations in the foregoing aspects may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the aspects disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such aspect decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects without departing from the scope of the claims. Thus, the present disclosure is not intended to be limited to the aspects shown herein but is to be accorded the widest scope consistent with the following claims and the principles and novel features disclosed herein.

What is claimed is:

1. An edge computing system, comprising:
   one or more processors configured with processor executable instructions to:

receive a processed sensory feed from a user device, wherein the received processed sensory feed includes temperature and video data;

analyze the received processed sensory feed to generate predictive analysis results;

generate mapper output results based on the generated analysis results;

request and receive information from one or more of a local image database, an image database application mesh, or a cloud image database;

compare the generated mapper output results to the received information to identify a correlation between a feature included in the received processed sensory feed and a feature included in the received information;

determine whether a confidence value associated with the identified correlation exceeds a threshold value;

further process the received processed sensory feed locally in the edge computing system, and send the further processed sensory feed to the user device for rendering on an electronic display of the user device, in response to determining that the confidence value associated with the identified correlation exceeds the threshold value; and send the received processed sensory feed to a cloud component for further processing and sending to the user device for rendering in response to determining that the confidence value associated with the identified correlation does not exceed the threshold value.

2. The edge computing system of claim 1, wherein the one or more processors are included in an edge device.

3. The edge computing system of claim 1, wherein the one or more processors comprise multiple processors in multiple edge devices configured to operate in at least one of a computing mesh, an application mesh, or a connectivity mesh.

4. The edge computing system of claim 1, wherein the one or more processors are configured run at least one of a computing mesh, an application mesh, or a connectivity mesh in a container.

5. The edge computing system of claim 1, wherein the one or more processors are configured with processor executable instructions to:

generate the analysis results, generate the mapper output results, and identify the correlation in a first processor in a first edge device in the edge computing system; and further process the received processed sensory feed in a second processor in a second edge device in the edge computing system.

6. The edge computing system of claim 1, wherein the one or more processors are configured with processor executable instructions to:

generate the analysis results to include a relative position of the user device from surrounding objects identified in the processed sensory feed;

generate the mapper output results to include virtual coordinates; and request and receive the information from one or more of the local image database, the image database application mesh, or the cloud image database to receive information including salient points of interest.

7. The edge computing system of claim 1, wherein the one or more processors are configured with processor executable instructions to further process the received processed sensory feed locally in the edge computing system in response to determining that the confidence value associated with the identified correlation exceeds the threshold value by:

determining overlay renderings and additional sensory data; and generating augmented information based on the determined overlay renderings and additional sensory data.

8. The edge computing system of claim 7, wherein the one or more processors are configured with processor executable instructions to generate the augmented information to include:

images of items and features that do not exist;
wire frame of existing features;
an annotation; and
audio and visual confirmation information.

9. A method of offloading portions of an application from a user device to an edge device, the method comprising:

receiving, in one or more processors in an edge computing system, a processed sensory feed from the user device, wherein the received processed sensory feed includes temperature and video data;

analyzing, in the one or more processors in the edge computing system, the received processed sensory feed to generate predictive analysis results;

generating, in the one or more processors in the edge computing system, mapper output results based on the generated analysis results;

requesting and receiving, in the one or more processors in the edge computing system, information from one or more of a local image database, an image database application mesh, or a cloud image database;

comparing, in the one or more processors in the edge computing system, the generated mapper output results to the received information to identify a correlation between a feature included in the received processed sensory feed and a feature included in the received information;

determining, in the one or more processors in the edge computing system, whether a confidence value associated with the identified correlation exceeds a threshold value;

further processing, in the one or more processors in the edge computing system, the received processed sensory feed locally in the edge computing system, and send the further processed sensory feed to the user device for rendering on an electronic display of the user device, in response to determining that the confidence value associated with the identified correlation exceeds the threshold value; and sending, by the one or more processors in the edge computing system, the received processed sensory feed to a cloud component for further processing and sending to the user device for rendering in response to determining that the confidence value associated with the identified correlation does not exceed the threshold value.

10. The method of claim 9, wherein the one or more processors in the edge computing system are included in an edge device.

11. The method of claim 9, wherein the one or more processors in the edge computing system include multiple processors in multiple edge devices configured to operate in at least one of a computing mesh, an application mesh, or a connectivity mesh.

12. The method of claim 9, further comprising run at least one of a computing mesh, an application mesh, or a connectivity mesh in a container.

13. The method of claim 9, wherein:

generating the analysis results, generating the mapper output results, and identifying the correlation comprise generating the analysis results, generating the mapper output results, and identifying the correlation by a first processor in a first edge device in the edge computing system; and further processing the received processed sensory feed comprises further processing the received processed sensory feed by a second processor in a second edge device in the edge computing system.

14. The method of claim 9, wherein:

analyzing the received processed sensory feed to generate the analysis results comprises analyzing the received processed sensory feed to generate the analysis results to include a relative position of the user device from surrounding objects identified in the processed sensory feed;

generating the mapper output results based on the generated analysis results comprises generating the mapper output results to include virtual coordinates; and requesting and receiving the information from one or more of the local image database, the image database application mesh, or the cloud image database comprises requesting and receiving information that includes including salient points of interest from one or more of the local image database, the image database application mesh, or the cloud image database.

15. The method of claim 9, wherein further processing the received processed sensory feed locally in the edge computing system in response to determining that the confidence value associated with the identified correlation exceeds the threshold value comprises:

determining overlay renderings and additional sensory data; and generating augmented information based on the determined overlay renderings and additional sensory data.

16. The method of claim 15, wherein generating augmented information based on the determined overlay renderings and additional sensory data comprises generating the augmented information to include:

images of items and features that do not exist;
wire frame of existing features;
an annotation; and
audio and visual confirmation information.

17. A non-transitory computer readable storage medium having stored thereon processor-executable software instructions configured to cause one or more processors in an edge computing system to perform operations comprising:

receiving a processed sensory feed from a user device, wherein the received processed sensory feed includes temperature and video data;

analyzing the received processed sensory feed to generate predictive analysis results;

generating mapper output results based on the generated analysis results;

requesting and receiving information from one or more of a local image database, an image database application mesh, or a cloud image database;

comparing the generated mapper output results to the received information to identify a correlation between a feature included in the received processed sensory feed and a feature included in the received information;

determining whether a confidence value associated with the identified correlation exceeds a threshold value;

further processing the received processed sensory feed locally in the edge computing system, and sending the further processed sensory feed to the user device for rendering on an electronic display of the user device, in response to determining that the confidence value associated with the identified correlation exceeds the threshold value; and sending the received processed sensory feed to a cloud component for further processing and sending to the user device for rendering in response to determining that the confidence value associated with the identified correlation does not exceed the threshold value.

18. The non-transitory computer readable storage medium of claim 17, wherein the one or more processors in an edge computing system are included in an edge device.

19. The non-transitory computer readable storage medium of claim 17, wherein one or more processors in an edge computing system comprise multiple processors in multiple edge devices configured to operate in at least one of a computing mesh, an application mesh, or a connectivity mesh.

20. The non-transitory computer readable storage medium of claim 17, wherein the stored processor-executable instructions are configured to cause the one or more processors in an edge computing system to perform operations further comprising running at least one of a computing mesh, an application mesh, or a connectivity mesh in a container.

21. The non-transitory computer readable storage medium of claim 17, wherein the stored processor-executable instructions are configured to cause the one or more processors in an edge computing system to perform operations such that:

generating the analysis results, generating the mapper output results, and identifying the correlation comprise generating the analysis results, generating the mapper output results, and identifying the correlation by a first processor in a first edge device in the edge computing system; and further processing the received processed sensory feed comprises further processing the received processed sensory feed by a second processor in a second edge device in the edge computing system.

22. The non-transitory computer readable storage medium of claim 17, wherein the stored processor-executable instructions are configured to cause the one or more processors in an edge computing system to perform operations such that:

analyzing the received processed sensory feed to generate the analysis results comprises analyzing the received processed sensory feed to generate the analysis results to include a relative position of the user device from surrounding objects identified in the processed sensory feed;

generating the mapper output results based on the generated analysis results comprises generating the mapper output results to include virtual coordinates; and requesting and receiving the information from one or more of the local image database, the image database application mesh, or the cloud image database comprises requesting and receiving information that includes including salient points of interest from one or more of the local image database, the image database application mesh, or the cloud image database.

23. The non-transitory computer readable storage medium of claim 17, wherein the stored processor-executable instructions are configured to cause the one or more processors in an edge computing system to perform operations such that further processing the received processed sensory feed locally in the edge computing system in response to determining that the confidence value associated with the identified correlation exceeds the threshold value comprises:

determining overlay renderings and additional sensory data; and generating augmented information based on the determined overlay renderings and additional sensory data.

24. The non-transitory computer readable storage medium of claim 23, wherein the stored processor-executable instructions are configured to cause the one or more processors in an edge computing system to perform operations such that generating augmented information based on the determined overlay renderings and additional sensory data comprises generating the augmented information to include:

images of items and features that do not exist;

wire frame of existing features;

an annotation; and audio and visual confirmation information.

* * * * *